United States Patent [19]
Eto et al.

[11] Patent Number: 5,557,342
[45] Date of Patent: Sep. 17, 1996

[54] VIDEO DISPLAY APPARATUS FOR DISPLAYING A PLURALITY OF VIDEO SIGNALS HAVING DIFFERENT SCANNING FREQUENCIES AND A MULTI-SCREEN DISPLAY SYSTEM USING THE VIDEO DISPLAY APPARATUS

[75] Inventors: Masahiro Eto, Mobara; Hiroyuki Urata, Yokohama; Fumio Inoue, Yokohama; Masanori Ogino, Yokohama; Atsushi Maruyama, Fujisawa; Kiyoshi Yamamoto, Yokohama, all of Japan

[73] Assignee: Hitachit, Ltd., Tokyo, Japan

[21] Appl. No.: 425,698

[22] Filed: Apr. 19, 1995

Related U.S. Application Data

[63] Continuation-in-part of Ser. No. 227,019, Apr. 13, 1994, abandoned.

[30] Foreign Application Priority Data

Jul. 6, 1993  [JP]  Japan ................................ 5-166611
Nov. 29, 1993 [JP]  Japan ................................ 5-298066

[51] Int. Cl.$^6$ ................................................. H04N 5/262
[52] U.S. Cl. ...................... 348/706; 348/704; 348/569; 348/722; 348/839
[58] Field of Search ............................... 348/204, 205, 348/206, 553, 554, 441, 556, 555, 563, 564, 569, 722, 839; H04N 5/262

[56] References Cited

U.S. PATENT DOCUMENTS

| | | | |
|---|---|---|---|
| 5,010,392 | 4/1991 | Croll | 348/555 |
| 5,187,575 | 2/1993 | Lim | 348/555 X |
| 5,204,662 | 4/1993 | Oda et al. | 348/706 X |
| 5,257,106 | 10/1993 | Maruoka | 348/706 X |
| 5,325,131 | 6/1994 | Penney | 348/706 |
| 5,339,111 | 8/1994 | Park | 348/555 X |

FOREIGN PATENT DOCUMENTS

| | | |
|---|---|---|
| 50-32009 | 10/1975 | Japan . |
| 61-127285 | 6/1986 | Japan . |
| 61-128691 | 6/1986 | Japan . |
| 62-208766 | 9/1987 | Japan . |
| 63-142783 | 6/1988 | Japan . |
| 4-276795 | 10/1992 | Japan . |
| 4-280291 | 10/1992 | Japan . |
| 4-329593 | 11/1992 | Japan . |
| 4-342295 | 11/1992 | Japan . |

*Primary Examiner*—Victor R. Kostak
*Attorney, Agent, or Firm*—Evenson, McKeown, Edwards & Lenahan, P.L.L.C.

[57] ABSTRACT

A video display system that includes a housing has arranged thereon a plurality of video input terminals for receiving a plurality of video signals having different scanning frequencies. An expansion/compression processing circuit replaceably mounted on the housing receives and expands/compresses the plurality of video signals and produces at least one video signal expanded/compressed in synchronism with a sync signal selected by a sync switching circuit. At least one of the video signals is synthesized with another video signal, and the synthesized video signal is produced by a video signal synthesis circuit. A video signal from the video signal synthesis circuit is used to generate a video display signal in synchronism with the sync signal. This video display signal is applied to a display. At least one such video display system, an AV controller, a central control console and a lecture table are combined to realize a screen display system.

50 Claims, 32 Drawing Sheets

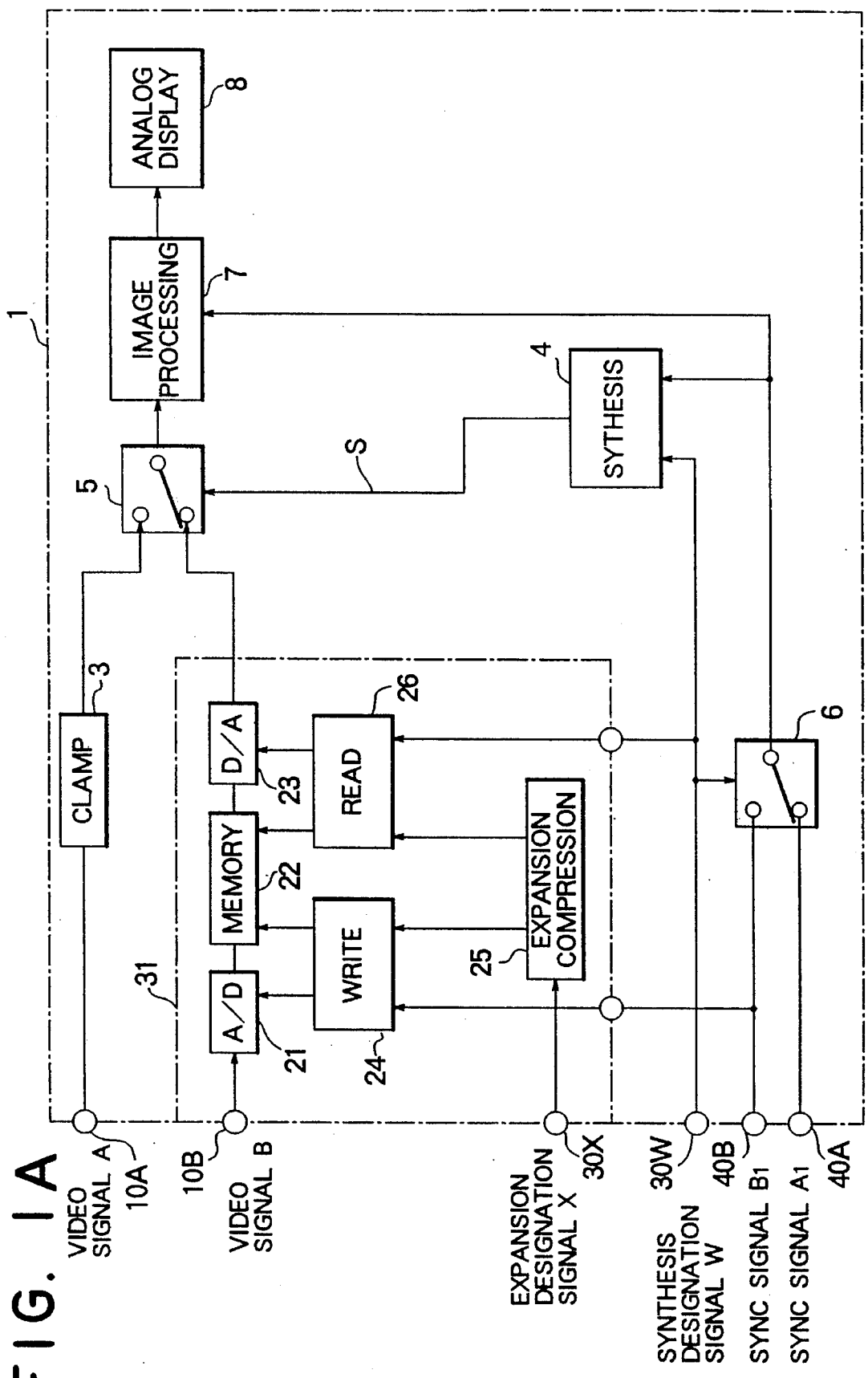
FIG. IA

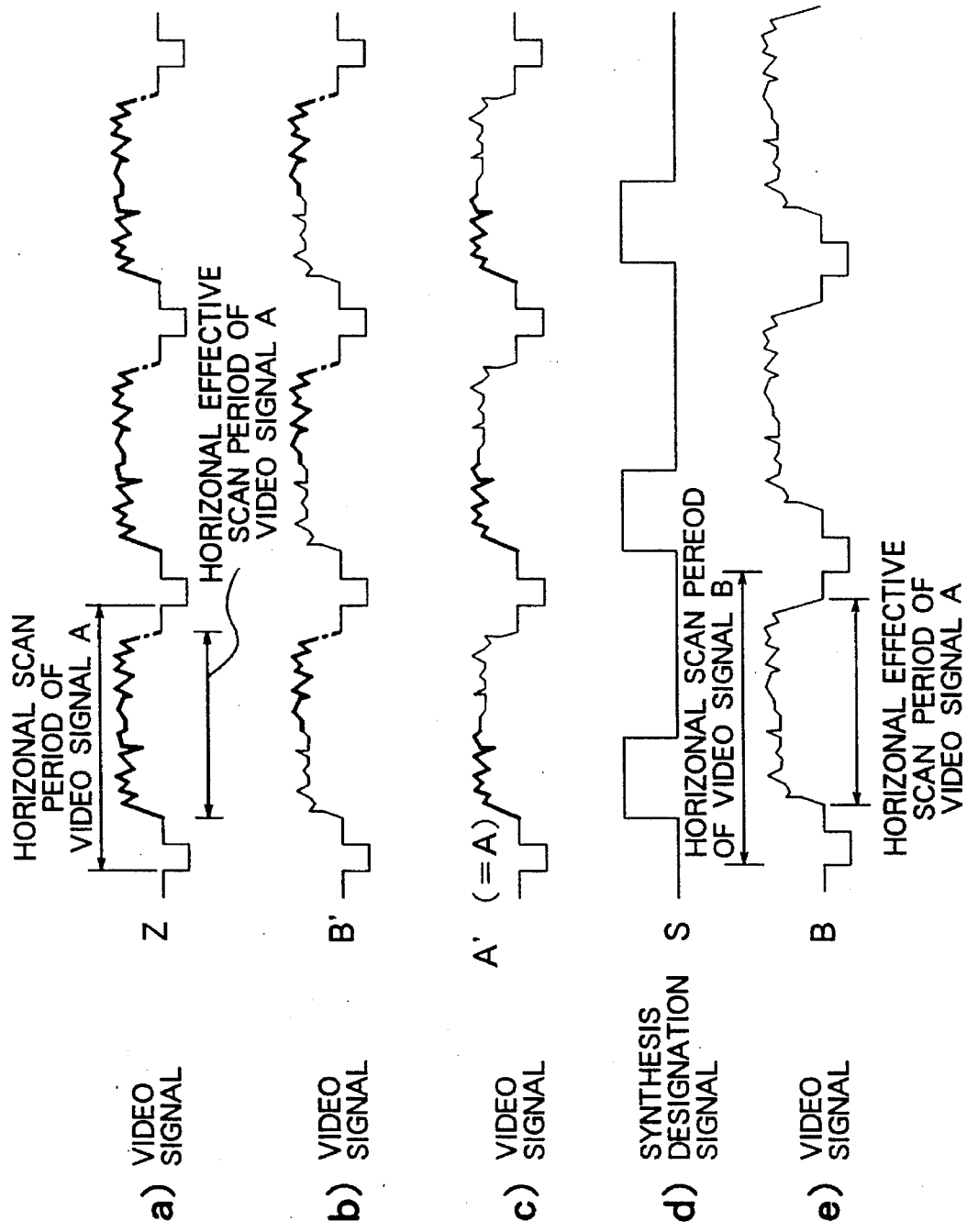

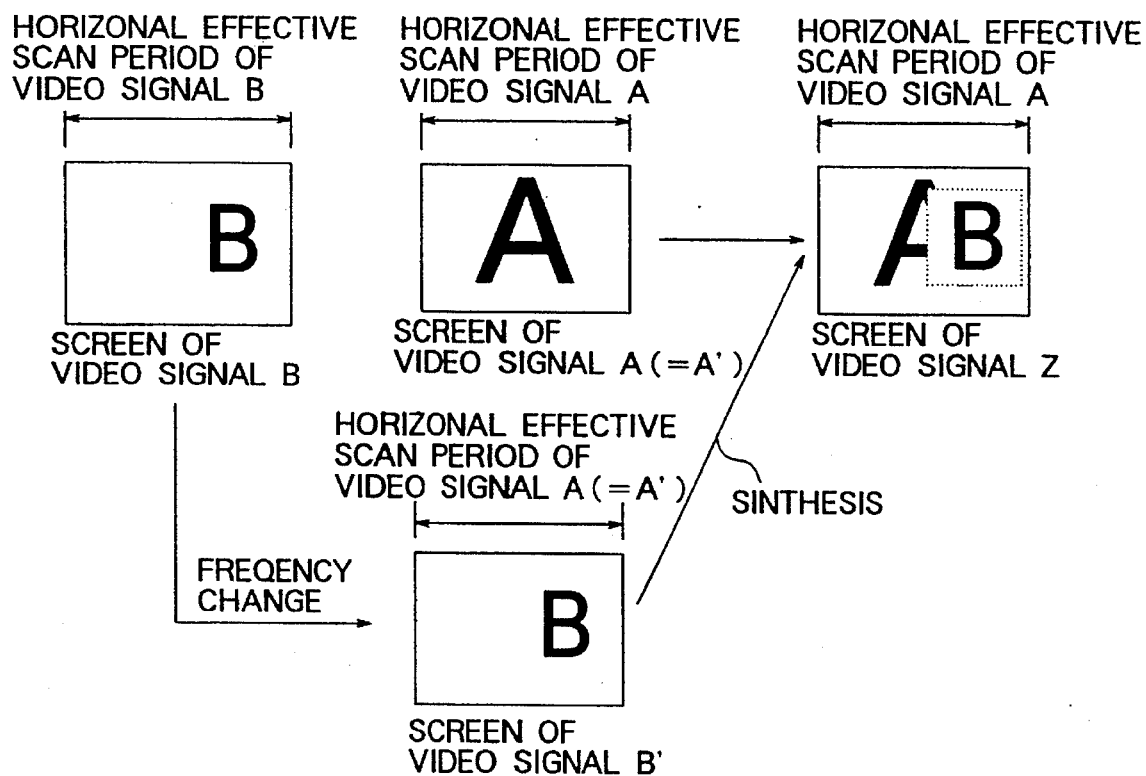

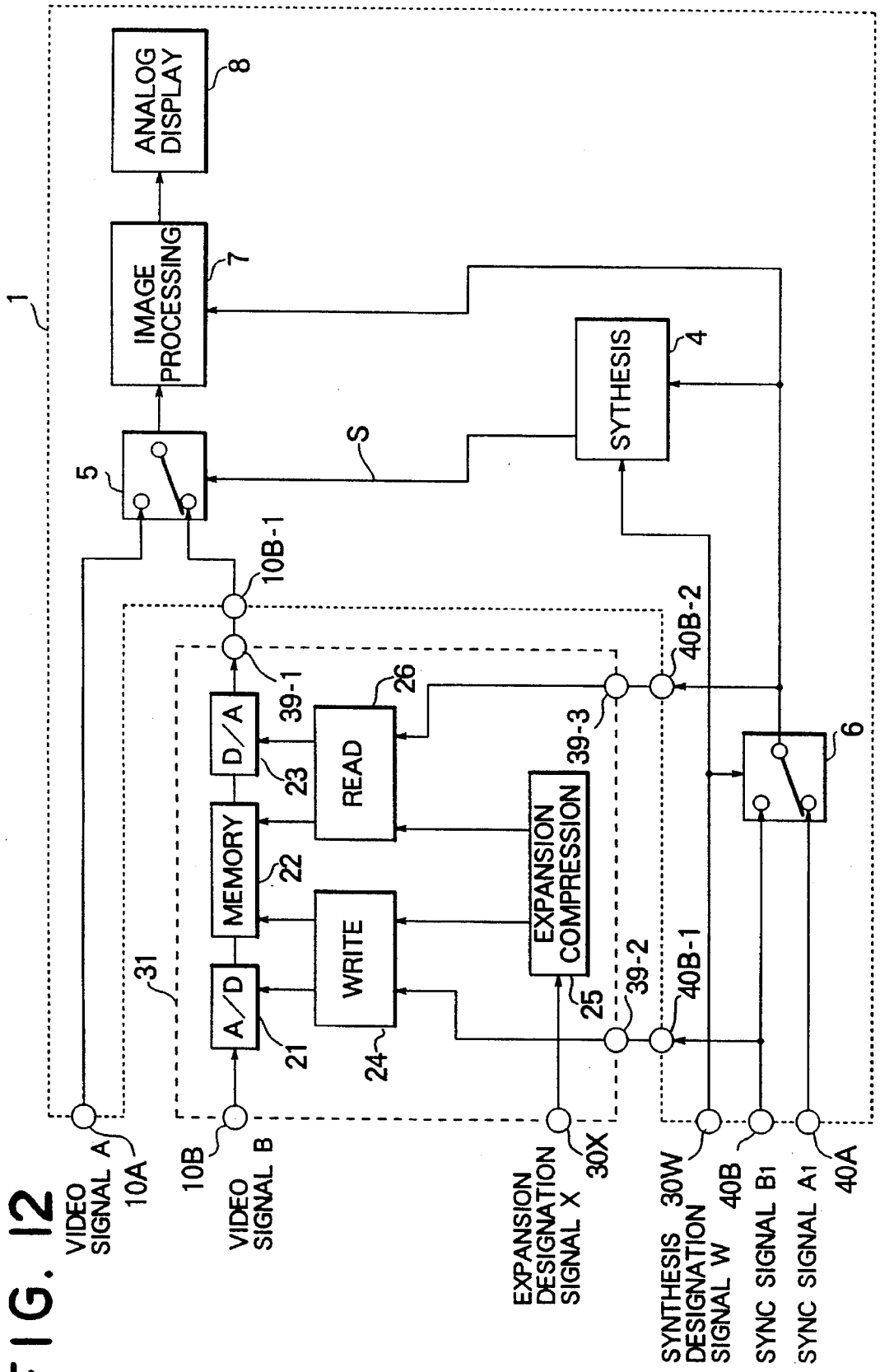

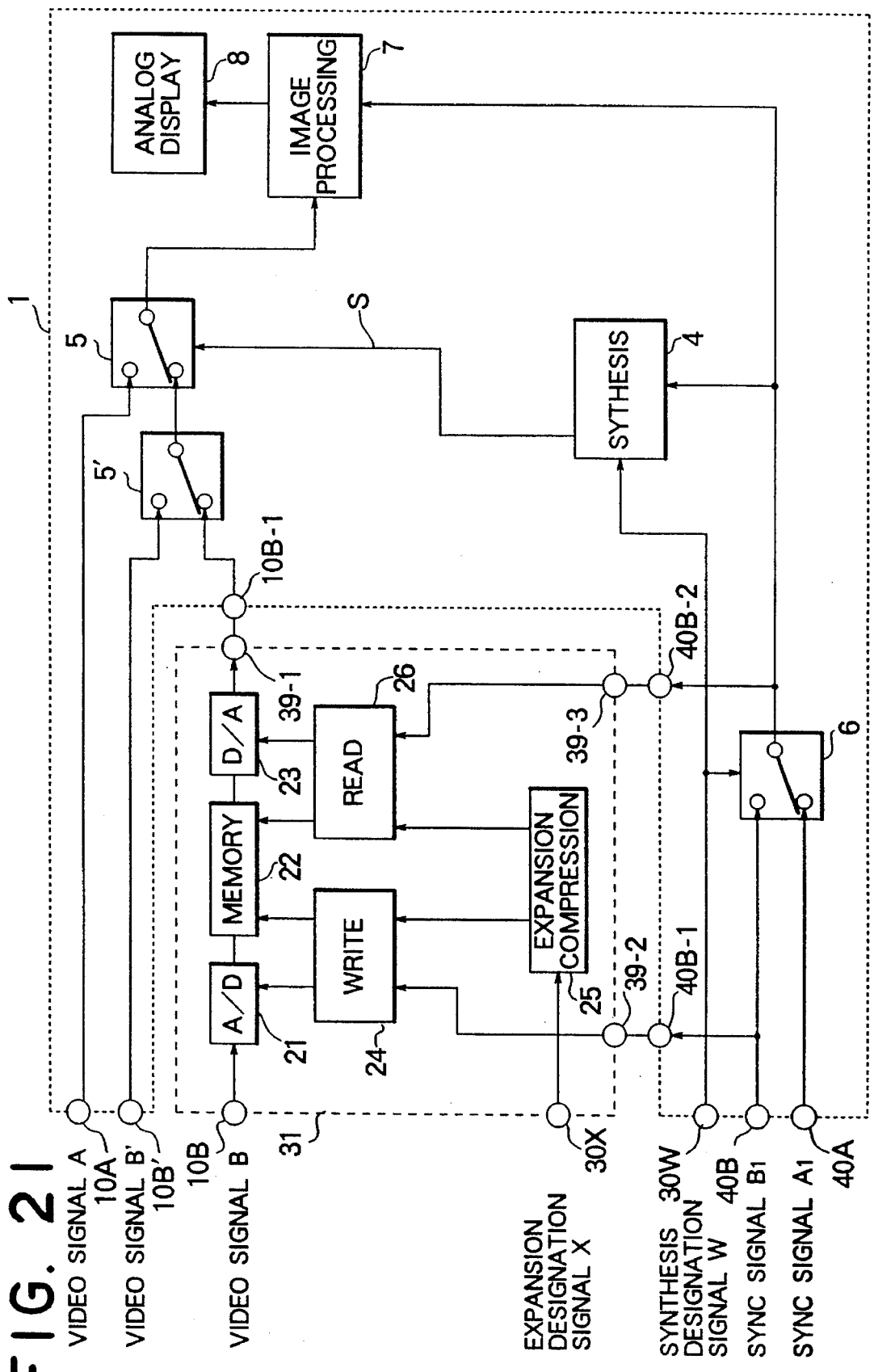

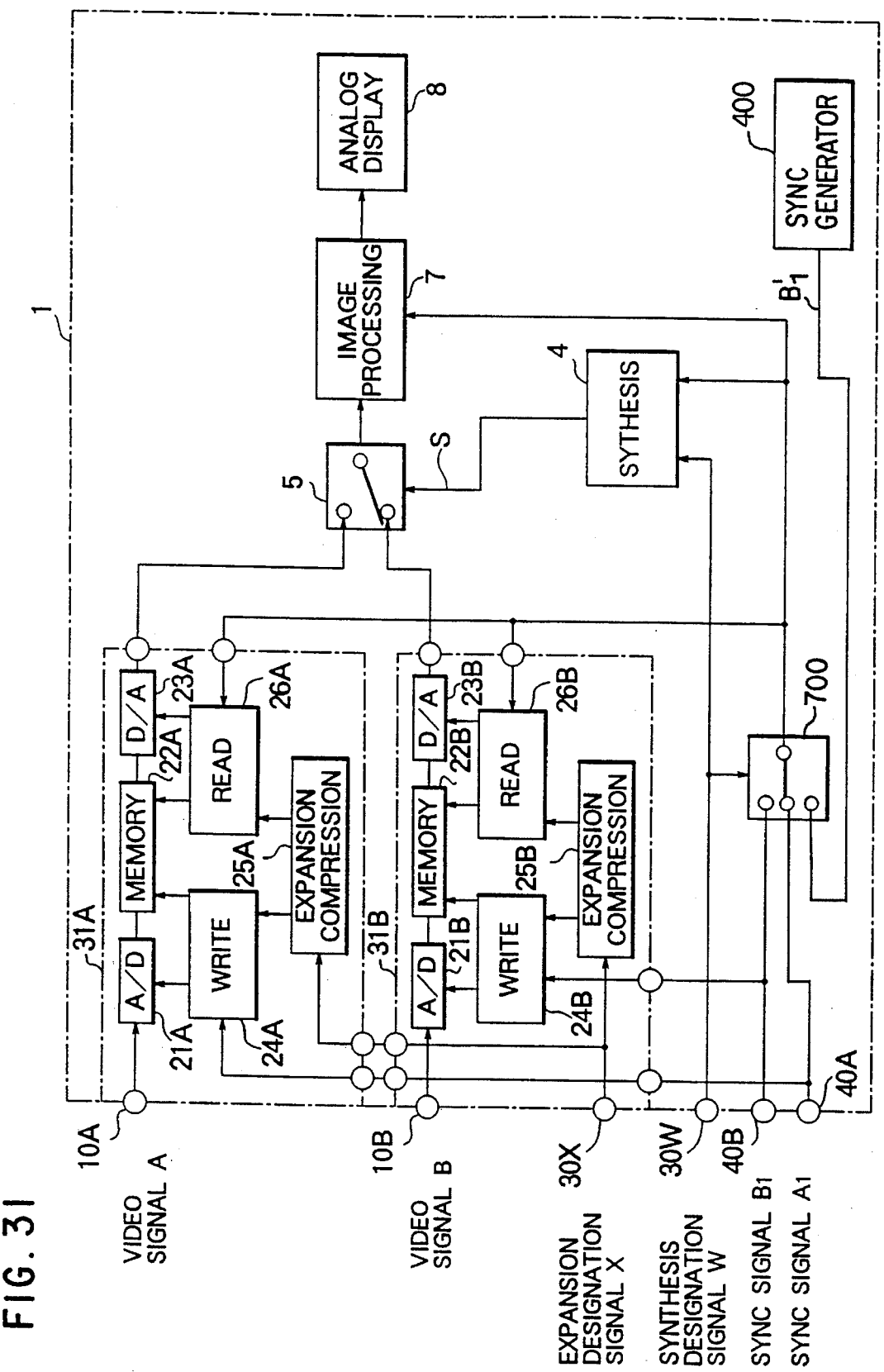

VIDEO DISPLAY APPARATUS FOR DISPLAYING A PLURALITY OF VIDEO SIGNALS HAVING DIFFERENT SCANNING FREQUENCIES AND A MULTI-SCREEN DISPLAY SYSTEM USING THE VIDEO DISPLAY APPARATUS

This application is a continuation-in-part of application Ser. No. 08/227,019, filed on Apr. 13, 1994, abandoned.

BACKGROUND OF THE INVENTION

The present invention relates to a video display apparatus for fetching and displaying a video signal, or more in particular to a video display apparatus capable of fetching a plurality of video signals having different scanning frequencies (horizontal scanning frequencies and vertical scanning frequencies) and displaying on the same screen by synthesis or switching, and a screen display system using the same video display system.

In conventional video display apparatuses, which typically include common television receivers and computer display units, in the case where an attempt is made to display a plurality of types of video signals on the same screen by synthesis or switching, the video signals intended for display are limited to those having the same scanning frequency (horizontal scanning frequency and the vertical scanning frequency) or to the use with the display unit adapted for multi-scanning.

These techniques are disclosed, for example, in JP-A-61-127285, JP-A-61-128691, JP-A-62-208766, JP-A-63-142783, and JP-A-4-342295. A multi-screen display system, on the other hand, is disclosed in JP-B-50-32009 and JP-A-4-280291.

There is a demand, however, for displaying video signals of different scanning frequencies by synthesis or switching on the same screen. The Hi-Vision video signal and the video signal for the personal computer, for example, has a scanning frequency different from that of the video signal according to the standard NTSC system. It is therefore needless to cite specific examples to consider it convenient if a static image such as statistical data prepared on a personal computer can be displayed by synthesis or switching on a dynamic image of the video signal based on the NTSC system.

SUMMARY OF THE INVENTION

An object of the present invention is to provide a video display apparatus capable of displaying a plurality of video signals having different scanning frequencies by synthesis or switching on the same screen.

Another object of the present invention is to provide a screen display system configured of a plurality of video display apparatuses described above.

According to one aspect of the invention, there is provided a video display apparatus comprising a housing, a plurality of video input terminals on the housing for receiving a plurality of video signals having different scanning frequencies, an expansion/compression signal input terminal for receiving an expansion/compression designation signal for expanding/compressing any one of the video signals, a synthesis signal input terminal for receiving a synthesis designation signal for synthesizing any of the video signals, a plurality of sync signal input sections for supplying vertical and horizontal sync signals corresponding to the video signals respectively, a sync switching circuit for selecting one of the sync signals, an expansion/compression processing circuit replaceably mounted on the housing for receiving a plurality of video signals having different scanning frequencies, expanding/compressing the video signals, and producing at least a video signal expanded/compressed in synchronism with the sync signal selected by the sync switching circuit, a video signal synthesis circuit for synthesizing at least one of the video signals produced from the expansion/compression processing circuit with another video signal and producing a synthesized video signal or a plurality of the video signals containing the another video signal, and an image processing circuit for generating a video display signal by having the video signal from the video signal synthesis circuit synchronized with the sync signal selected by the sync switching circuit and applying the particular video display signal to a display unit.

Each of the expansion/compression processing circuits includes an A-D conversion circuit for converting an analog video signal into a digital video signal, a memory for storing the digital video signal, a D-A conversion circuit for converting the digital video signal stored in the memory into an analog video signal and applying it to the video signal synthesis circuit, a write control circuit for controlling the timing of A-D conversion on the A-D conversion circuit and the operating of writing the digital video signal thus converted into the memory in synchronism with any of the sync signals, a read control circuit for controlling the operation of reading the digital video signal from the memory in synchronism with one of the sync signals selected by the sync signal switching circuit, and an expansion/compression control circuit for controlling the expansion/compression of the digital video signal in accordance with the expansion/compression designation signal.

Each of the D-A conversion circuits of the expansion/compression processing circuits is connected to one of the video signal synthesis circuits, which is in turn adapted to synthesize the analog video signal in analog fashion in accordance with the synthesis designation signal and one of the sync signals selected by the sync switching circuit, and produces the analog video signal thus synthesized or each of the analog video signals.

Each of the D-A conversion circuits of the expansion/compression processing circuits is connected to each of the video signal synthesis circuits respectively. The input to the first stage of the video signal synthesis circuits is connected to a clamp circuit for generating a DC component of one of the analog video signals. The output of the first-stage video signal synthesis circuit is connected in cascade to the input of the video signal synthesis circuit in the next stage sequentially. The last-stage video signal synthesis circuit synthesizes in analog fashion at least an analog video signal produced from the video signal synthesis circuits in accordance with the synthesis designation signal and one of the sync signals selected by the sync signal switching circuit, thereby producing a synthesized analog video signal. As an alternative, an analog video signal is produced from the first-stage video signal synthesis circuit or from the last-stage video signal synthesis circuit.

At least one of the sync signal input sections includes a sync signal generation circuit for supplying one of the sync signals corresponding to the video signals. The particular sync signal generation circuit is built in the video display apparatus.

The display unit includes an analog one and a digital one.

Firstly, the video display apparatus according to the invention comprises a housing, first and second video input terminals mounted on the housing for receiving first and second analog video signals having different scanning frequencies, an expansion/compression signal input terminal for receiving an expansion/compression designation signal for expanding/compressing any one of the first and second analog video signals, a synthesis signal input terminal for receiving a synthesis designation signal for synthesizing the first and second analog video signals, first and second sync signal input sections at least for receiving or supplying the first and second vertical and horizontal sync signals correspondingly to the first and second analog video signals respectively, a sync switching circuit for selecting and producing any one of the first and second sync signals supplied from at least the first and second sync signal input sections in accordance with the synthesis designation signal, a clamp circuit for reproducing and producing the DC component of the first analog video signal in response to the first analog video signal, an expansion/compression processing circuit for converting the second analog video signal into a second digital video signal, expanding/compressing a second digital video signal in response to the second sync signal, the expansion/compression designation signal and the first sync signal selected by the sync switching circuit, and producing a third analog video signal expanded/compressed in synchronism with at least the first and second sync signals respectively, a video signal synthesis circuit for receiving the first analog video signal produced from the clamp circuit and the third analog video signal produced from the expansion/compression processing circuit, generating a fourth analog video signal by synthesizing the first and third analog video signals in analog fashion in accordance with the synthesis designation signal and one of the first and second sync signals selected by the sync switching circuit, and producing the fourth analog video signal or one of the first and third analog video signals as an output, and an image processing circuit for generating and applying to the display unit a video display signal by having one of the first, third and fourth analog video signals from the video signal synthesis circuit synchronized with one of the first and second sync signals selected by the sync switching circuit.

Specifically, the expansion/compression processing circuit described above, which is mounted replaceably on the housing, includes an A-D conversion circuit for converting the second analog video signal into the second digital video signal, a memory for storing the second digital video signal, a D-A conversion circuit for converting the second digital video signal stored in the memory into the third analog video signal and applying the resulting signal to the video signal synthesis circuit, a write control circuit for controlling the timing of A-D conversion on the A-D conversion circuit and the operation of writing the converted second digital video signal into the memory in synchronism with the second sync signal, a read control circuit for controlling the operation of reading the second digital video signal from the memory in synchronism with one of the first and second sync signals selected by the sync switching circuit, and an expansion/compression control circuit for controlling the expansion/compression of the second digital video signal in accordance with the expansion/compression designation signal.

Also, the expansion/compression processing circuit, which is mounted replaceably on the housing, includes an A-D conversion circuit for converting the second analog video signal into the second digital video signal, a memory for storing the second digital video signal, a D-A conversion circuit for converting the second digital video signal stored in the memory into the third analog video signal and applying the resulting signal to the video signal synthesis circuit, a write control circuit for controlling the operation of A-D conversion timing of the A-D conversion circuit and the operation of writing into the memory the converted second digital video signal in synchronism with the second sync signal, a read control circuit for controlling the operation of reading the second digital video signal from the memory in synchronism with one of the first and second sync signals selected by the sync switching circuit, and an expansion/compression control circuit for controlling the write control circuit and the read control circuit in accordance with the expansion/compression designation signal, wherein the sync switching circuit for receiving the first and second sync signals transferred from the video display unit to and arranged in the expansion/compression processing circuit.

Further, the expansion/compression processing circuit, which is mounted replaceably on the housing, includes an A-D conversion circuit for converting the second analog video signal into the second digital video signal, a memory for storing the second digital video signal, a D-A conversion circuit for converting the second digital video signal stored in the memory into the third analog video signal and applying the resulting signal to the video signal synthesis circuit, a write control circuit for controlling the operation of A-D conversion timing of the A-D conversion circuit and the operation of writing the converted second digital video signal into the memory in synchronism with the second sync signal, a read control circuit for controlling the operation of reading the second digital video signal from the memory in synchronism with any one of the first and second sync signals selected by the sync switching circuit, and an expansion/compression control circuit for controlling the expansion/compression of the second digital video signal in accordance with the expansion/compression designation signal, wherein the expansion/compression control circuit includes a first sync switching circuit for receiving the first and second sync signal, and the video display apparatus includes a second sync switching circuit for receiving the first sync signal and the second sync signal through the first sync switching circuit.

Secondly, the video display apparatus according to the invention comprises a housing, first and second video input terminals mounted on the housing for receiving first and second analog video signals having different scanning frequencies respectively, an expansion/compression signal input terminal for receiving an expansion/compression designation signal for expanding/compressing one of the first and second analog video signals, a synthesis signal input terminal for receiving a synthesis designation signal for synthesizing the first and second video signals, first and second sync signal input sections at least for receiving or supplying the first and second vertical and horizontal sync signals corresponding to the first and second analog video signals, a sync switching circuit for selecting and producing one of the first and second sync signals supplied from at least the first and second sync signal input means in accordance with the synthesis designation signal, an A-D conversion circuit for converting the first analog video signal to a first digital video signal, an expansion/compression processing circuit for converting the second analog video signal to a second digital video signal, expanding/compressing the second digital video signal in accordance with the second sync signal, the expansion/compression designation signal and the first sync signal selected by the sync switching circuit, and producing a third digital video signal expanded/compressed in synchronism with at least one of the first and second sync signals, a video signal synthesis circuit for receiving the first digital video signal produced from the first A-D conversion circuit and the third digital video signal produced from the expansion/compression processing circuit, generating and producing as an output a fourth digital video signal by digitally synthesizing the first and third digital video signals in accordance with the synthesis designation signal and one of the first and second sync signals selected by the sync switching circuit, or producing as an output one of the first and third digital video signals, a D-A conversion circuit for converting the first, third or fourth digital video signal from the video signal synthesis circuit into the fourth analog video signal at the timing synchronized with one of the first and second sync signals selected by the sync switching circuit, and an image processing circuit for generating a video display signal from the fourth analog video signal produced by the D-A conversion circuit in synchronism with one of the first and second sync signals selected by the sync switching circuit and applying the resulting video display signal to the display unit.

More specifically, the expansion/compression processing circuit, which is mountable replaceably on the housing, includes a second A-D conversion circuit for converting the second analog video signal into the second digital video signal, a memory for storing the second digital video signal, a write control circuit for controlling the operation of writing into the memory the second digital video signal converted at the timing of A-D conversion by the A-D conversion circuit in synchronism with the second sync signal, a read control circuit for controlling the operation of reading the third digital video signal from the memory in synchronism with one of the first and second sync signals selected by the sync switching circuit and applying the third digital video signal to the video signal synthesis circuit, and an expansion/compression control circuit for controlling the expansion/compression of the third digital video signal in accordance with the expansion/compression designation signal.

Thirdly, the video display apparatus according to the invention comprises a housing, first and second video input terminals mounted on the housing for receiving the first and second digital video signals respectively having different scanning frequencies, an expansion/compression signal input terminal for receiving an expansion/compression designation signal for expanding/compressing one of the first and second digital video signals, a synthesis signal input terminal for receiving a synthesis designation signal for synthesizing the first and second video signals, first and second sync signal input sections for at least receiving or supplying the first and second vertical and horizontal sync signals corresponding to the first and second digital video signals respectively, a sync switching circuit for selecting and producing one of the first and second sync signals supplied from at least the first and second sync signal input means in accordance with the synthesis designation signal, a first D-A conversion circuit for converting the first digital video signal into the first analog video signal, an expansion/compression processing circuit for expanding/compressing the second digital video signal in accordance with the first sync signal and the expansion/compression designation signal selected by the second sync signal and the sync switching circuit in response to the second digital video signal and producing the second analog video signal expanded/compressed in synchronism with at least one of the first and second sync signals, a video signal synthesis circuit for receiving the first analog video signal produced from the first D-A conversion circuit and the second analog video signal produced from the expansion/compression processing circuit, generating the third analog video signal by synthesizing the first and second analog video signals in analog fashion in accordance with the synthesis designation signal and one of the first and second sync signals selected by the sync switching circuit, and producing the third analog video signal or the second analog video signal, and an image processing circuit for generating a video display circuit by having one of the first, second and third analog video signals from the video signal synthesis circuit synchronized with one of the first and second sync signals selected by the sync switching circuit and applying the video display signal to the display.

More specifically, the expansion/compression processing circuit, which is replaceably mounted on the housing, includes a memory for storing the second digital video signal, a write control circuit for controlling the operation of writing the second digital video signal into the memory, a read control circuit for controlling the operation of reading the second digital video signal from the memory in synchronism with one of the first and second sync signals selected by the sync switching circuit, an expansion/compression control circuit for controlling the expansion/compression of the second digital video signal in accordance with the expansion/compression designation circuit.

Fourthly, the video display apparatus according to the invention comprises a housing, first and second video input terminals for receiving the first and second digital video signals having different scanning frequencies, an expansion/compression signal input terminal for receiving an expansion/compression designation signal for expanding/compressing one of the first and second digital video signals, a synthesis signal input terminal for receiving a synthesis designation signal for synthesizing the first and second video signals, first and second sync signal input sections for at least receiving or supplying the first and second vertical and horizontal sync signals corresponding to the first and second digital video signals respectively, a sync switching circuit for selecting and producing one of the first and second sync signals supplied from at least the first and second sync signal input sections in accordance with the synthesis designation signal, an expansion/compression processing circuit for expanding/compressing the second digital video signal by the second sync signal, the expansion/compression designation signal and the first sync signal selected by the sync switching circuit in synchronism with at least one of the first and second sync signals and producing the third digital video signal expanded/compressed in synchronism with at least one of the first and second sync signals, a video signal synthesis circuit for receiving the first digital video signal and the third digital video signal produced from the expansion/compression processing circuit, generating the fourth digital video signal by digitally synthesizing the first and third digital video signals in accordance with the synthesis designation signal and one of the first and second sync signals selected by the sync switching circuit, and producing the fourth digital video signal or one of the first and third digital video signals, a D-A conversion circuit for converting the third or fourth digital video signal from the video signal synthesis circuit into the fourth digital video signal at the timing synchronized with one of the first and second sync signals selected by the sync switching circuit, and an image processing circuit for generating a video display signal by having the fourth analog video signal from the D-A conversion circuit synchronized with one of the first and second sync signals selected by the sync switching circuit and applying the particular video display signal to the display unit.

More specifically, the expansion/compression processing circuit, which is replaceably mounted on the housing, includes a memory for storing the second digital video signal, a write control circuit for controlling the operation of writing the second digital video signal into the memory in synchronism with the second sync signal, a read control circuit for controlling the operation of reading the third digital video signal from the memory in synchronism with one of the first and second sync signals selected by the sync switching circuit, and an expansion/compression control circuit for controlling the expansion/compression of the third digital video signal in accordance with the expansion/compression designation signal.

According to a second aspect of the invention, there is provided a multi-screen display system comprising a plurality of video signal sources, an AV controller for receiving a plurality of video signals from the video signal sources, a centralized control console for selecting the video signals received by the AV controller, and at least a video display unit connected to the AV controller for displaying a plurality of video signals selected by the centralized control console, wherein the video display unit includes a housing, a plurality of video input terminals mounted on the housing for receiving the video signals having different scanning frequencies, an expansion/compression signal input terminal for receiving an expansion/compression designation signal for expanding/compressing one of the video signals, a synthesis signal input terminal for receiving a synthesis designation signal for synthesizing any of the video signals, a plurality of sync signal input sections for supplying vertical and horizontal sync signals corresponding to the video signals, a sync signal switching circuit for selecting one of the sync signals, an expansion/compression processing circuit mounted replaceably on the housing for receiving the video signals having different scanning frequencies, expanding/compressing the video signals, expanding/compressing the video signals and producing at least a video signal expanded/compressed in synchronism with the sync signal selected by the sync switching circuit, a video signal synthesis circuit for synthesizing at least one of the video signals produced from the expansion/compression processing circuit with another video signal and producing a synthesized video signal or a plurality of video signals containing the another video signal, an image processing circuit for generating a video display signal by having the video signal from the video signal synthesis circuit synchronized with the sync signal selected by the sync switching circuit and applying the video display signal to the display unit.

The video signal sources include at least an engineering workstation (EWS), a video graphic array (VGA) signal source, a National Television System Committee (NTSC) signal source and a high-definition or Hi-Vision (HD) signal source.

The video display apparatus for the multiscreen display system further includes a lecture table used by the lecturer, which table is operated by the lecturer to supply one of the video signals to the video display apparatus together with the sync signal corresponding to the video signal.

Four video display apparatuses are connected to the AV controller corresponding to the signal sources of EWS, VGA, NTSC and HD respectively.

The centralized control console supplies one of the video signals to at least one of the video display apparatuses together with the sync signal corresponding to the particular video signal.

The video display apparatus usable for the multi-screen display system is of any of the first to fourth types described above.

In the configuration described above according to the invention, assume that the first video signal is associated with 1280 dots of pixels in horizontal direction and 1024 dots of pixels in vertical direction on the EWS, the second video signal with 640 dots of pixels in horizontal direction and 480 dots of pixels in vertical direction in VGA, and that the first video signal is displayed directly on the display. The second video signal is stored in a memory by taking out a predetermined portion in a display screen having 640 horizontal dots and 480 vertical dots. The second video signal thus stored is expanded. The second video signal thus expanded is read from the memory in synchronism with the sync signal of the first video signal. The second video signal read from the memory and the first video signal are both EWS signals having the same number of pixels and coincide with each other in the scanning period, thereby making it possible to synthesize both video signals. The video signal thus synthesized can be displayed on the display unit as a single video signal. A plurality of video display apparatuses described above are arranged to realize a multi-screen display system.

Also, with an expansion/compression processing circuit board inserted in the video display apparatus for performing the expansion/compression processing, a plurality of video signals can be displayed by switching between life size display, expansion, compression, synthesis, etc. on the same screen. Also, a plurality of the video display apparatuses with an expansion/compression circuit board inserted therein are used to configure a multi-screen display system, so that even when the number of expanded screens increases, there is no need of increasing the number of the housing separate from the video display units.

Further, a printer interface can be mounted on the video display apparatus for converting the synthesized video signal into a print signal. As a result, a hard copy of the image can be taken by connecting the video printer to the video display system. The printer interface used is for digital applications in the case where the video signal is digital and for analog applications when the video signal is analog one.

Furthermore, the video signal of a pointer from the pointer generator on the lecture table is transmitted to the video display system, and then through an AV controller to a signal source, so that a pointer moving in the same manner as on the video display apparatus can be displayed on the screen of the signal source.

BRIEF DESCRIPTION OF THE DRAWINGS

FIG. 1A is a diagram showing a circuit configuration of a video display apparatus according to a first embodiment of the invention.

FIG. 1B shows waveforms representing examples of synthesis of video signals.

FIG. 1C is a diagram for explaining the synthesis of video signals on the screen.

FIG. 12 is a diagram showing the circuit configuration of another example of the video display system.

FIG. 21 is a diagram showing a circuit configuration showing another example of the video display system.

FIG. 31 is a diagram showing the circuit configuration showing another example of the video display system.

DESCRIPTION OF THE PREFERRED EMBODIMENTS

Figure 10:
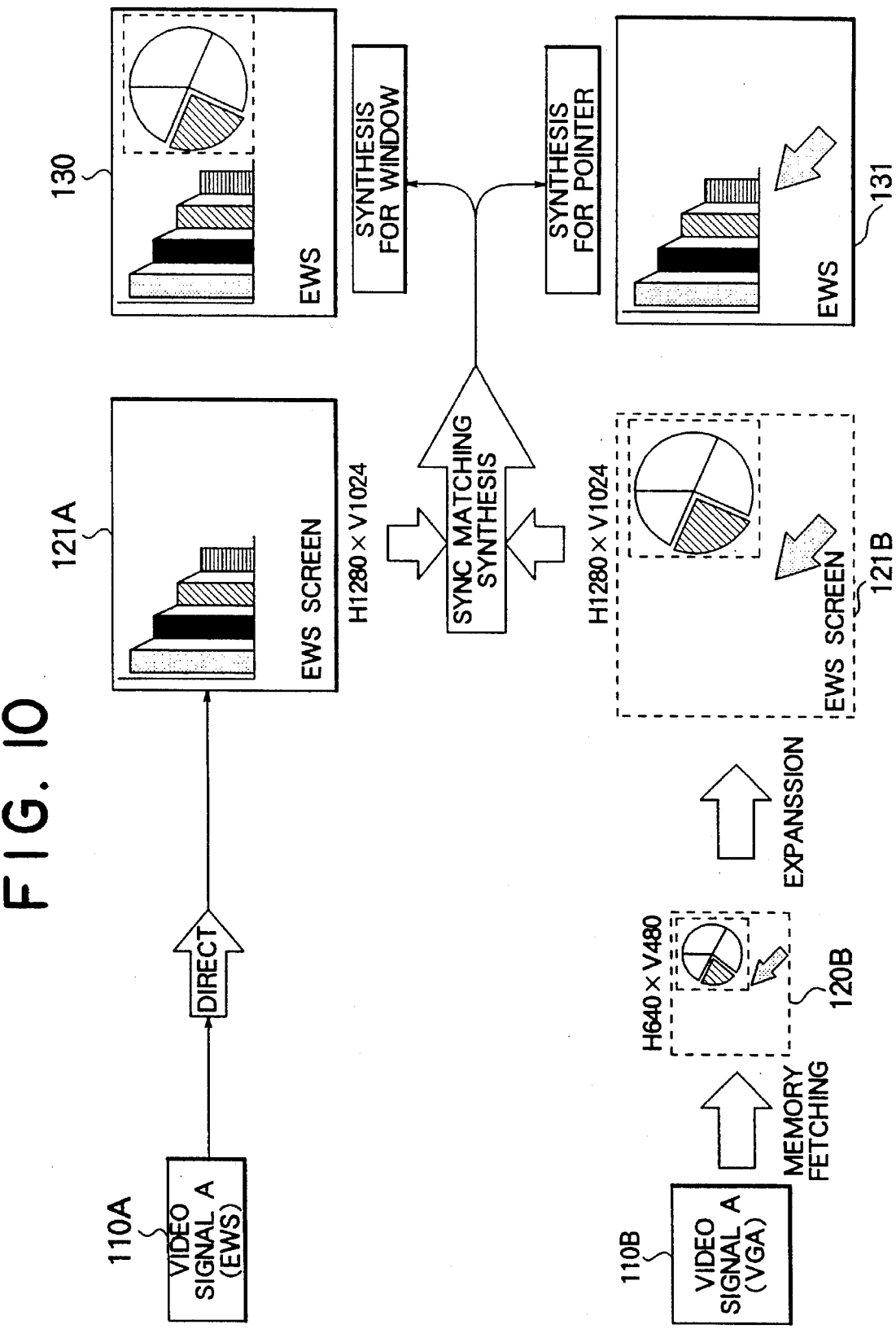
FIG. 10 is a diagram for explaining the outline of the invention.

An embodiment of the invention will be described. For facilitating the understanding of the present invention, brief explanation will be made about the invention with reference to FIG. 10. Assume that a video signal A is based on EWS (with 1280 horizontal by 1024 vertical dots in terms of the number of pixels) and a video signal B on VGA (Video Graphic Array, with 640 horizontal by 480 vertical dots in terms of the number of pixels). These two systems have different numbers of display pixels and hence different scanning frequencies. The video signals A and B having different scanning frequencies described above are synthesized and displayed according to the present invention.

Assume that the video signal A from a signal source 110A can be displayed directly as a picture 121A without being processed. The video signal B from a signal source 110B, on the other hand, is a predetermined portion to be synthesized of a display screen 120B of 640 horizontal by 480 vertical dots which is taken out and stored in a video memory after A-D conversion.

The video signal B stored in the video memory is expanded to produce a hypothetical display screen 121B of the video signal A based on EWS. In this case, the video signal B is not always expanded but may be compressed. The compression, however, is a kind of expansion, that is, the expansion by a multiple which is a fraction below a decimal point. The expansion, therefore, is assumed to include the compression in the description that follows.

A hypothetical screen 121B obtained by expanding the display screen 120B is read out of the video memory in synchronism with the vertical/horizontal sync signal of the display screen 121A of the video signal A. The display screen 121A and the hypothetical display screen 121B read out of the video memory have the same number of pixels and are coincident in the scanning period with each other, and therefore the video signals A, B can be synthesized appropriately by a video switch or the like.

The video signal thus synthesized is processed as a video signal and can be displayed on the display. It is possible to display, for example, a display screen having a window synthesized of the display screen 120B of the video signal B different in frequency on the display screen 121A of the video signal A, or a display screen 131 having a pointer synthesized of the display screen 120B of the video signal B on the display screen 121A of the video signal A.

Now, embodiments of the invention will be explained.

A video display system according to a first embodiment of the invention is shown in the block diagram of FIG. 1A. According to this embodiment, two analog input video signals having different scanning frequencies are synthesized in analog fashion and are displayed on the same analog display.

In FIG. 1A, the video display system 1 according to an embodiment of the invention defined by dotted line comprises an input terminal 10A for an analog input video signal A, an input terminal 10B for an analog input video signal B, an input terminal 30X for an expansion designation signal, an input terminal 30W for a synthesis designation signal, an input terminal 40A for a sync signal for the video signal A (indicating the horizontal sync signal and the vertical sync signal, and hereinafter referred to simply as the sync signal $A_1$), and an input terminal 40B for the video signal for the video signal B (indicating the horizontal sync signal and the vertical sync signal, and hereinafter referred to simply as the sync signal B1).

The video display system 1 further comprises a clamp circuit 3 for fetching the video signal A and reproducing a DC component thereof as an output, an expansion processing circuit 31, which is an expansion/compression processing circuit with analog input and analog output, for expanding (or compressing, which is interpreted to be a class of expansion and included in the expansion, as described above) the analog video signal B from the input terminal 10B and producing an analog signal from the output of the D-A conversion circuit 23, a synthesis control circuit 4 for controlling the synthesis of two screens based on a synthesis designation signal W to an input terminal 30W, a sync switching circuit 6 for switching and producing one of the sync signals B and A, a screen synthesis circuit 5 for synthesizing in analog fashion the video signal A clamped on the clamp circuit 3 and the video signal B expanded by the expansion/compression processing circuit 31, an image processing circuit 7 for processing the synthesized video signal in preparation for display, and an analog display 8 for displaying the image-processed video signals.

The expansion/compression processing circuit 31 includes an A-D conversion circuit 21 for converting an analog signal into a digital signal, a memory circuit 22 for storing the video signals digitally converted, a D-A conversion circuit 23 for converting the digital signal from the memory circuit 22 into an analog signal, a write control circuit for controlling the timing of A-D conversion by the A-D conversion circuit 21 and the operation of writing the digital signal into the memory circuit 22 after A-D conversion, a read control circuit 26 for controlling the operation of reading the digital signal from the memory circuit 22 and the timing of D-A conversion by the D-A conversion circuit 23 of the digital signal after reading, and an expansion/compression control circuit 25 for controlling the write control circuit 24 and the read control circuit 26. The screen synthesis circuit 5 and the sync switching circuit 6 use an analog switch and the like, and the synthesis control circuit 4 is made up of a logic circuit and a counter for counting the synthesis position on the scanning line.

Now, the circuit operation will be explained. In FIG. 1A, the input terminal 10A is supplied with the video signal A, and after the DC component of the video signal A is reproduced at the clamp circuit 3, the video signal A is applied to the screen synthesis circuit 5 as a signal to be synthesized. The input terminal 10B is supplied with the video signal B, and the expansion/compression processing circuit 31 expands a predetermined portion of the video signal B, and applies it as the other video signal to be synthesized to the screen synthesis circuit 5 based on the output of the sync switching circuit 6.

The image processing circuit 7 processes the video signal synthesized at the screen synthesis circuit 5 by amplitude adjustment or contour correction for display, and sends the resulting signal to the analog display 8 for actual display.

In the above-mentioned circuit operation, the following four display modes are available for the video display system 1 according to the conditions of the screen synthesis circuit 5 and the sync switching circuit 6.

(1) Only the video signal A applied to the input terminal 10A is displayed directly on the analog display 8.

(2) Only the video signal B applied to the input terminal 10B is expanded, and is displayed on the analog display 8 in synchronism with the sync signal B1.

(3) Only the video signal B applied to the input terminal 10B is expanded, and is displayed on the analog display 8 in synchronism with the sync signal A1.

(4) The video signal A and the video signal B applied to the input terminal 10A and the input terminal 10B respectively are synthesized, and the video signals A and B are displayed on the analog display 8 in synchronism with the sync signal $A_1$.

Each of these modes can be realized in the following manner.

(1) In the case where only the video signal A applied to the input terminal 10A is displayed directly, the sync switching circuit 6 passes the sync signal $A_1$, and only the video signal A is passed by the screen synthesis circuit 5. In other words, the screen synthesis circuit 5 produces only the video signal A, and the image processing circuit 7 processes the video signal synchronized with the sync signal $A_1$. The analog display 8 displays only the video signal A.

(2) In the case where only the video signal B applied to the input terminal 10B is expanded and displayed in synchronism with the video signal B, the sync switching circuit 6 passes the sync signal $B_1$ and the screen synthesis circuit 5 allows the passage of only the expansion video signal B processed at the expansion/compression processing circuit 3. More specifically, the screen synthesis circuit 5 produces only the expanded video signal B, and the image processing circuit 7 subjects the expanded video signal B to the image processing synchronous with the sync signal $B_1$ and displays only the expanded video signal B on the analog display 8.

The expansion/compression processing circuit 31 expands the video signal B, and produces the expanded video signal B in synchronism with the sync signal $B_1$ of the sync switching circuit 6.

In other words, in FIG. 1A, the expansion/compression control circuit 25, based on the expansion control signal A applied to the input terminal 30X, controls the write control circuit 24 and the read control circuit 26. First, the write control circuit 24 controls the timing of operation of the A-D conversion circuit 21 and the memory circuit 22 in synchronism with the sync signal $B_1$. The A-D conversion circuit 21 converts the video signal B inputted to the input terminal 10B into a digital signal in synchronism with the sync signal $B_1$ applied to the input terminal 40B.

The memory circuit 22 stores temporarily the portion to be expanded by the digital signal subjected to A-D conversion. Next, the read control circuit 26, associated only with the expansion of the video signal B, controls the timing of the memory circuit 22 and the D-A conversion circuit 23 in synchronism with the sync signal $B_1$ of the sync switching circuit 6. The memory circuit 22 expands and reads out the digital signal thus stored, in synchronism with the switching output of the sync signal $A_1$ or the sync signal $B_1$ of the switching circuit 6. The D-A conversion circuit 23 converts the digital signal read out into an analog signal, thereby producing an analog video signal of a scanning frequency in synchronism with the sync signal $B_1$.

(3) In the case where only the video signal B applied to the input terminal 10B is expanded and displayed in synchronism with the sync signal $A_1$, the sync switching circuit 6 passes the sync signal $A_1$, and the screen synthesis circuit 5 allows the passage of only the expanded video signal B processed at the expansion/compression processing circuit 32. More specifically, the screen synthesis circuit 5 produces only the expanded video signal B, and the image processing circuit 7 displays only the expanded video signal B on the analog display 8 after subjecting the expanded video signal B to the image processing in synchronism with the sync signal $A_1$.

The expansion/compression processing circuit 31 expands the video signal B, produces the expanded video signal B in synchronism with the sync signal $A_1$ of the sync switching circuit 6. The expansion processing as referred to here means, for example, the double expansion of the pixel data of the video signal B when the pixel data are read in duplicate from a basic pixel arrangement.

(4) In the case where the video signal A and the video signal B applied to the input terminal 10A and the input terminal 10B respectively are synthesized and displayed, the sync switching circuit 6 passes the sync signal $A_1$, and the screen synthesis circuit 5 produces the expanded video signal B and the video signal A synchronized with the video signal A at the expansion/compression processing circuit 31 by switching by the signal from the synthesis control circuit 4 in order to secure the same frequency as the video signal A. More specifically, a synthesized screen of the video signal A from the screen synthesis circuit 5 and the expanded video signal B of the same frequency is produced, and the image processing circuit 7 displays the synthesized screen on the analog display 8 after image-processing the synthesized screen synchronous with the sync signal $A_1$.

In the mode (3) described above, the expansion/compression circuit 31 expands the video signal B by the processes described below, and produces the expanded video signal B in synchronism with the sync signal $A_1$ of the sync switching circuit 6.

In other words, in FIG. 1A, the expansion/compression control circuit 25 controls the write control circuit 24 and the read control circuit 26 based on the expansion control signal X applied to the input terminal 30X. As a result, first, the write control circuit 24 controls the timing of operation of the A-D conversion circuit 21 and the memory circuit 22 in synchronism with the sync signal $B_1$. The A-D conversion circuit 21, in synchronism with the sync signal $B_1$ applied to the input terminal 40B, converts the video signal B applied to the input terminal 10B into a digital signal. The memory circuit 22 temporarily stores the portion to be expanded of the digital signal subjected to A-D conversion.

As the next step, the read control circuit 26, in view of the need of synthesizing a screen from the video signal B and the video signal A, controls the timing of the memory circuit 22 and the D-A conversion circuit 23 in synchronism with the output of the sync signal $A_1$ of the switching circuit 6. More specifically, the memory circuit 22 expands and reads out the stored digital signal in synchronism with the switching output of the sync signal $A_1$ of the switching circuit 66. The D-A conversion circuit 23 converts the digital signal thus read out into an analog signal, and produces an analog video signal based on the scanning frequency of the sync signal $A_1$.

In the description of the display modes (1) to (4) above, the display frequency of the image processing circuit 7 or the analog display 8 is not explained. The analog display 8, however, is described on the assumption that it is what is called a multi-scan display capable of displaying at least the scanning frequencies of the video signal A and the video signal B. A similar assumption is made in the description that follows of the embodiments of the invention.

It is needless to say that the screen synthesis of the video signal A and the video signal B is possible also with another assumption, for example, a single-scan display in which the analog display 8 corresponds only to the frequency of the video signal A. In the case where the analog display 8 is of single-scan type corresponding to the video signal A, i.e., to the sync signal $A_1$, however, as described with reference to the display mode (2) according to the first embodiment of the invention, display of the video signal A synchronous with the sync signal $B_1$ is impossible and therefore the function of the display mode is somewhat limited.

Further, the first embodiment shown in FIG. 1A definitely includes a clamp circuit 3 for reproducing the DC component of the video signal A. If the DC component of the output of the D-A conversion circuit 23 and the video signal A is determined in advance, however, the clamp circuit 3 is eliminated.

According to the first embodiment shown in FIG. 1A, the video display system 1 of the invention is capable of displaying a synthesized screen of the video signal A and the video signal B, and direct display of the video signal A and expanded display of the video signal B based on the inputs of the video signal A and the video signal B having different scanning frequencies.

An example of synthesizing the video signal A and the video signal B in the display mode (4) above and displaying it on the analog display 8 will be explained with reference to FIGS. 1B and 1C showing waveforms and display screens for each horizontal scanning period of the video signals. The waveform (c) in FIG. 1B represents a video signal A' with the DC component of the video signal A reproduced by the clamp circuit 3, and the waveform (b) of FIG. 1B a video signal B' synchronized with the video signal A' by the expansion/compression processing circuit 31. The waveform (d) of FIG. 1B, on the other hand, represents a synthesis control signal S produced from the synthesis control circuit 4 with the sync signal $A_1$ supplied to the synthesis control circuit 4 and the synthesis designation signal W supplied to the synthesis control circuit 4 by switching the sync switching circuit 6. This synthesis control signal S is for designating which vertical or horizontal portion of the scanning line is selected to start synthesis in the case where the video signal B is for displaying a window, and FIG. 1B concerns a portion of the horizontal scanning for synthesis. This synthesis control signal S is applied to the screen synthesis circuit 5, so that when the synthesis control signal S is at high level as shown in (d) of FIG. 1B, for example, the thick portion of the waveform of the video signal A' is synthesized with the thick portion of the waveform of the next video signal B', thereby producing a synthesized video signal Z having a waveform as shown in (a) of FIG. 1. The video signal Z is produced as a display signal by the image processing circuit 7 and displayed on the analog display 8. In this way, as shown in FIG. 1C, the video signal A is synthesized with the video signal B in window fashion as shown in FIG. 1C, and displayed as a video signal Z on the analog display 8.

The aforementioned synthesis of video signals is only an example, and similar synthesis of video signals can be executed also in the embodiments described below.

Figure 2:
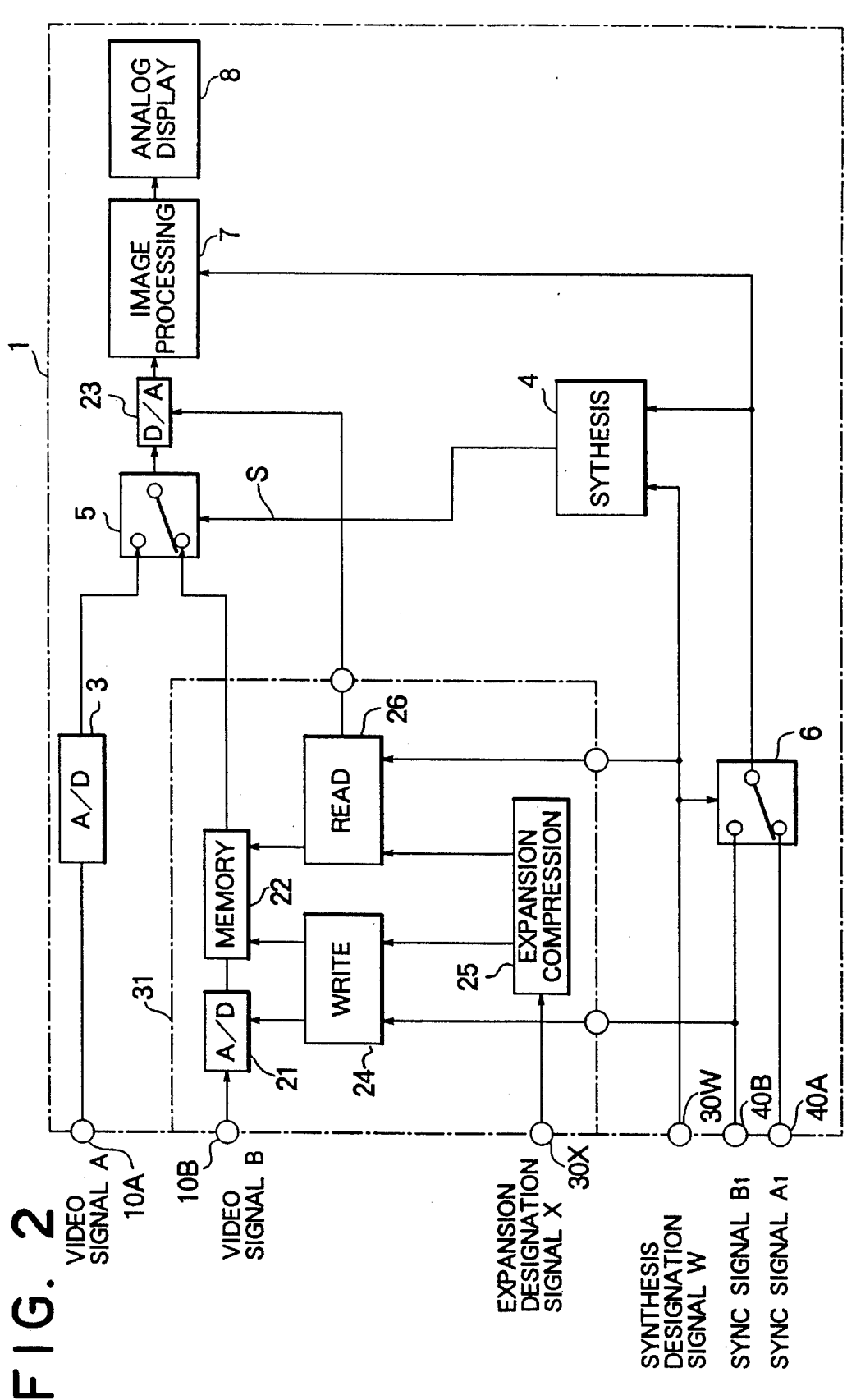
FIG. 2 is a diagram showing a circuit configuration of a video display apparatus according to a second embodiment.

A video display system according to a second embodiment of the invention is shown in the block diagram of FIG. 2. In this embodiment, two analog input video signals are digitally synthesized and displayed on the analog display 8.

In FIG. 2, the video display system 1 defined by dotted line has a configuration different from the embodiment of FIG. 1A in that an A-D conversion circuit 20 is added while the clamp circuit 3 is eliminated, and that the screen synthesis circuit 5 and the D-A conversion circuit 23 have different relative positions. The other points of the configuration are similar to those of FIG. 1A. In brief, (1) In FIG. 2, an A-D conversion circuit 20 is added for converting the video signal A to a digital signal in synchronism with the sync signal $A_1$.

(2) In FIG. 2, the screen synthesis circuit 5 is adapted to synthesize a digital video signal A in the form of the video signal A as converted into a digital signal with a digital video signal B in the form of the video signal B from the memory circuit 22 as converted into a digital signal.

(3) In the configuration of FIG. 2, the expansion/compression processing circuit 32 with the analog input/digital output shown in FIG. 2 has such a configuration that the D-A conversion circuit 23 is removed from the expansion/compression processing circuit 31 shown in FIG. 1A, and the D-A conversion circuit 23 is arranged after the screen synthesis circuit 5.

Now, the circuit operation is described. In FIG. 2, the input terminal 10A is impressed with the video signal A, which is converted into a digital signal at the A-D conversion circuit 20 and is applied to the screen synthesis circuit 5 as a digital video signal A to be synthesized. The input terminal 10B is supplied with the video signal B, which is converted into a digital signal at the A-D conversion circuit 21. The video signal portion to be synthesized or expanded, for example, of the resulting signal is stored in the memory circuit 22. This signal is read out of the memory 22 in synchronism with the sync signal A or B from the sync switching circuit 6 and is applied to the screen synthesis circuit 5 as the other digital video signal B to be synthesized.

The screen synthesis circuit 5 synthesizes the digital video signal A and the digital video signal B, the D-A conversion circuit 23 converts the resulting signal into an analog signal, and the image processing circuit 7 effects the image processing such as amplitude regulation and contour correction of the video signal thus synthesized. The image-processed signal is sent to and displayed on the analog display 8.

The circuit operation of FIG. 2 is the same as that shown in FIG. 1A except that the screen synthesis circuit 5 is used for digital synthesis. The video display system shown in FIG. 2, therefore, is identical to that shown in FIG. 1A in that four display modes are available depending on the conditions of the screen synthesis circuit 5 and the sync switching circuit 6.

In the configuration of the expansion/compression processing circuit 32 in FIG. 2, the expansion operation is not apparently clear. Nevertheless, the video signal B can be expanded in such a manner that if the read frequency of the memory circuit 22 is reduced as compared with the D-A conversion circuit 23, expansion is attained, and vice versa. The functions of the expansion/compression processing circuit 31 in FIG. 1A can thus be realized similarly by the expansion/compression processing circuit 32 shown in FIG. 32.

According to the embodiment shown in FIG. 2, therefore, as explained above, the video display system of the invention is capable of displaying the video signal A directly, displaying the video signal B in enlarged form, or synthesizing and displaying on the screen the video signal A and the video signal B in response to the video signal A and the video signal B of different scanning frequencies as an input.

Figure 3:
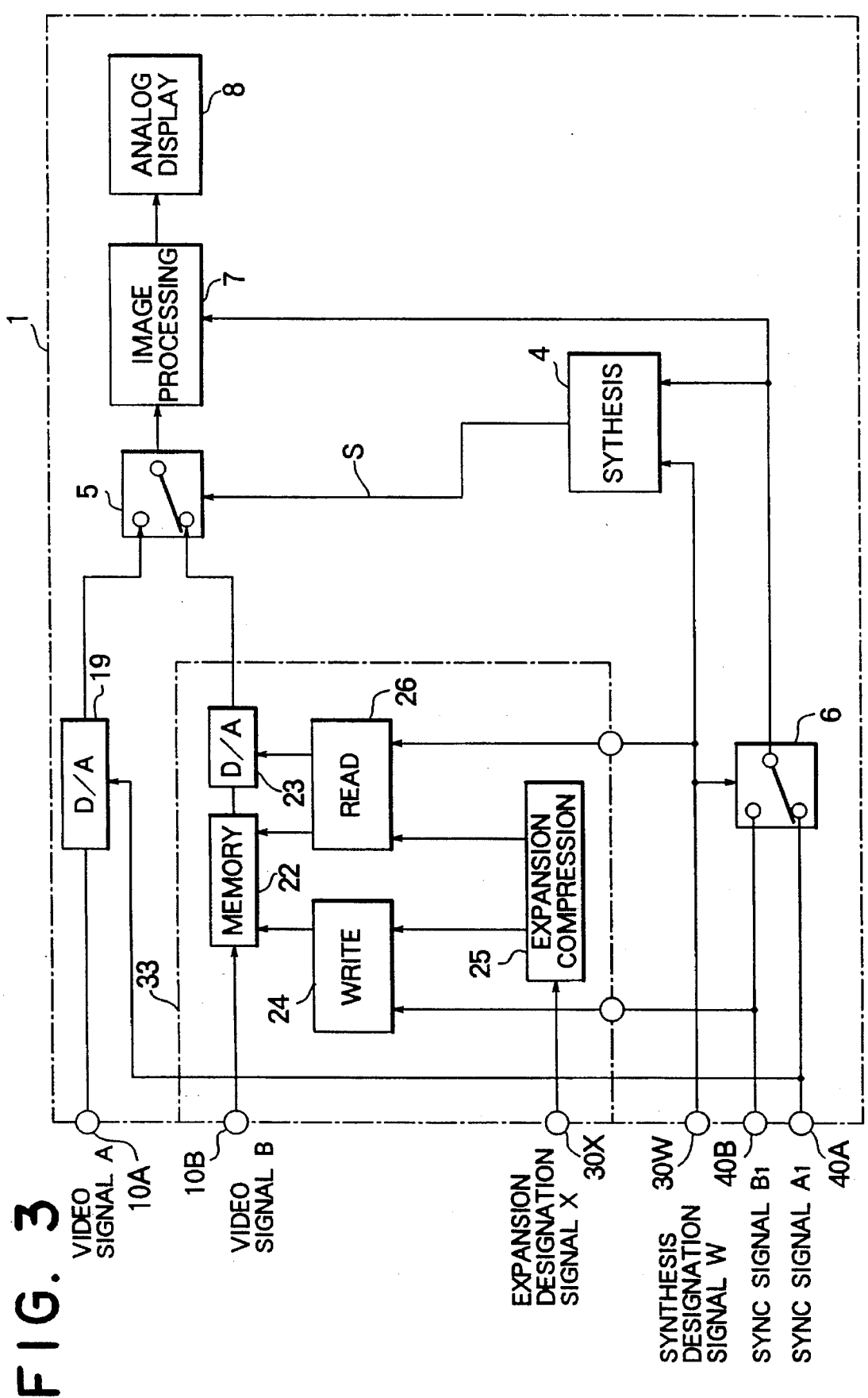
FIG. 3 is a diagram showing a circuit configuration of a video display apparatus according to a third embodiment.

FIG. 3 is a block diagram showing a video display system according to a third embodiment of the invention. According to this embodiment, the video signals A and B can be synthesized in analog fashion and displayed on the analog display 8.

In FIG. 3, the video display system 1 defined by the dotted line has a configuration different from that of FIG. 1A in that the D-A conversion circuit 19 is added while the A-D conversion circuit 21 in FIG. 1A is eliminated, the other component parts being identical to those of FIG. 1A respectively. More specifically, (1) In FIG. 3, the video signal A is a digital signal, and therefore the D-A conversion circuit 19 is added for converting the digital video signal A into an analog signal in synchronism with the sync signal $A_1$.

(2) Further, since the video signal B is also a digital signal, the expansion/compression processing circuit 33 with digital input and analog output shown in FIG. 3 is so configured that the A-D conversion circuit 21 is eliminated from the expansion/compression circuit 31 in FIG. 1A to write the video signal B directly into the memory circuit 22.

Now, the circuit operation is explained. In FIG. 3, the input terminal 10A is supplied with the digital video signal A, and after being converted into an analog signal at the D-A conversion circuit 19, is applied to the screen synthesis circuit 5 as one of the signals to be synthesized. The input terminal 10B is impressed with the digital video signal B, and only that of the digital video signal to be synthesized or expanded is stored in the memory circuit 22. This digital signal, while being read out in synchronism with one of the sync signals $A_1$ and $B_1$ from the sync switching circuit 6, is converted into an analog signal B at the D-A conversion circuit 23, and the resulting signal is applied to the screen synthesis circuit 5 as the other signal to be synthesized.

The screen synthesis circuit 5 synthesizes the analog signal A and the analog video signal B, and the image processing circuit 7 makes such image-processing operation as amplitude adjustment and contour correction of the synthesized video signal. The signal thus processed is sent to and displayed on the analog display 8.

The circuit operation shown in FIG. 3 is the same as that of FIG. 1A except that the input terminals 10A and 10B are supplied with the digital video signals A and B. As a result, the video display system 1 shown in FIG. 3 is identical to that shown in FIG. 1A in that four display modes are available depending on the conditions of the screen synthesis circuit 5 and the sync switching circuit 6. The expansion/compression processing circuit 33 is capable of expanding the digital video signal B by controlling the read frequency of the memory circuit 22 with respect to the D-A conversion circuit, thereby realizing the function of the expansion/compression processing circuit 31 of FIG. 1A.

As shown in FIG. 3, the video display system 1, supplied with the digital video signal A and the digital video signal B having different scanning frequencies, is capable of displaying the digital video signal A directly, displaying the digital video signal B in enlarged form, or displaying a synthesized screen of the digital video signal A and the digital video signal B.

Figure 4:
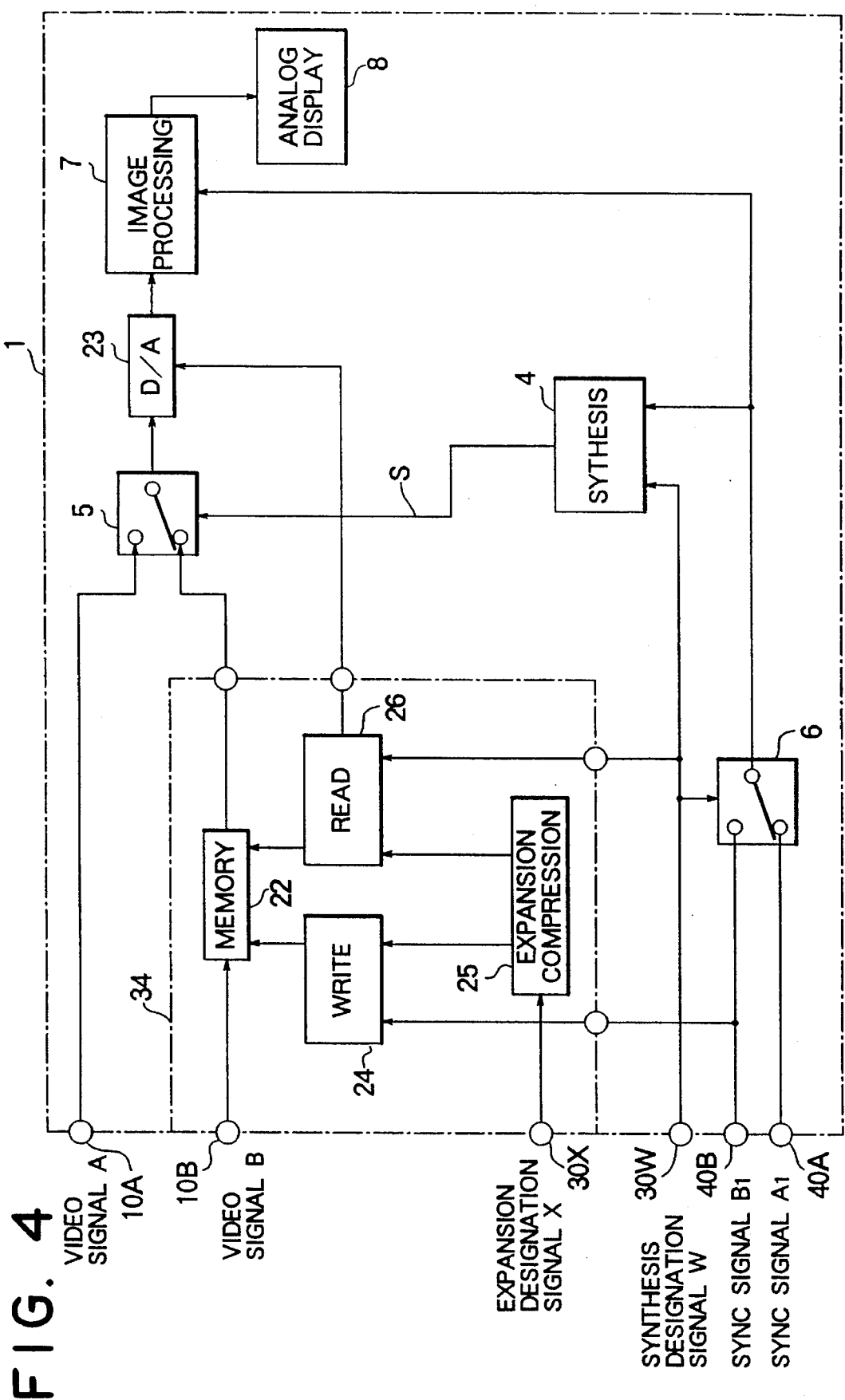
FIG. 4 is a diagram showing a circuit configuration of a video display apparatus according to a fourth embodiment.

A video display system according to a fourth embodiment of the invention is shown in the block diagram of FIG. 4. According to this embodiment, two digital video signals A and B are digitally synthesized and displayed on the analog display 8.

In FIG. 4, the video display system 1 defined by the dotted line has the same configuration as that shown in FIG. 2 except that the A-D conversion circuit 20 and the A-D conversion circuit 21 in FIG. 2 are eliminated. More specifically, (1) In FIG. 4 in which the A-D conversion circuit 20 in FIG. 2 is done without, the video signal A is a digital signal, which is directly applied to the screen synthesis circuit 5 for digital synthesis.

(2) Further, in the expansion/compression processing circuit 34 with digital input and digital output shown in FIG. 4, since the video signal B is a digital signal, the A-D conversion circuit 21 in FIG. 2 is eliminated, and the digital video signal B is directly stored in the memory circuit 22.

Now, the circuit operation will be explained. In FIG. 4, the input terminal 10A is supplied with the digital video signal A, which is applied to the screen synthesis circuit 5 as a digital video signal A to be synthesized. The input terminal 10B, on the other hand, is impressed with the digital video signal B, and the memory circuit 22 stores a predetermined portion of the digital video signal B. This signal portion is read out in synchronism with the output of the sync switching circuit 6, and is applied to the screen synthesis circuit 5 as the other digital video signal B to be synthesized.

The screen synthesis circuit 5 synthesizes the digital video signal A and the digital video signal B, the D-A conversion circuit 23 converts the resulting signal into an analog signal, and the image processing circuit 7 processes the synthesized video signal by amplitude adjustment and contour correction. The signal processed in this way is applied to and displayed on the analog display 8.

The circuit operation of FIG. 4 is identical to that shown in FIG. 2 except that in FIG. 4 the digital video signal A and the digital video signal B are applied to the input terminals 10A and 10B respectively. As a consequence, the video display system 1 shown in FIG. 4 is the same as that according to the embodiment shown in FIG. 2 in that four display modes are available depending on the conditions of the screen synthesis circuit 5 and the sync switching circuit 6.

In the expansion/compression processing circuit 34 shown in FIG. 4 whose expansion function is not apparently defined, like in the expansion/compression processing circuit 32 shown in FIG. 2, is capable of expanding the digital video signal B by controlling the read frequency of the memory circuit 22 with respect to the D-A conversion circuit 23, thereby realizing the expansion function.

As shown in FIG. 4, therefore, the video display system 1, supplied with the digital video signal A and the digital video signal B having different scanning frequencies, is capable of displaying the digital video signal directly, displaying the digital video signal B in enlarged form, or displaying a synthesized screen of the digital video signal A and the digital video signal B.

Each of the embodiments shown in FIGS. 1 to 4 is so configured that two input video signals are both analog or digital signals, which are synthesized in analog or digital fashion for synthesis and display. According to possible combinations of the two input video signals as analog or digital signals, however, the following choices are available in other embodiments.

(1) An analog video signal A and a digital video signal B are input and are synthesized and displayed in analog fashion.

(2) An analog video signal A and a digital video signal B are input and are synthesized and displayed in digital fashion.

(3) A digital video signal A and an analog video signal B are input and synthesized and displayed in analog fashion.

(4) A digital video signal A and an analog video signal B are input, and synthesized in digital fashion and displayed.

The configuration of these embodiments is apparent from the counterpart shown in FIGS. 1 to 4. More specifically, (1) In the case where the analog video signal A and the digital video signal B are applied and are synthesized in analog fashion and displayed, the basic configuration involved is shown in FIG. 1A, in which case the expansion/compression processing circuit 31 with analog input and analog output of FIG. 1A is replaced by the expansion/compression processing circuit 33 with digital input and analog output shown in FIG. 3.

(2) In the case where the analog video signal A and the digital video signal B are input and synthesized in digital fashion for display, the configuration shown in FIG. 2 provides a base, on which the expansion/compression processing circuit 32 with analog input and digital output shown in FIG. 2 is replaced by the expansion/compression processing circuit 34 with digital input and digital output shown in FIG. 4.

(3) In the case where the digital video signal A and the analog video signal B are applied and synthesized in digital fashion for display, on the other hand, the basic configuration of FIG. 3 is used so that the expansion/compression circuit 33 with digital input and analog output shown in FIG. 3 is replaced by the expansion/compression processing circuit 31 with analog input and analog output shown in FIG. 1A.

(4) In the case where the digital video signal A and the analog video signal B are applied and synthesized in digital fashion for display, the configuration shown in FIG. 4 provides a base, on which the expansion/compression processing circuit 34 with digital input and digital output shown in FIG. 4 is replaced by the expansion/compression processing circuit 32 with analog input and digital output shown in FIG. 2.

Figure 5:
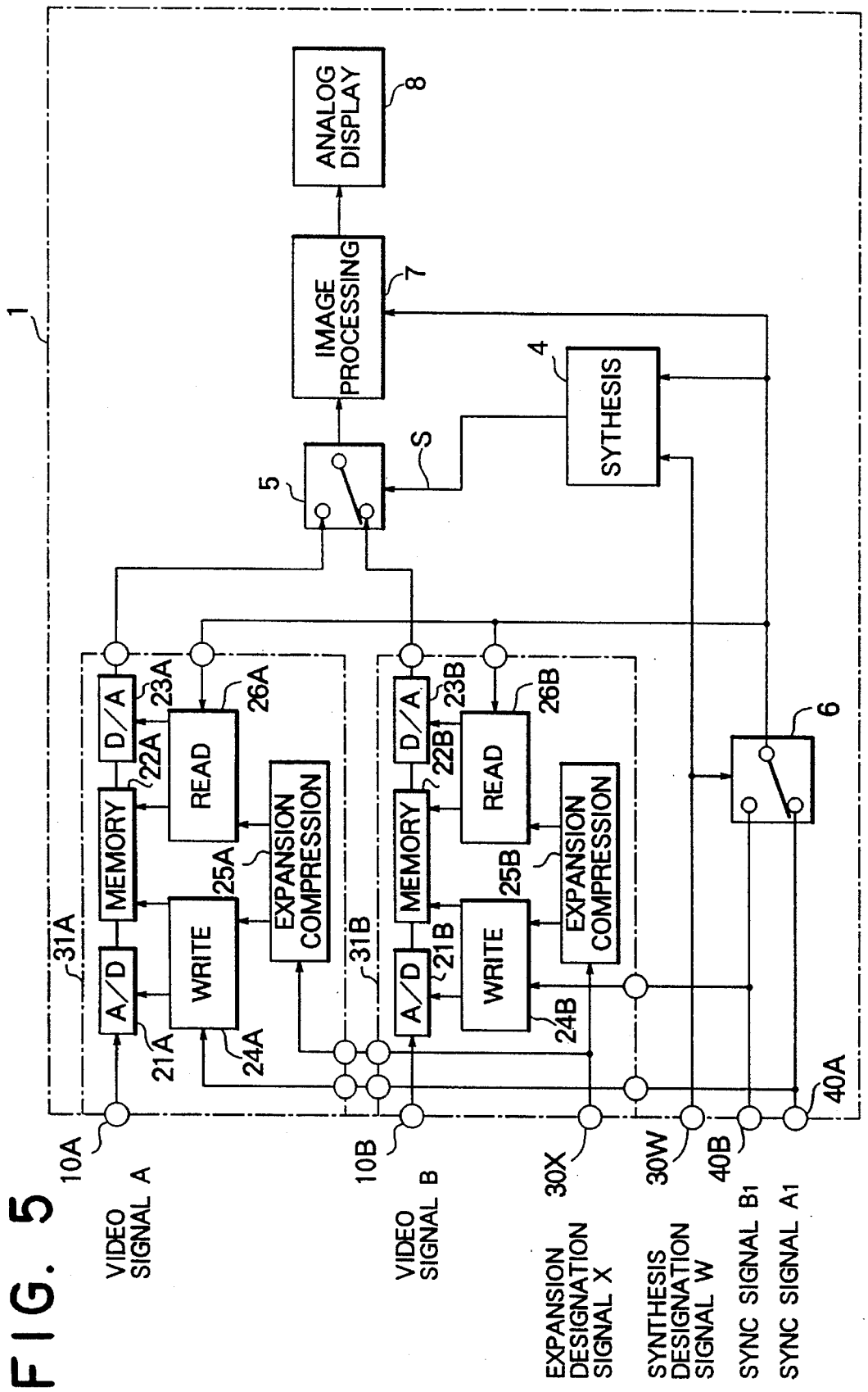
FIG. 5 is a diagram showing a circuit configuration of a video display apparatus according to a fifth embodiment.

A video display system according to a fifth embodiment of the invention is shown in the block diagram of FIG. 5. According to the embodiment shown in FIG. 5, two analog video signals A and B are expanded and synthesized in analog fashion and displayed on the analog display 8.

In FIG. 5, the video display system 1 defined by dotted line is different in configuration from that of FIG. 1A in that two expansion/compression processing circuits 31 in FIG. 1A are provided while the remainder is the same as the corresponding parts in FIG. 1A. More specifically, (1) The configuration shown in FIG. 5 includes an expansion/compression processing circuit 31A for expanding/compressing (scaling) the video signal A applied to the input terminal 10A, and an expansion/compression processing circuit 31B for expanding/compressing the video signal B applied to the input terminal 10B.

(2) The expansion/compression processing circuit 31B has the same configuration and connection with peripheral circuits as that shown in FIG. 1A, the only difference being that the component parts thereof are designated by reference numerals different from those in the expansion/compression processing circuit in FIG. 1A.

(3) The added expansion/compression processing circuit 31A has the same configuration as the expansion/compression processing circuit 31 shown in FIG. 1A, the only difference being the reference numerals denoting the respective component parts. With regard to the connection with the peripheral circuits, the write control circuit 24A of the expansion/compression circuit 31A in FIG. 5 is operated in synchronism with the sync signal $A_1$ applied to the input terminal 40A, the expansion/compression control circuit 25A is controlled by the expansion designation signal X applied to the input terminal 30X, and the read control circuit 26A is operated in synchronism with the switching output signal of the sync switching circuit 6.

Now, the circuit operation will be explained. In FIG. 5, the input terminal 10A is supplied with the video signal A, a predetermined portion of which is expanded at the expansion/compression processing circuit 31A and applied to the screen synthesis circuit 5 as a signal to be synthesized in synchronism with the switching output of the sync switching circuit 6. The input terminal 10B, on the other hand, is supplied with the video signal B, a predetermined portion of which is expanded at the expansion/compression processing circuit 31B and is applied to the screen synthesis circuit 5 as the other signal to be synthesized in synchronism with the output signal of the sync switching circuit 6. The image processing circuit 7 processes the screen-synthesized video signal by amplitude adjustment or contour correction and applies it to the analog display 8 for display.

In the circuit operation of FIG. 5, the following six display modes are available depending on the conditions of the screen synthesis circuit 5 and the sync switching circuit 6. Mores specifically, (1) Only the video signal A applied to the input terminal 10A is displayed with the same frequency as the sync signal $A_1$.

(2) Only the video signal A applied to the input terminal 10A is displayed with the same frequency as the sync signal $B_1$.

(3) Only the video signal B applied to the input terminal 10B is displayed with the same frequency as the sync signal $B_1$.

(4) Only the video signal B applied to the input terminal 10B is displayed with the same frequency as the sync signal $A_1$.

(5) The video signal A and the video signal B applied to the input terminal 10A and the input terminal 10B respectively are synthesized and displayed with the same frequency as the sync signal $A_1$.

(6) The video signal A and the video signal B applied to the input terminal 10A and the input terminal 10B respectively are synthesized and displayed with the same frequency as the sync signal $B_1$.

Each of the modes described above is for the most part identical to that shown in FIG. 1A and can be realized in the manner described below.

(1) In the case where only the video signal A applied to the input terminal 10A is displayed with the same frequency as the sync signal $A_1$, the sync switching circuit 6 passes the sync signal $A_1$, and the screen synthesis circuit 5 allows only the expanded video signal A processed in the expansion/compression processing circuit 31A to pass therethrough. In other words, the screen synthesis circuit 5 produces only the expanded video signal A, while the image processing circuit 7 processes the expanded video signal A in synchronism with the sync signal $A_1$ and applies it to the analog display 8, on which only the expanded video signal A is displayed. The expansion/compression processing circuit 31A expands the video signal A, and produces an expanded video signal A in synchronism with the output signal of the sync switching circuit 6, which is the sync signal $A_1$ in the present display mode (1).

(2) In the case where only the video signal A applied to the input terminal 10A is displayed with the same frequency as the sync signal $B_1$, on the other hand, the sync switching circuit 6 passes the sync signal $B_1$, and the screen synthesis circuit 5 passes only the expanded video signal A processed at the expansion/compression processing circuit 31A. More specifically, the screen synthesis circuit 5 produces only the expanded video signal A, and the image processing circuit 7 processes the expanded video signal A in synchronism with the sync signal $B_1$, with the resulting signal being applied to the analog display 8, on which only the expanded video signal A is displayed. In the process, the expansion/compression processing circuit 31A expands the video signal A, and produces the expanded video signal A in synchronism with the output signal of the sync switching circuit 6, i.e., the sync signal B1 in the present display mode (2).

(3) In the case where only the video signal B applied to the input terminal 10B is displayed with the same frequency as the sync signal $B_1$, the sync switching circuit 6 passes the sync signal $B_1$, and the screen synthesis circuit 5 allows the passage of only the expanded video signal B processed at the expansion/compression processing circuit 31B. More specifically, the screen synthesis circuit 5 produces only the expanded video signal B, and after the image processing circuit 7 processes the expanded video signal B in synchronism with the sync signal $B_1$, the analog display 8 displays only the expanded video signal B. In the process, the expansion/compression processing circuit 31B expands the video signal B, and produces the expanded video signal B in synchronism with the output signal of the sync switching circuit 6, that is the sync signal $B_1$ in the display mode (3) under consideration.

(4) In the case where only the video signal B applied to the input terminal 10B is displayed with the same frequency as the sync signal $A_1$, the sync switching circuit 6 passes the sync signal $A_1$, and the screen synthesis circuit 5 passes only the expanded video signal B processed at the expansion/ compression circuit 31B. More specifically, the screen synthesis circuit 5 produces only the expanded video signal B, and the image processing circuit 7 processes the expanded video signal B in synchronism with the sync signal $A_1$. The resulting signal is applied to the analog display 8, and only the expanded video signal B is displayed. In the process, the expansion/compression processing circuit 31B expands the video signal B, and produces the expanded video signal B in synchronism with the output signal of the sync switching circuit 6, i.e., the sync signal $A_1$ in the present display mode (4).

(5) In the case where the video signal A and the video signal B applied to the input terminal 10A and the input terminal 10B respectively are synthesized and displayed with the same frequency as the sync signal $A_1$, the sync switching circuit 6 passes the sync signal $A_1$, so that the expanded video signal A processed at the expansion/compression circuit 31A and the expanded video signal B processed at the expansion/compression processing circuit 31B are produced by appropriately being switched. More specifically, a synthesized screen of the expanded video signal A synchronized with the video signal A and the expanded video signal B synchronized with the video signal A is produced from the screen synthesis circuit 5. This synthesized screen is processed by the image processing circuit 7 in synchronism with the sync signal $A_1$, and the resulting signal is applied to and displayed on the analog display 8.

(6) In the case where the video signal A and the video signal B applied to the input terminal 10A and the input terminal 10B respectively are synthesized and displayed with the same frequency as the sync signal $B_1$, the sync switching circuit 6 passes the sync signal $B_1$, so that expanded video signal A processed at the expansion/compression processing circuit 31A and the expanded video signal B processed at the expansion/compression circuit 31B are produced by being switched appropriately. More specifically, a synthesized screen of the expanded video signal A synchronized with the video signal A and the expanded signal B synchronized with the video signal B is produced from the screen synthesis circuit 5. This synthesized screen is processed at the image processing circuit 7 in synchronism with the sync signal $B_1$, and the resulting signal is applied to and displayed on the analog display 8.

FIG. 5 shows the video display system 1 for expanding and synthesizing two analog video signals and displaying the synthesized signal on the analog display 8 according to an embodiment of the invention. The embodiments involving both analog and digital signals and the mixture of analog and digital signals are possible by combining the expansion/compression circuits 31 to 34 shown in FIGS. 1 to 4 in appropriate manner.

According to the embodiment shown in FIG. 5, the video display unit 1, in response to the video signal A and the video signal B having different scanning frequencies, is capable of displaying the video signal A or the video signal B in enlarged form, or displaying a synthesized screen of the video signal A and the video signal B. Both of the display frequencies can be set to the video signal A or the video signal B.

Figure 6:
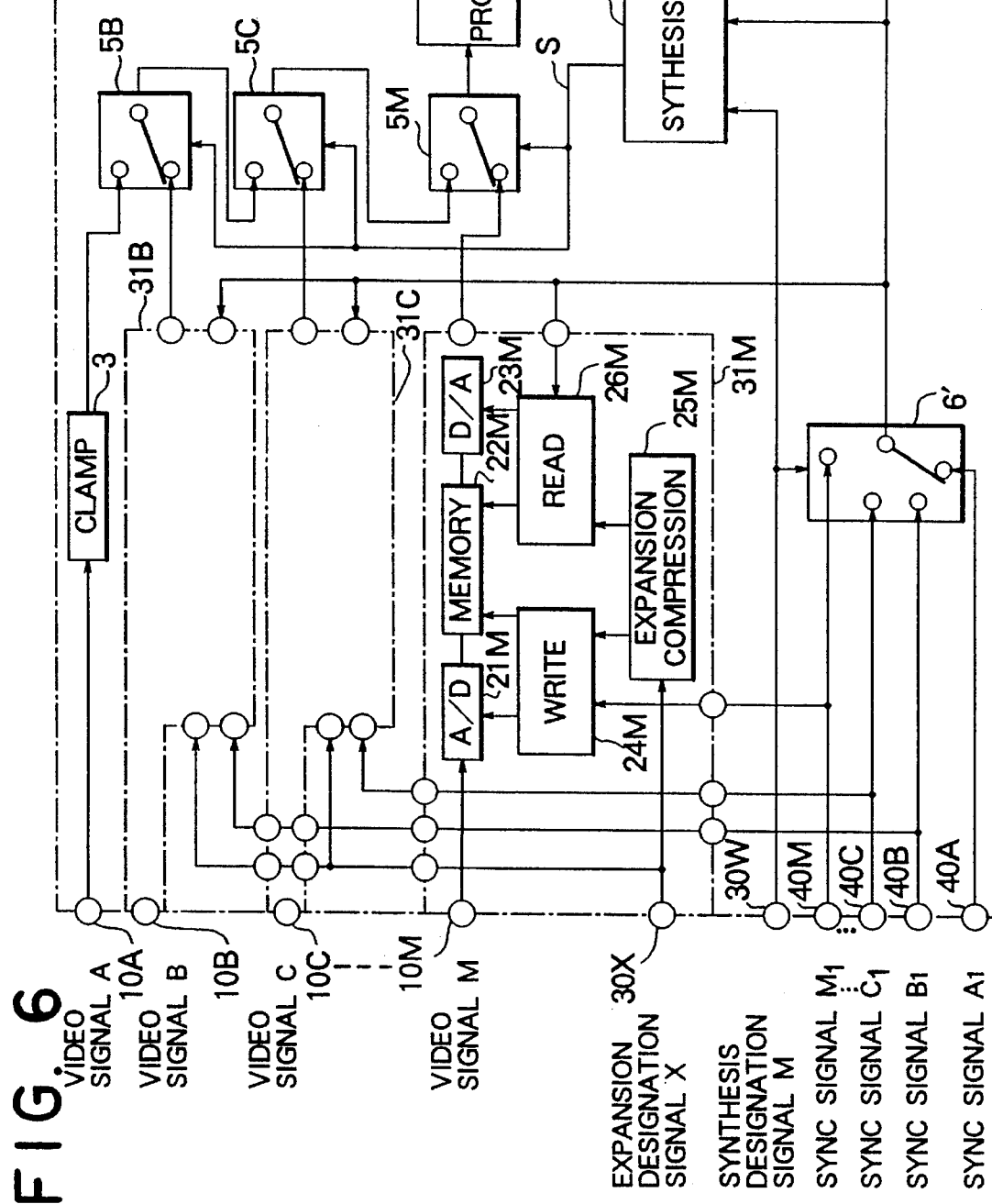
FIG. 6 is a diagram showing a circuit configuration of a video display apparatus according to a sixth embodiment.

A sixth embodiment of the invention is shown in the block diagram of FIG. 6. According to this embodiment, two or more video signals are synthesized and displayed.

In FIG. 6, the video display unit 1 defined by the dotted line is configured of a plurality of input terminals 10A, 10B, 40A, 40B in FIG. 1 and a plurality of expansion/compression processing circuits 31 in such a manner as to synthesize and display a plurality of signals including the video signal A, the video signal B, the video signal C and the video signal M. In this point, the configuration of FIG. 6 is different from that of FIG. 1A, the other component parts remaining substantially the same. In other words, the configuration of FIG. 6 is characterized in that (1) There are provided a plurality of input terminals including 10A, 10B, 10C to 10M supplied with a plurality of video signals including the video signals A, B, C to M and a plurality of input terminals 40A, 40B, 40C to 40M supplied with a plurality of sync signals $A_1$, $B_1$, $C_1$ to $M_1$.

(2) There are provided expansion/compression processing circuits 31B, 31C to 31M for expanding the video signals B, C to M respectively.

(3) The expansion/compression processing circuits 31B, 31C to 31M control the write operation of the video signals B, C to M respectively in synchronism with the sync signals $B_1$, $C_1$ to $M_1$.

(4) There is provided a sync switching circuit 6' for switching the sync signals $A_1$, $B_1$, $C_1$ to $M_1$.

(5) The read operation of the expansion/compression processing circuits 31B, 31C to 31M is controlled in synchronism with the switching output of the sync switching circuit 6'.

(6) There are provided the screen synthesis circuits 5B, 5C to 5M for sequentially synthesizing the expanded video signals B, C to M providing the expanding outputs of the expansion/compression processing circuits 31B, 31C to 31M with respect to the video signal A.

Now, the circuit operation of FIG. 6 is explained. The input terminal 10A is supplied with the video signal A. which is DC-reproduced at the clamp circuit 4 to provide an input to the screen synthesis circuit 5B. The expansion/compression processing circuit 31B expands a predetermined portion of the video signal B and applies the resulting signal to the screen synthesis circuit 5B as a signal to be synthesized in synchronism with the switching output of the sync switching circuit 6. The synthesis output of the screen synthesis circuit 5B is applied to the screen synthesis circuit 5C. The input terminal 10C is supplied with the video signal B, and the expansion/compression processing circuit 31C expands a predetermined portion of the video signal C, and applies the resulting signal to the screen synthesis circuit 5C as the other signal to be synthesized in synchronism with the output of the sync switching circuit 6.

The expansion and the screen synthesis of the video signals are sequentially repeated up to the expansion/compression processing circuit 31M in FIG. 6. The screen synthesis circuit 5M expands the video signal M applied to the input terminal 10M, and applies the resulting signal to the screen synthesis circuit 5M as the other signal to be synthesized. The image processing circuit 7, after adjusting the amplitude and correcting the contour of the video signal screen-synthesized at the screen synthesis circuit 5M, applies it to and displays it on the analog display 8.

In the aforementioned circuit operation of FIG. 6, a multiplicity of display modes are available depending on the conditions of the screen synthesis circuits 5B, 5C to 5M and the sync switching circuit 6' of the video display system 1. The display modes specifically include (1) The case in which only the video signal A applied to the input terminal 10A is displayed directly.

(2) The case in which only the video signal B applied to the input terminal 10B is displayed with the same frequency as the sync signal $B_1$.

(3) The case in which only the video signal B applied to the input terminal 10B is displayed with the same frequency with the sync signal $A_1$.

(I) The case in which only the video signal C applied to the input terminal 10C is displayed with the same frequency as the sync signal $M_1$.

(N) The case in which the video signal A applied to the input terminal 10A is screen-synthesized with the video signals B, C to M respectively applied to the input terminals 10B, 10C to 10M and displayed with the same frequency as the sync signal $A_1$.

Each display mode involves a plurality of video signals and is basically based on the same operation as each display mode shown in FIGS. 1 to 5. The method of realization is also similar.

The configuration of FIG. 6 arbitrarily excludes the expansion/compression processing circuit for the video signal A. Nevertheless, the expansion/compression processing circuit for the video signal A may be included, in which case the video signals A, B, C to M can be processed exactly in equivalent manner, thereby further increasing the number of display modes for the video display system according to the invention.

In the embodiment shown in FIG. 6, the video signals A, B, C to M are analog signals which are synthesized with analog signals. According to the first to fifth embodiments of the invention, the video signals A, B, C to M may be synthesized in either analog or digital fashion by a synthesis circuit which may of course be of either analog or digital type with equal effect. As a result, it is clear that embodiments can be disclosed with a video input constructed of a mixture of a plurality of analog and digital signals.

According to the embodiment shown in FIG. 6 described above, the video display system of the invention which, supplied with a plurality of video signals including A, B, C to M having different scanning frequencies, can display the video signal A directly, the video signal B in enlarged form, the video signal C in enlarged form or screen-synthesize the video signals A and B. Also, with the direct display or the display by synthesis of the video signal A, the display frequency is identical to that for the sync signal $A_1$. For other display modes, however, any display frequency can be synchronized with the sync signal $A_1$, $B_1$, $C_1$ to $M_1$.

Figure 7:
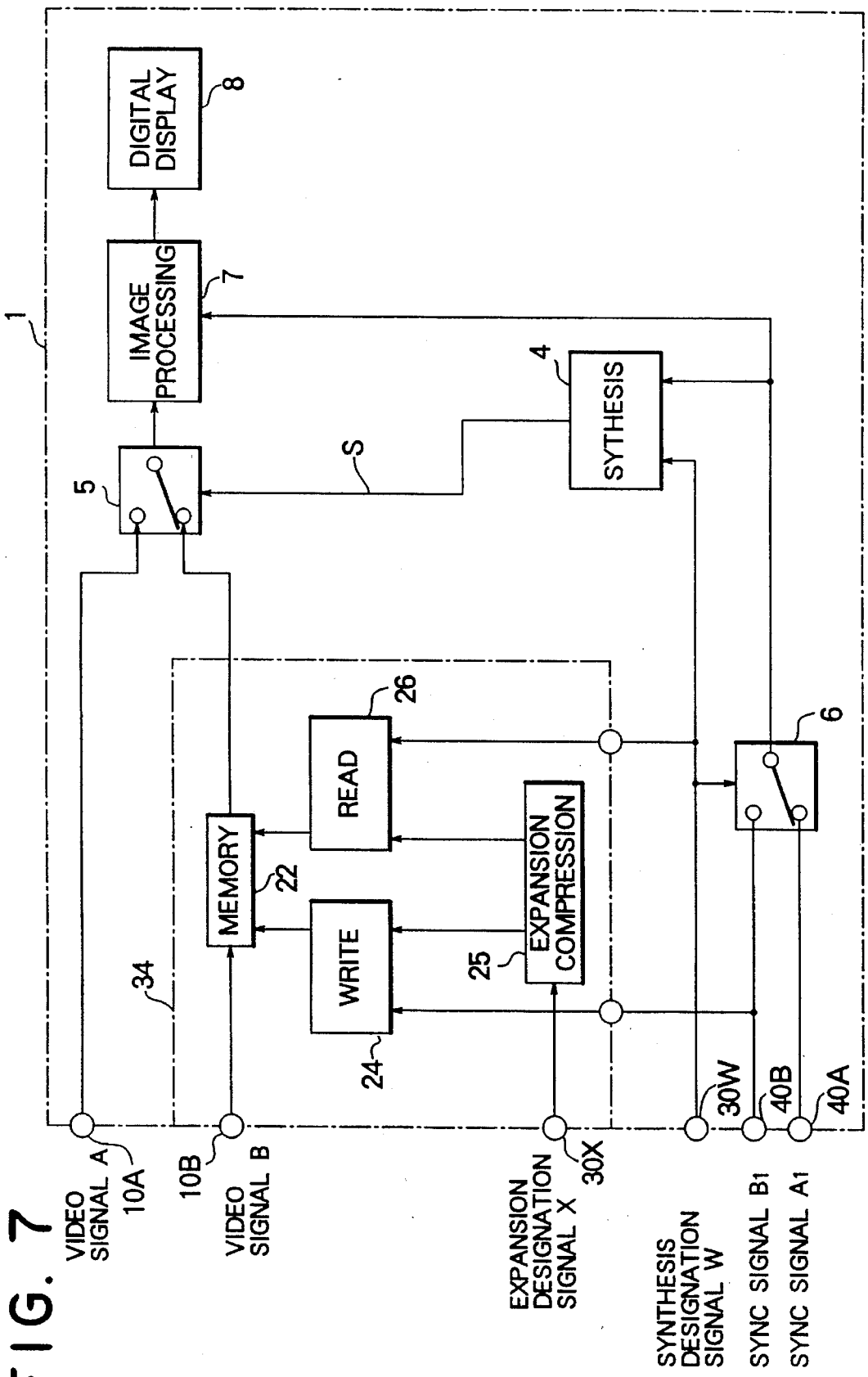
FIG. 7 is a diagram showing a circuit configuration of a video display apparatus according to a seventh embodiment.

The video display system according to a seventh embodiment of the invention is shown in the block diagram of FIG. 7. This embodiment is such that two digital video signals are synthesized in digital fashion and displayed on a digital display.

In FIG. 7, the configuration of the video display unit 1 defined by the dotted line is different from the one shown in FIG. 4 in that the A-D conversion circuit 23 is deleted and the analog display 8 is replaced with the digital display 9 in FIG. 4, the remaining component parts being similar to the corresponding ones in FIG. 4.

(1) In the configuration of FIG. 7, the display 9 is made of a digital panel (digital display), and the image processing circuit 7 processes a digital signal and sends it to the display 9 for display.

(2) In other words, the digital video signal A and the digital output of the memory circuit 22 are applied to the screen synthesis circuit 5 for digital synthesis, with the resulting signal being applied to the image processing circuit 7.

Now, the circuit operation is described. In FIG. 7, the digital video signal A is applied to the input terminal 10A, and further to the screen synthesis circuit 5 as a digital video signal A to be synthesized. The input terminal 10B, on the other hand, is supplied with the digital video signal B, and a predetermined portion of the video signal B is stored in the memory circuit 22 and is read out therefrom in synchronism with the output of the sync switching circuit 6. The resulting signal is applied to the screen synthesis circuit 5 as the other digital video signal B to be synthesized. The screen synthesis circuit 5 synthesizes the digital video signal A and the digital video signal B, the image processing circuit 7 processes the video signal thus screen-synthesized by amplitude adjustment or contour correction, and the signal thus processed is applied to and displayed on the digital display 8.

The expansion/compression processing circuit 34 defined by the dotted line in FIG. 7, like the one described with reference to the embodiment shown in FIG. 4, is capable of expanding the video signal B by controlling the read frequency of the memory circuit 22 with respect to the image processing circuit 7, and thus can realize the expansion function.

Further, apart from the embodiment shown in FIG. 7 in which the video signal A and the video signal B are digital inputs, a configuration having the video signal A and the video signal B in digital or analog form is apparent from the configurations shown in FIGS. 1 to 5. In the configuration shown in FIG. 2, for example, a configuration for displaying a synthesized screen on the digital display 9 in response to the analog video signals A and B as an input is realized by deleting the D-A conversion circuit 23 and replacing the analog display 8 by the digital display 9.

According to the seventh embodiment shown in FIG. 7, therefore, the video display system according to the invention is capable of displaying the video signal A directly, the video signal B in expanded form, or a synthesized image of the video signal A and the video signal B on the digital display in response to the video signals A and B having different frequencies.

Figure 8:
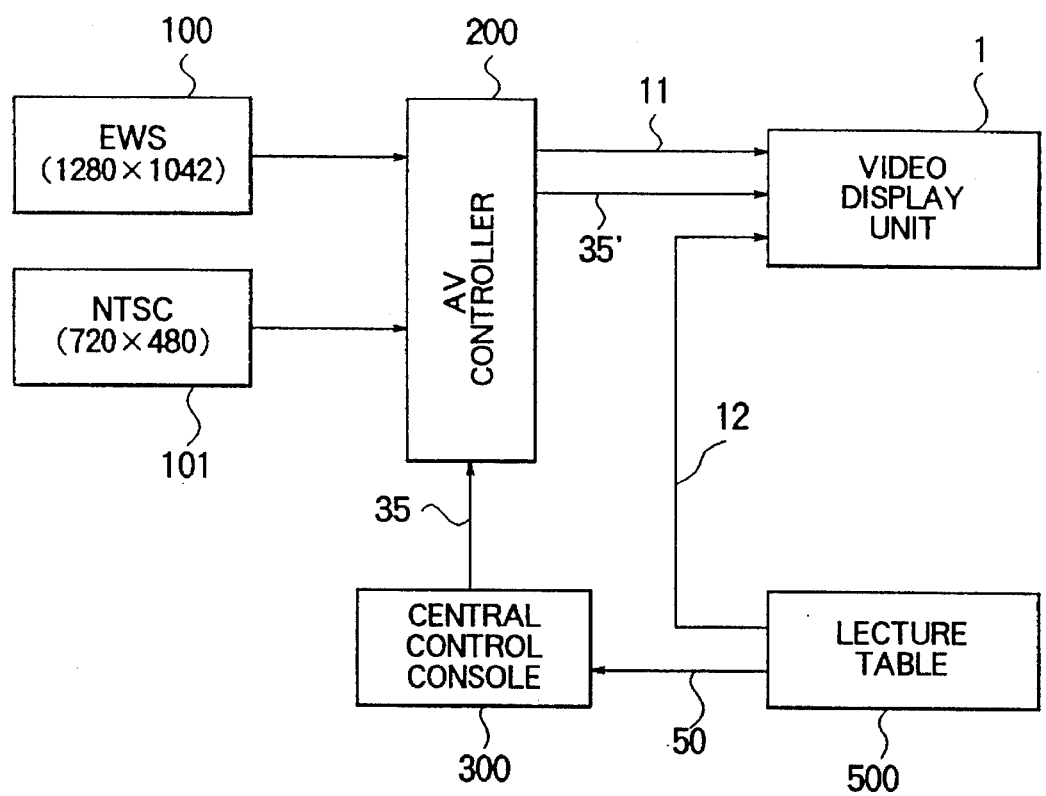
FIG. 8 is a block diagram showing another example of the screen display system according to the invention.

A screen display system according to an embodiment of the invention is shown in the block diagram of FIG. 8. According to this embodiment, different from the ones described above, the video display system of the invention is used as a single unit to provide a unit display system.

In the embodiment shown in FIG. 8, a route 11 between a video display system 1 and an AV controller 200 is for transmitting the video signal A and the sync signal $A_1$, and a route 35' for transmitting the expansion designation signal X and the synthesis designation signal W. Also, a route 12 between the video display system 1 and a lecture table 500 is for transmitting the video signal B and the sync signal $B_1$. This embodiment comprises a video display unit 1 which is any one of those described above with reference to FIGS. 1 to 5, an EWS (Engineering Workstation) signal source 100 and an NTSC (National Television Systems Committee) signal source 101 shown as an example of the signal source to be displayed, an AV (Audio Visual) controller 200, a central control console 300 and a lecture table 500.

A variety of display systems are conceivable depending on different equipment arrangements. In the configuration according to the embodiment shown in FIG. 8, in particular, the lecturer is situated before the lecture table, and a master of ceremony before the central control console 300, the EWS or NTSC image is displayed on a single video display unit 1. At the same time, a pointer (marker arrow) etc., issued by the lecturer from the lecture table is synthesized and displayed on the video display unit 1. Other configurations of the display system are possible in which the number of synthesized screens is increased by using the video display unit 1 explained above with reference to FIG. 6.

Now, the circuit operation of the multi-screen display system shown in FIG. 8 will be described. In FIG. 8, a control instruction for designating a screen, an image or a pointer to be displayed on the video display unit 1 is sent to the central control console 300 through the route 50 from the lecture table 500, while the image information such as a pointer is transmitted to the video display unit 1 through the route 12.

At the central control console 300, the AV controller 200 is controlled through the route 35 in accordance with the program of lecture progress, while at the same time controlling the display on the video display unit 1 through the route 35' from the AV controller 200. At the AV controller 200, on the other hand, the image from the EWS signal source 100 and that from the NTSC signal source 101 are switched, and the image thus switched is sent to the video display unit 1 through the route 11, based on the control information from the central control console 300. The video display unit 1, based on the control information from the route 35', controls the display, and synthesizes and displays on the same screen the pointer from the route 12 as the EWS or NTSC image from the route 11.

The image from the EWS signal source 100 has 1280 by 1024 dots, and the image from the NTSC signal source 101 a matrix of 720 by 480 dots. These images, though different in scanning frequency from each other, can be freely synthesized or one of them can be conveniently displayed as desired by the lecturer on the video display unit. In this way, according to the embodiment shown in FIG. 8, the video display unit of the invention as a unit can configure a display system, in which images from a plurality of signal sources having different scanning frequencies can be displayed and synthesized for display with such images as pointer.

Figure 9:
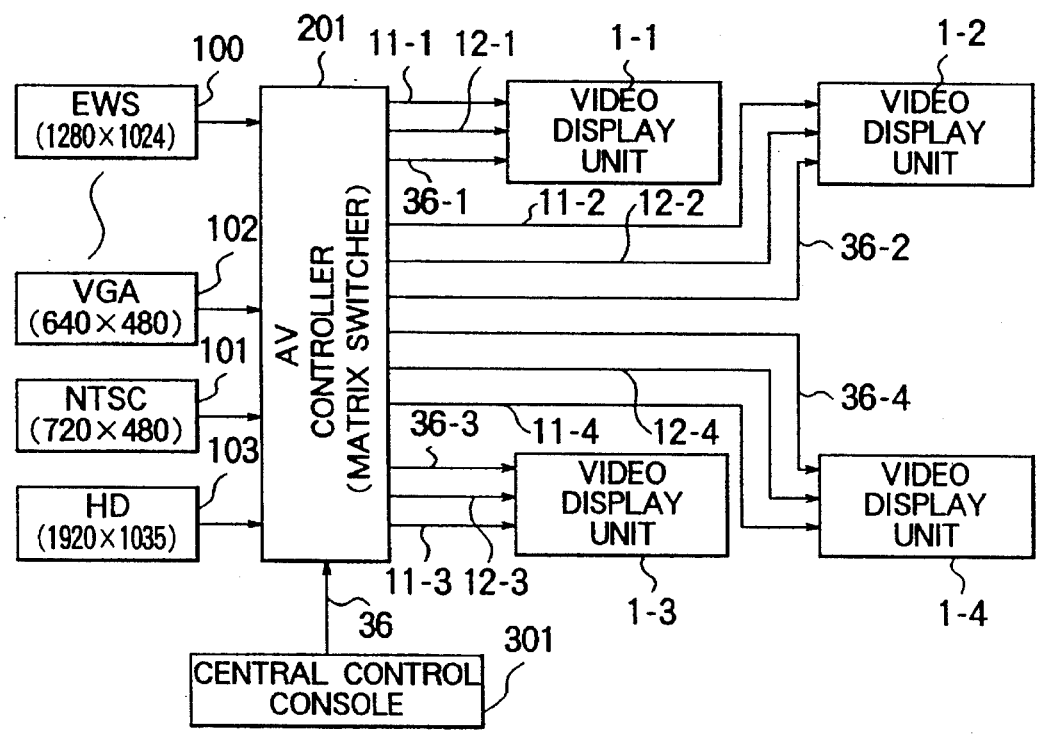
FIG. 9 is a block diagram showing another example of the multi-screen display system.

A multi-screen display system according to another embodiment of the invention is shown in the block diagram of FIG. 9. According to this embodiment, four video display units of the invention are combined to construct a multi-screen display system. The video signal, the sync signal, the expansion and synthesis control signals received by each of video display units 1-1, 1-2, 1-3, 1-4 are similar to those described with reference to FIG. 8. In the case under consideration, however, the video signal B and the sync signal $B_1$ are sent from the central control console 300.

In FIG. 9, the four video display units 1-1, 1-2, 1-3, 1-4, which may be a combination of any of the video display units according to the embodiments described above with reference to FIGS. 1 to 5, are arranged together with signal sources including, for example, an EWS (Engineering Workstation) signal source 100, a VGA (Video Graphic Array) signal source 101, an NTSC (National Television Systems Committee; TV broadcast standards) signal source 101 and an HD (High Definition or Hi-Vision) signal source 103, an AV (Audio Visual) controller 201 and a central control console 301.

A multiplicity of alternatives are conceivable depending on the equipment arrangement of the display system. In the configuration shown in FIG. 9, in particular, a display monitor is situated before the central control console 301, and a plurality of images having different scanning frequencies such as EWS, VGA, NTSC or HD are displayed or synthesized for display.

Another configuration with an increased number of synthesis displays can be realized using the video display unit 1 shown in FIG. 6 described above. Also, the number of display screens can be increased by using as many video display units 1 according to the invention as required.

The circuit operation of the embodiment shown in FIG. 9 will be described. In FIG. 9, the central control console 301 controls the AV controller 201 through the route 36 in accordance with the display programs, while at the same time controlling the display of the video displays 1-1, 1-2, 1-3, 1-4 through the routes 36-1, 36-2, 36-3, 36-4 respectively from the AV controller 201.

The AV controller, on the other hand, based on the control information from the central control console 301, switches the images from the EWS signal source 100, the VGA signal source 102, the NTSC signal source 101, the HD signal source 103, etc. The images thus switched are sent to the video display units 1-1, 1-2, 1-3, 1-4 through two routes 11-1, 12-1; 11-2, 12-2; 11-3, 12-3; and 11-4, 12-4.

In these video display units 1-1 to 1-4, the display is controlled based on the control information from the routes 36-1 to 36-4, and the video signals such as EWS, VGA, NTSC and HD arriving by way of the two classes of routes 11-1, 12-1; 11-2, 12-2; 11-3, 12-3; and 11-4, 12-4 are displayed in one, two, three or four screens or by synthesis.

As described above, in the embodiment shown in FIG. 9, four video display units according to the present invention make up a multi-screen display system (large screen), which is capable of displaying the video signals arriving from a plurality of signal sources having different scanning frequencies in one to four screens or displaying them by synthesis for each display unit.

Figure 11A:
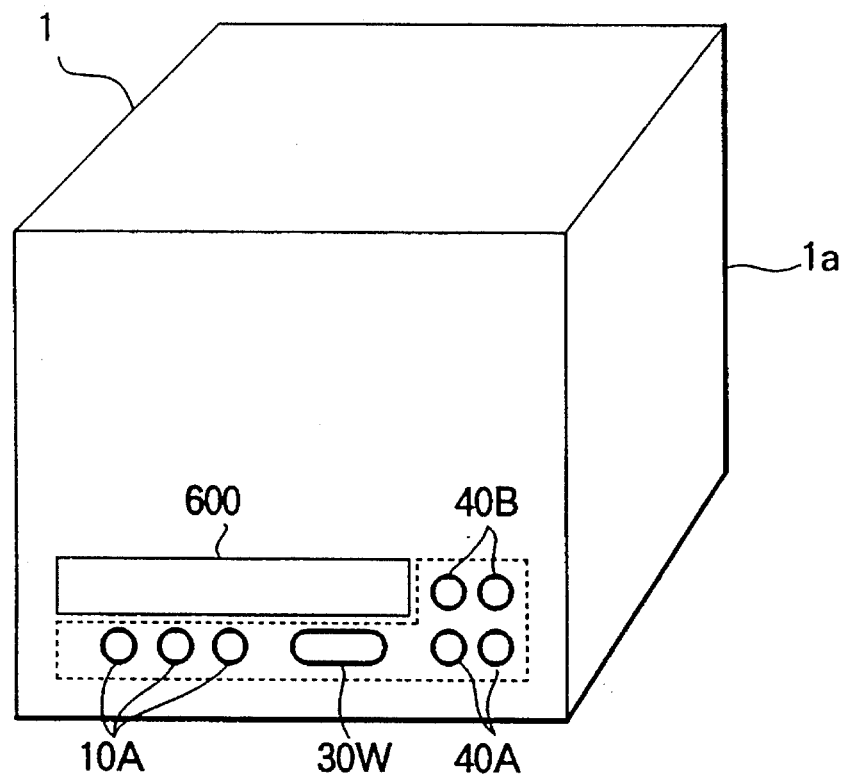
FIG. 11A is a perspective view showing the external appearance of a video display system.
Figures 11B, 11C:
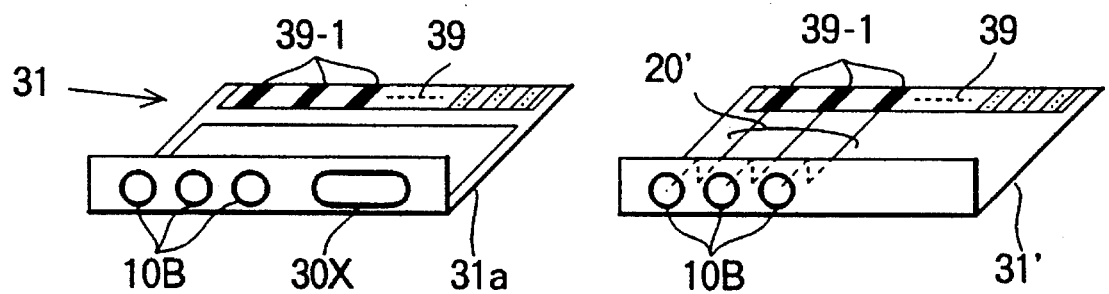
FIG. 11B is a perspective view showing the board of an expansion/compression processing circuit.
FIG. 11C is a perspective view showing the board of a dummy.

FIGS. 11A, 11B, 11C are perspective views showing a video display unit.

In FIG. 11A, a housing 1a includes an input terminal 10A for the video signal A, input terminals 40A, 40B for the sync signals $A_1$, $B_1$ corresponding to the video signals A and B respectively, an insertion slot 600 for the board 31a of the expansion/compression processing circuit 31 for processing signals for expansion/compression of the video signal B, and an input terminal 30W for receiving the synthesis designation signal W for controlling the display of the video signals A, B.

FIG. 11B shows a board 31a for the expansion/compression processing circuit 31 for expanding/compressing the signal B. The board 31a has mounted thereon, for example, an A-D conversion circuit, a memory circuit, a D-A conversion circuit, a write/read control circuit, etc., and further includes an input terminal 10B for the video signal B, an input terminal 30X for receiving the expansion designation signal X and a plurality of input/output terminals 39 having at least an output terminal 39-1 for the video signal B connecting to the video display unit 1.

FIG. 11C shows a dummy circuit board 31' for producing the video signal to the video display unit 1 without any signal processing, which board 31' includes an input terminal 10B for the video signal B and a plurality of input/output terminals 39 at least having an output terminal 39-1 for the video signal B. The video signal B applied from the input terminal 10B is directly produced as an output on the output terminal 39-1 through a connecting line 20'.

With the circuit board 31a for the expansion/compression processing circuit 31 inserted in the video display unit 1 as described above, the screen synthesis circuit 5 of the video display unit 1 is controlled, thereby permitting the display of the video signal A and the video signal B and the display by synthesis of the video signal A and the video signal B. Further, the circuit carried on the board 31a of the expansion/compression processing circuit 31 is controlled through an expansion control terminal 30X, thereby making it possible to construct a multi-screen display system using the video display unit 1 with the board 31a of the expansion/compression processing circuit 31 inserted therein. Even when the number of expanded screens is increased, therefore, the housing 1a for accommodating the expansion/compression processing circuit 31 is not required to be increased in capacity for expansion operation.

With the board 31a of the expansion/compression processing circuit 31 removed and the dummy circuit board 31' inserted into the video display unit 1 for connecting the video signal B directly to the display for display thereon, on the other hand, the screen synthesis circuit 5 of the video display unit 1 is controlled, thereby making it possible to switch between the display of video signal A and video signal B. The video display unit 1 having the dummy circuit board 31' inserted therein as described above is usable not only for a multi-screen display system with an external screen processing unit for expansion but also as a general-purpose display at the same time.

The expansion/compression processing circuit 31, which is provided by the circuit shown in FIG. 1 as an example, can of course be realized also using the video display unit 1 shown in FIGS. 1 to 6 with equal effect. When the video display unit 1 shown in FIGS. 1 to 6 is used, however, a plurality of board insertion slots 600 must be employed in FIG. 11A.

FIG. 12 is a block diagram showing a video display unit 1 having the dummy circuit board 31' shown in FIG. 11C inserted therein. This video display unit 1 is for displaying by switching two analog video signals on an analog display 8.

The dummy board circuit 31' shown in FIG. 12, which is the simplest one of examples, connects an input terminal 10B for the video signal B and a video output terminal 39-1. The other component parts are similar to those described with the aforementioned video display unit having identical reference numerals respectively and therefore will not be described in detail any more.

The video display unit 1 shown in FIG. 12 operates as described below.

The video signal A applied from the input terminal 10A is input to the screen synthesis circuit 5 as one of the signals to be synthesized. The video signal B applied from the input terminal 10B, on the other hand, passes through the dummy circuit board 31' without being processed, and is applied to the screen synthesis circuit 5 as the other signal to be synthesized. The video signal thus screen-synthesized, after being processed for amplitude adjustment or contour correction at the image processing circuit 7, is displayed on the analog display 8.

Figure 13:
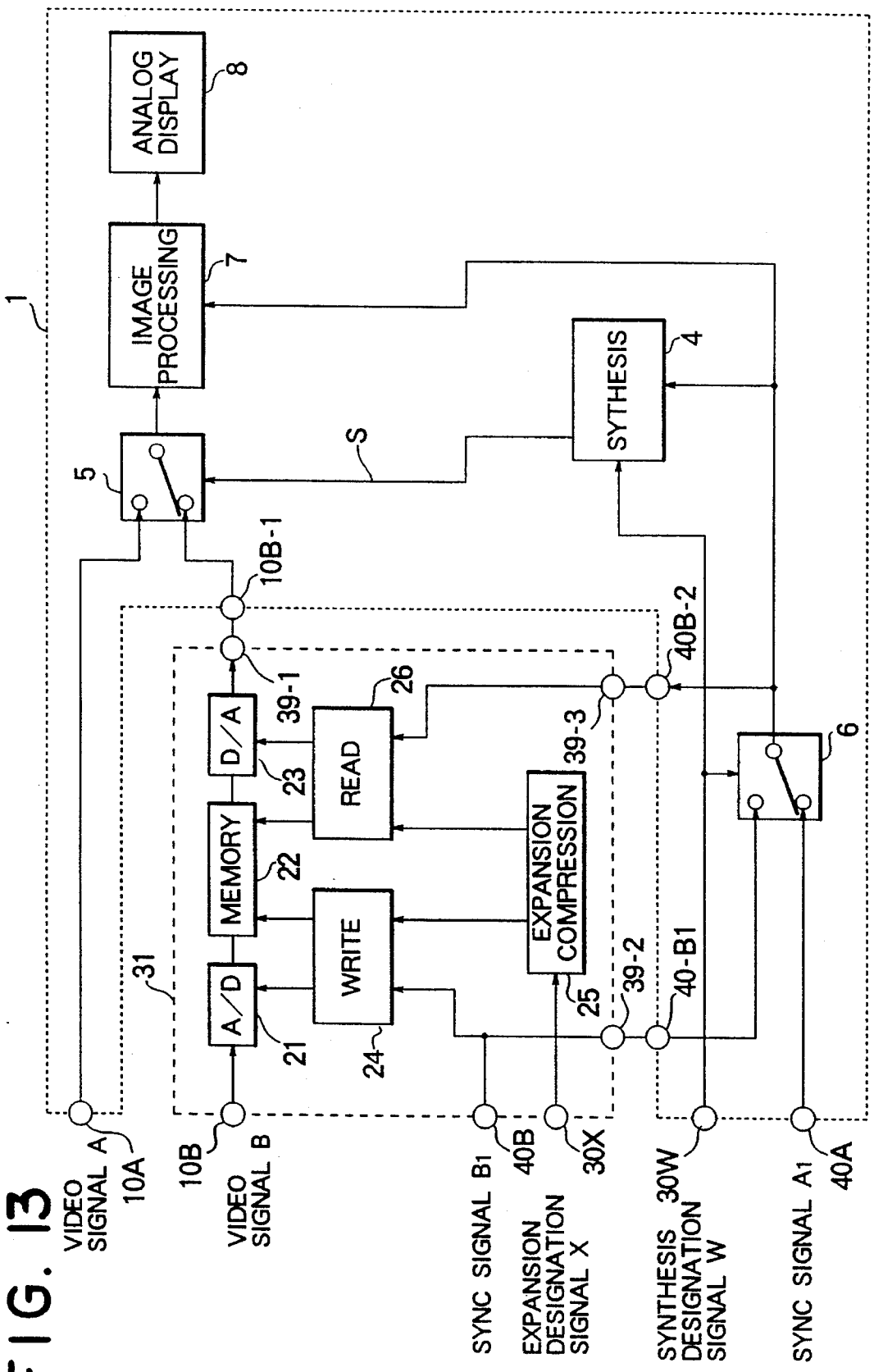
FIG. 13 is a diagram showing the circuit configuration of another example of the video display system.

FIG. 13 is a block diagram showing another example of the video display unit 1. This video display unit 1 has an input terminal 40B for the sync signal B1 arranged on the board 31a of the expansion/compression processing circuit 31. The other component parts are similar to those of the video display unit described above with identical reference numerals respectively and will therefore not be described any more.

Figure 14:
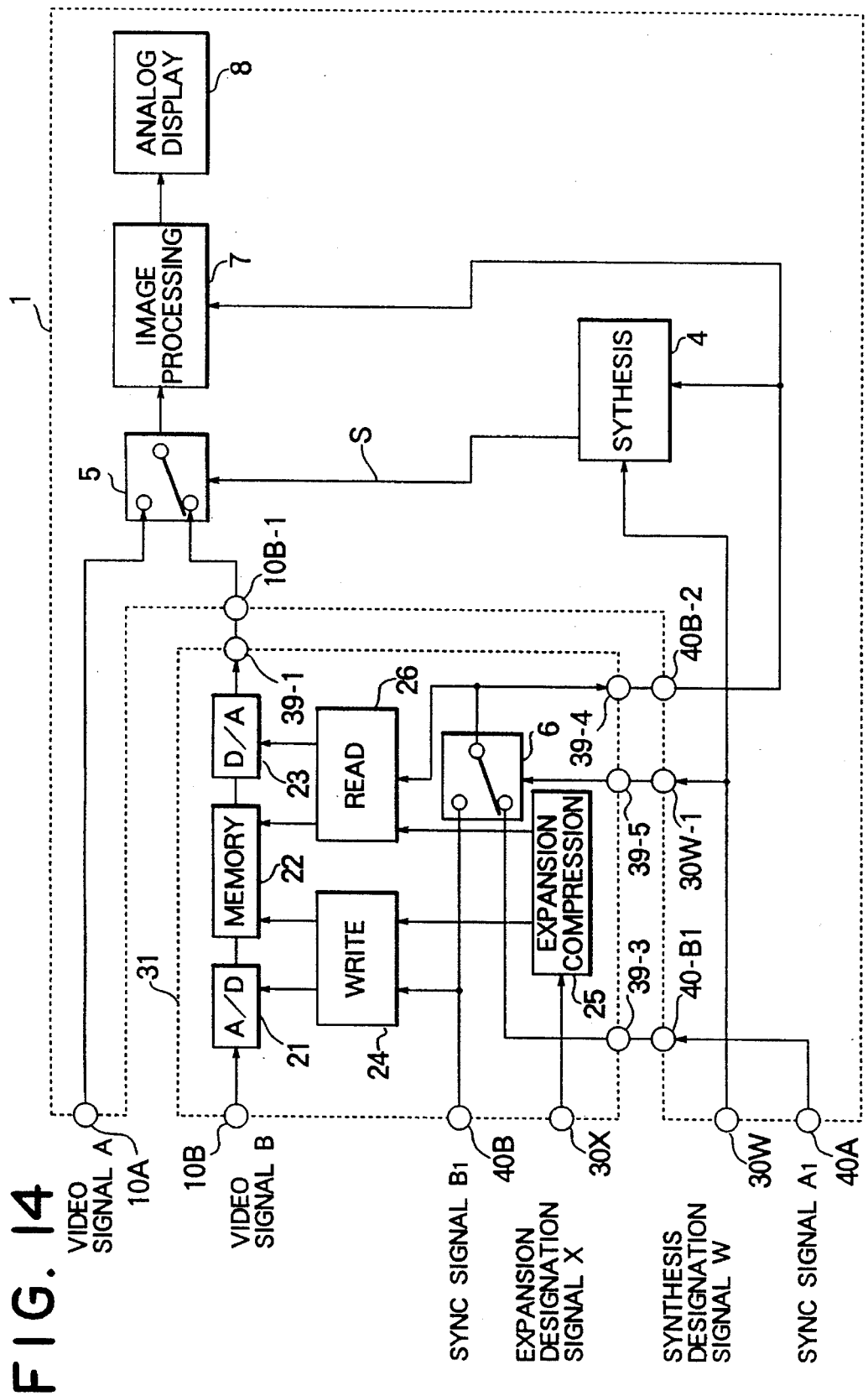
FIG. 14 is a diagram showing the circuit configuration of another example of the video display system.

Still another example of the video display unit 1 is shown in the block diagram of FIG. 14. In this video display unit 1, an input terminal 40B for the sync signal $B_1$ is arranged on the board 31a of the expansion/compression processing circuit 31, and in addition a sync switching circuit 6 is disposed on the same board 31a. The configuration of the remaining component parts is identical to that of the corresponding parts of the other video display units and, with the identical reference numerals attached thereto, will not be described any more.

Figure 15:
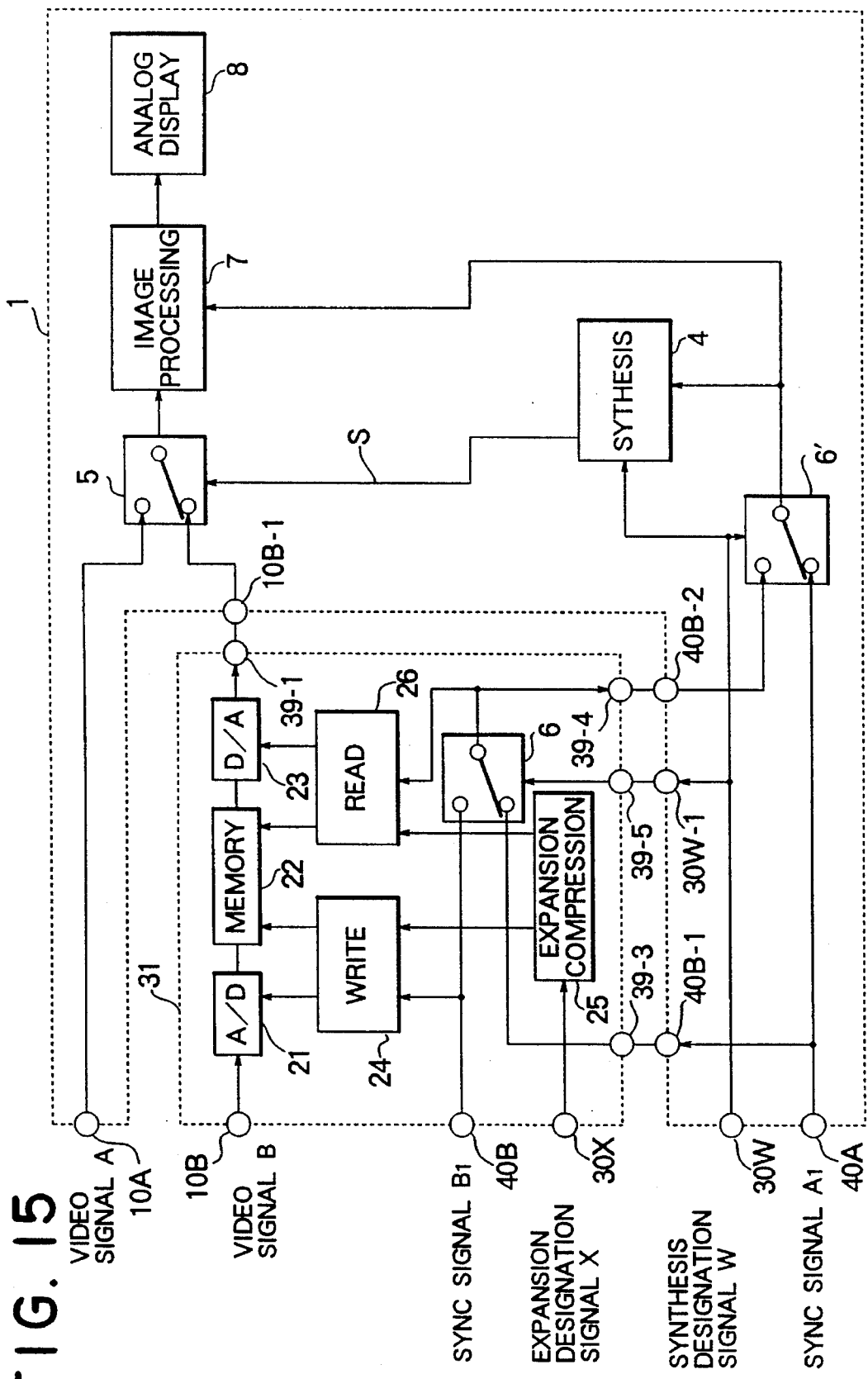
FIG. 15 is a diagram showing the circuit configuration of another example of the video display system.

FIG. 15 is a block diagram showing a further example of the video display unit 1. This video display unit 1 is capable of displaying the video signal A independently on the body thereof. The other component parts of this video display unit are similar to and bear the same reference numerals as the corresponding parts of the other video display units described above respectively and therefore will not be described any more below.

The configuration of the video display unit 1 shown in FIG. 15, as compared with that of FIG. 14, has a sync switching circuit 6' added thereto.

In the configuration of the video display unit 1 shown in FIG. 15, however, the sync signal $A_1$ can be applied to the body of the video display unit 1 without any board 31a of the expansion/compression processing circuit 31 inserted therein, with the obvious result that the video signal A can be displayed simply with the body of the video display unit 1.

Figure 16:
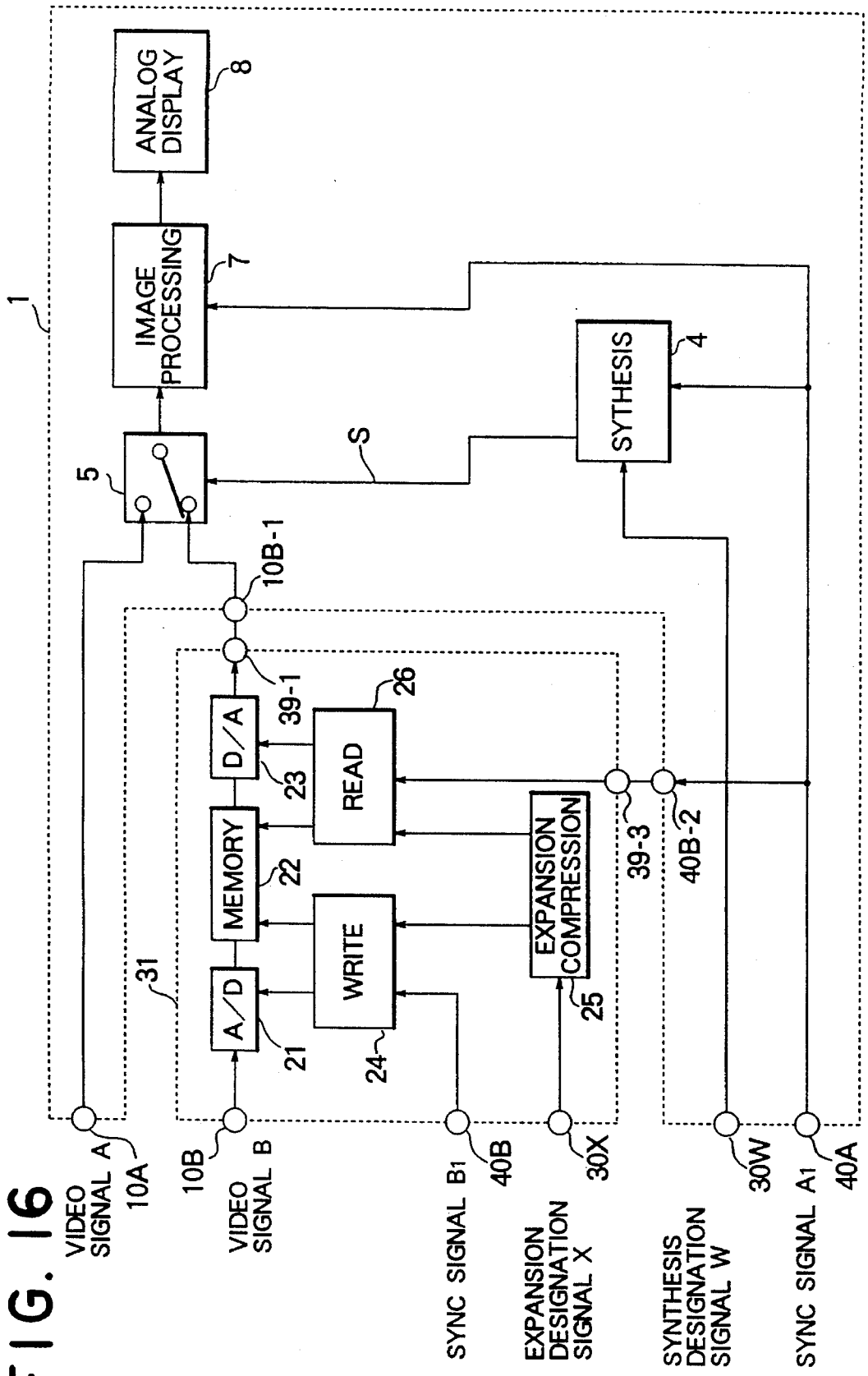
FIG. 16 is a diagram showing the circuit configuration of another example of the video display system.

Another example of the video display unit 1 is shown in the block diagram of FIG. 16. This video display unit 1 lacks the sync switching circuit 6.

The video display unit 1 shown in FIG. 16 is different from that shown in FIG. 13 in that in FIG. 16, the read control circuit 16 is operated based on the sync signal $A_1$.

In the configuration of the video display unit 1 shown in FIG. 16, the sync signal $B_1$ is used only for the write control circuit 24 for the board 31a of the expansion/compression processing circuit 31. As a result, a dummy circuit board 31' is inserted into the video display unit 1 in place of the board 31a of the expansion/compression processing circuit 31 shown in FIG. 16. The remaining component parts in FIG. 16 have the same configuration and the same reference numerals respectively as the corresponding ones of the other video display units described herein and therefore will not be described any more.

Figure 17:
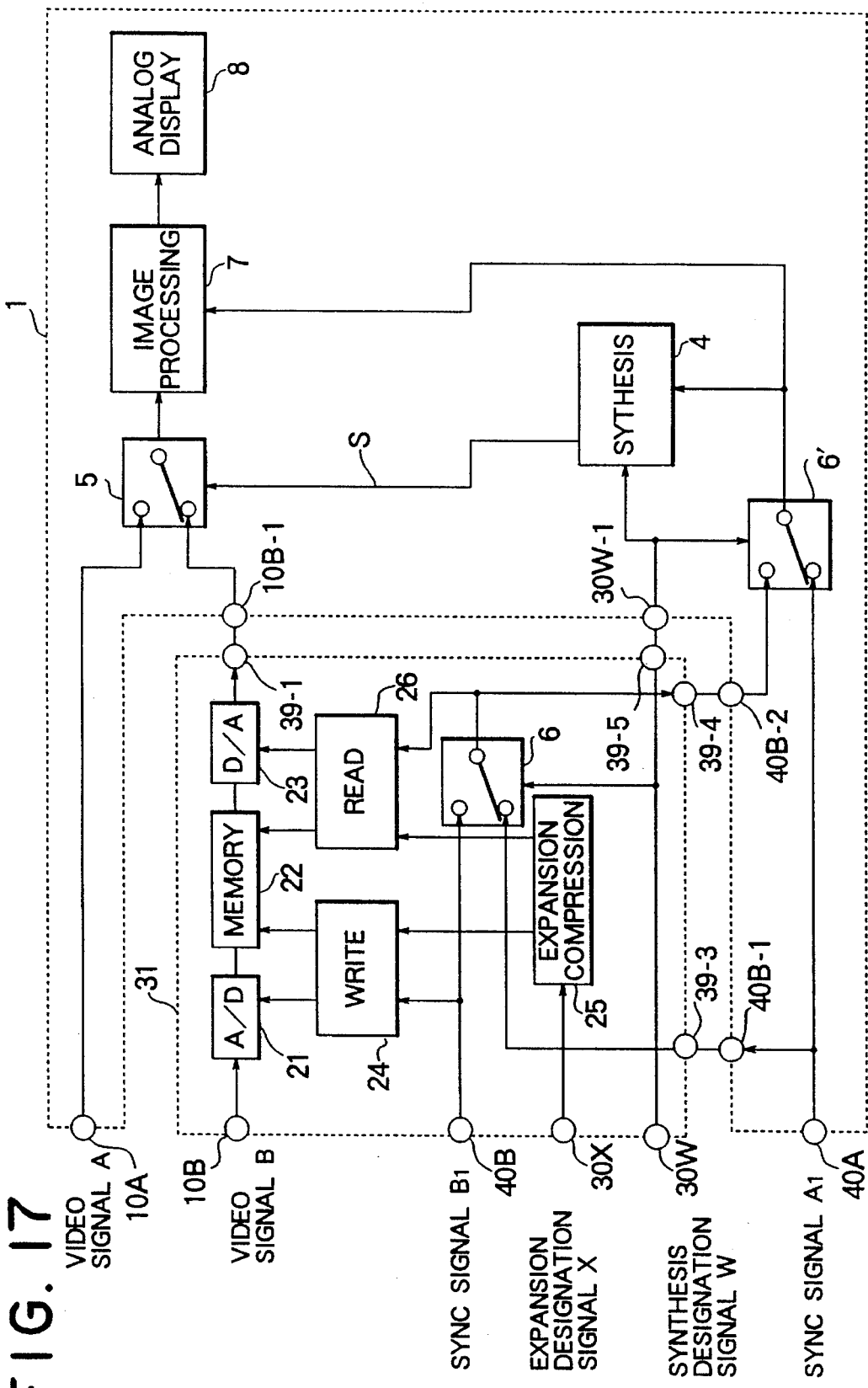
FIG. 17 is a diagram showing the circuit configuration of another example of the video display system.

Still another example of the video display unit 1 is shown in the block diagram of FIG. 17. In this video display unit 1, an input terminal 30W is arranged on the board 31a of the expansion/compression processing circuit 31.

More specifically, the video display unit 1 shown in FIG. 17 is different in configuration from that of FIG. 15 in that in FIG. 17 an input terminal 30W is arranged on the board 31a of the expansion/compression processing circuit 31 and the video display unit 1 is supplied with a synthesis control signal W through terminals 39-5 and 30W-1. The other component parts have exactly the same configuration and bear the same reference numerals as the corresponding parts respectively of the video display unit shown in FIG. 15, and therefore will not be described any more below.

Figure 18:
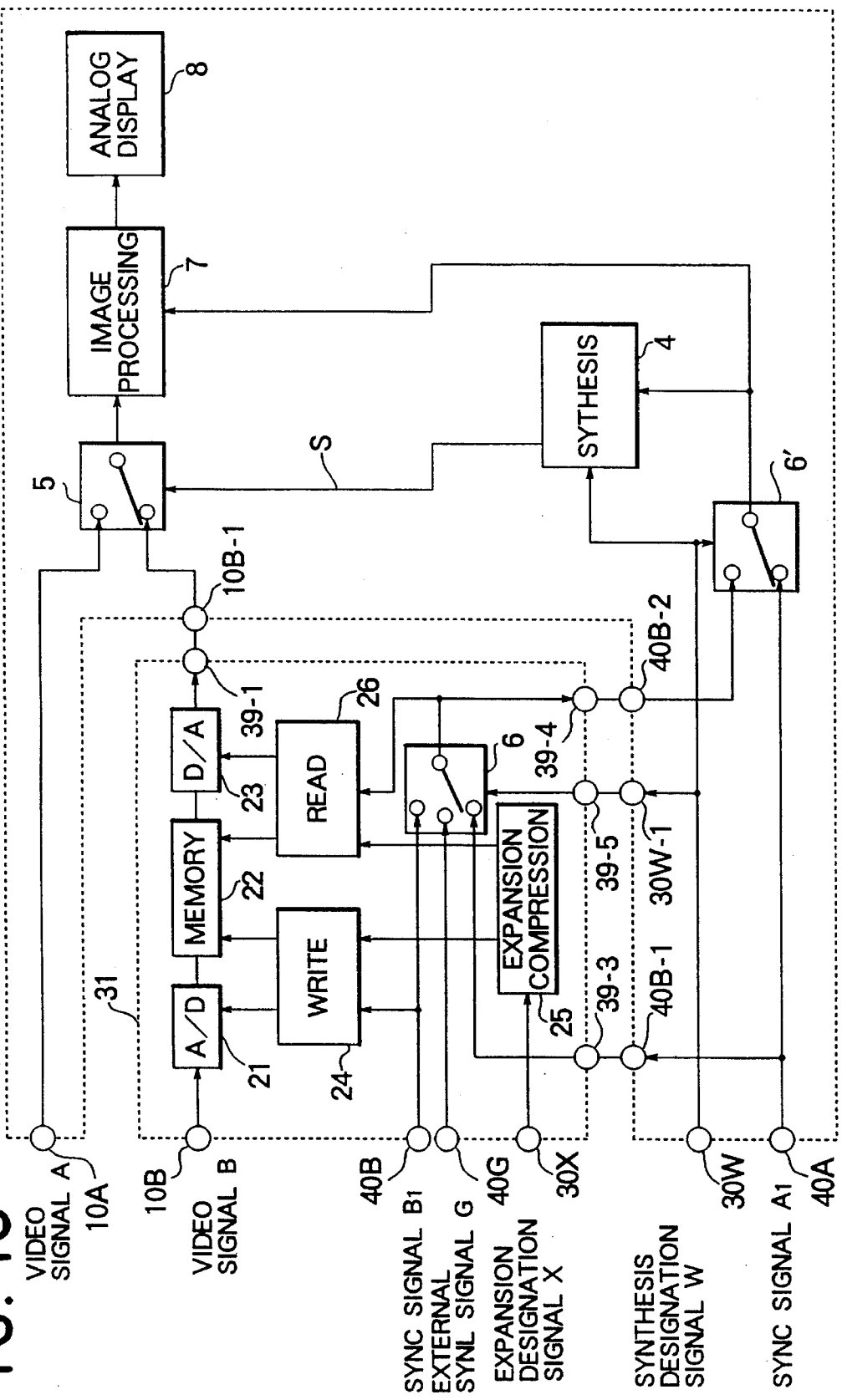
FIG. 18 is a diagram showing the circuit configuration of another example of the video display system.

FIG. 18 is a block diagram showing still another example of the video display unit 1. This video display unit 1 is the same as the video display unit 1 shown in FIG. 15 except that in FIG. 18 an input terminal 40G for the external sync signal G, in addition to that for the sync signal $B_1$, is added to the board 31a of the expansion/compression processing circuit 31.

More specifically, the configuration of the video display unit 1 shown in FIG. 18 is different from that of FIG. 15 in that the input terminal 40G for the external sync signal G is added to the board 31a of the expansion/compression processing circuit 31 so that the sync signal $A_1$, the sync signal $B_1$ and the sync signal G are applied to and outputted by being switched at a three-input sync switching circuit 6. The other components parts are identical in the two diagrams, and with identical reference numerals being attached to them respectively, will not be described below.

In this way, in the video display unit 1 shown in FIG. 18, the functions of the read control circuit 26 are increased by the external sync signal G, and therefore in addition to the operation performed in FIG. 15, expanded/compressed display of the video signal B is possible in synchronism with the external sync signal G.

Figure 19:
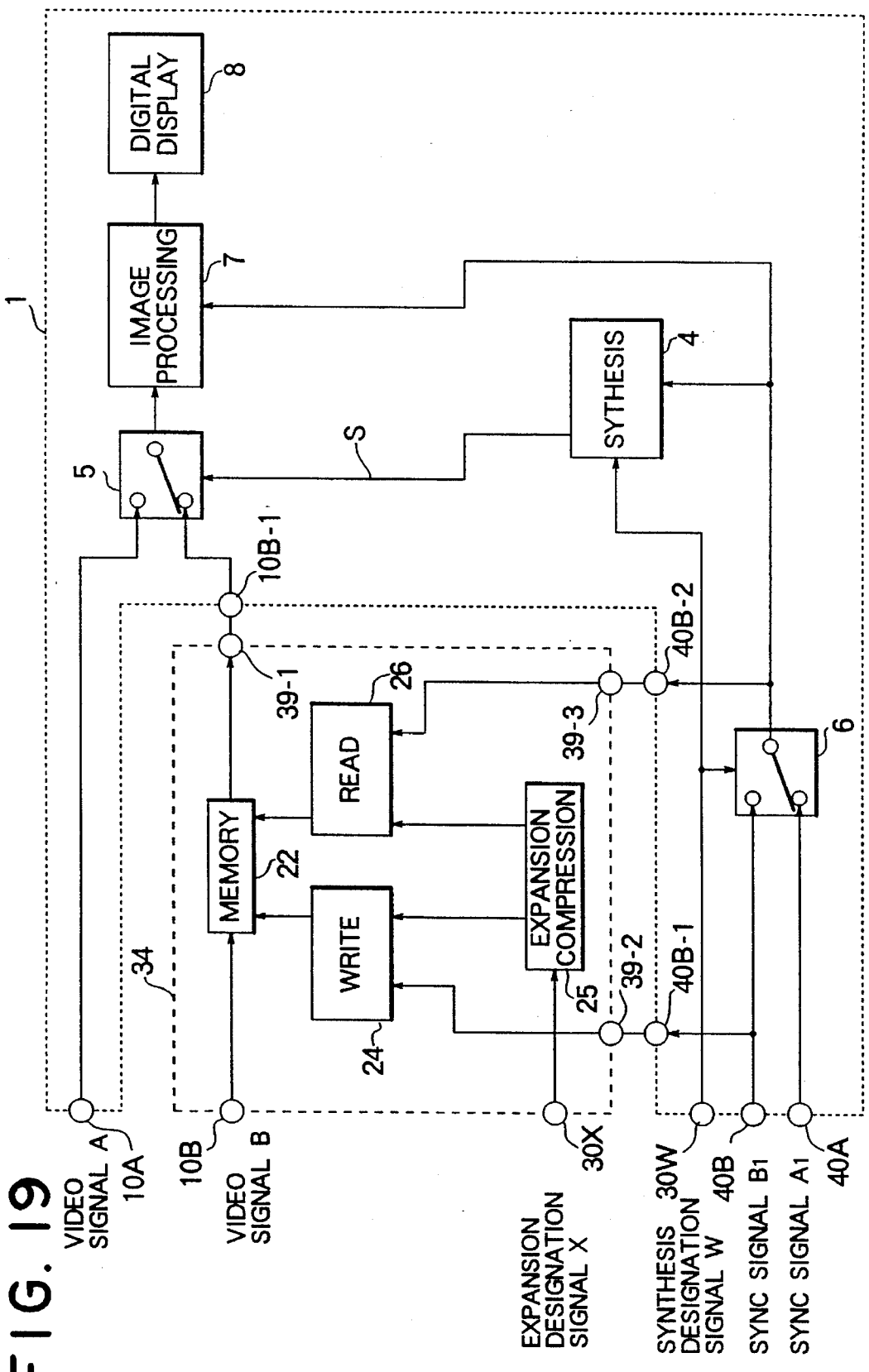
FIG. 19 is a diagram showing the circuit configuration of another example of the video display system.

FIG. 19 is a block diagram showing still another example of the video display unit 1. This video display unit 1 is for synthesizing and displaying two digital video signals A and B on a digital display 9.

In the configuration of the video display unit 1 shown in FIG. 19, the D-A conversion circuit 23 in FIG. 4 is deleted and the analog display 8 is replaced by the digital display 9.

As a result, according to the video display unit 1 shown in FIG. 19, the video signal A and the video signal B having different frequencies are applied to display the video signal directly, the signal B directly, or an synthesized screen of the video signal A and the video signal B on the digital display 9. The other component parts of the configuration are similar to those shown in the other embodiments respectively and, with identical reference numerals attached thereto, will not be described below.

Figure 20A:
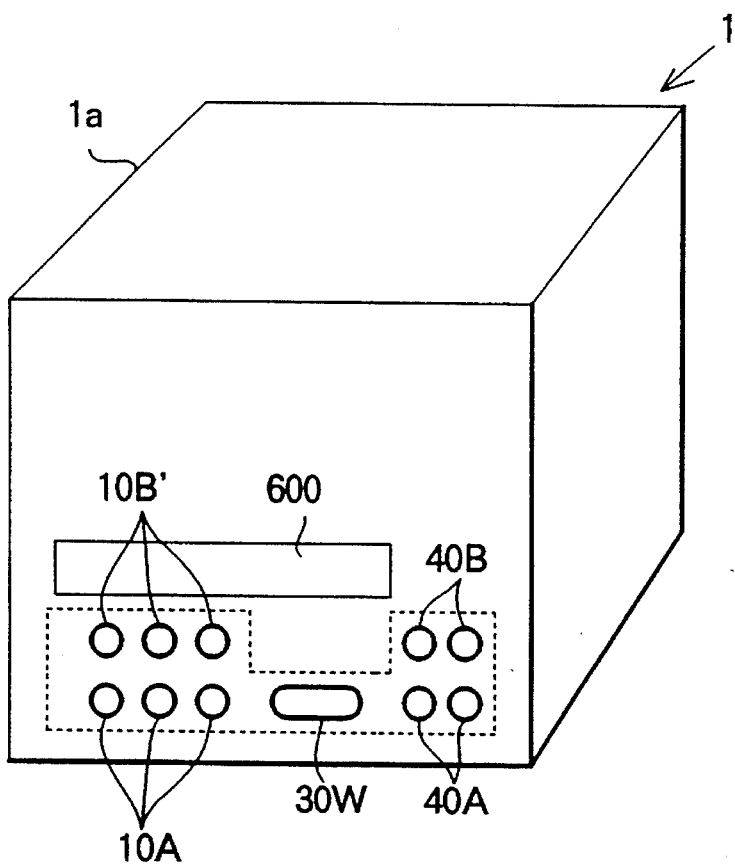
FIG. 20A is a perspective view showing the external appearance of a video display system.
Figures 20B, 20C:
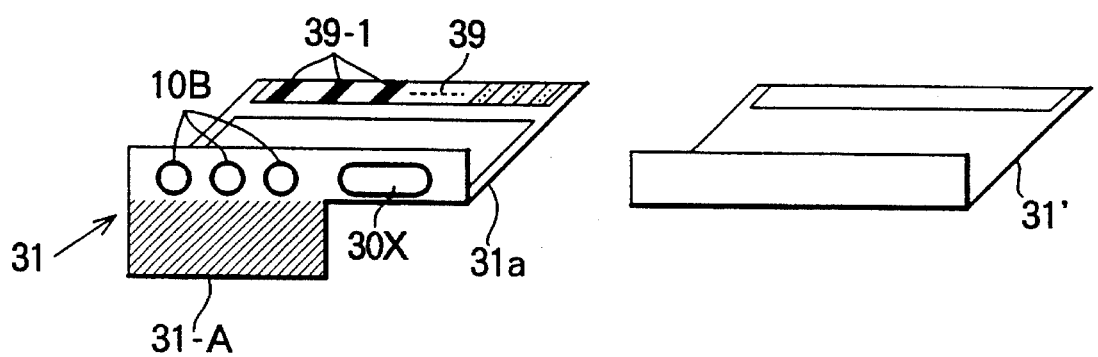
FIG. 20B is a perspective view showing the board of the expansion/compression processing circuit.
FIG. 20C is a perspective view showing a dummy circuit board.

FIGS. 20A, 20B, 20C are perspective views showing another video display unit 1. The difference of the video display unit 1 under consideration from the video display unit 1 shown in FIGS. 11A, 11B, 11C lies in that an input terminal cover plate 31-A extends from the board 31a.

With the board 31a of the expansion/compression processing circuit 31 inserted, concurrent equipment of the input terminal 10B' for the body of the video display unit 1 and the input terminal 10B for expansion processing would complicate the display control. In view of this, the input terminal 10B' is hidden behind the input terminal cover plate 31-A for the board 31a of the expansion/compression processing circuit 31.

Also, as shown in FIG. 20C, the dummy circuit board 31' has the function of only hiding the insertion slot 600. In other words, the only function of the dummy circuit board 31' is to hide the board insertion slot 600 without any circuit operations.

FIG. 21 is a block diagram showing a further example of the video display unit 1 with the board 31a of FIG. 20A inserted therein. In this video display unit 1, a specific one of two analog video signals is expanded, synthesized in analog fashion and displayed on the analog display 8.

The configuration of the video display unit 1 shown in FIG. 21 includes an input terminal 10B' for the video signal B, and a signal switching circuit 5' for selectively switching the images from the input terminal 10B' and the terminal 10B-1 and supplying them to screen synthesis circuit 5. The other component parts of the embodiment shown in FIG. 21 are similar to the corresponding component parts in the other embodiments designated by identical reference numerals respectively, and therefore will not be described below.

The signal switching circuit 5' is controlled to permit the following operations, for example:

(1) With the board 31a of the expansion/compression processing circuit 31 inserted, the video signal from the terminal 10B-1 is switched, while in the absence of the board 31a of the expansion/compression processing circuit 31 inserted, the video signal from the input terminal 10B' is switched. As a result, when the board 31a of the expansion/compression processing circuit 31 is inserted, an expanded display or a synthesized display of the video signal A and the video signal B is possible. In the case where the board 31a of the expansion/compression processing circuit 31 is not inserted, by contrast, the switching for direct display is possible between the video signal A and the video signal B. This operation is derived from the provision of the input terminal cover plate 31-A of the board 31a as shown in FIG. 20B.

(2) The signal switching circuit 5' is operated with the board 31a of the expansion/compression processing circuit 31 inserted. This makes possible the switching between the direct display of the video signal A, an expanded display of the video signal B and the direct display of the video signal B. This operation is realized in the absence of the input terminal cover plate 31-A of the board 31a as shown in FIG. 20B.

Figure 22A:
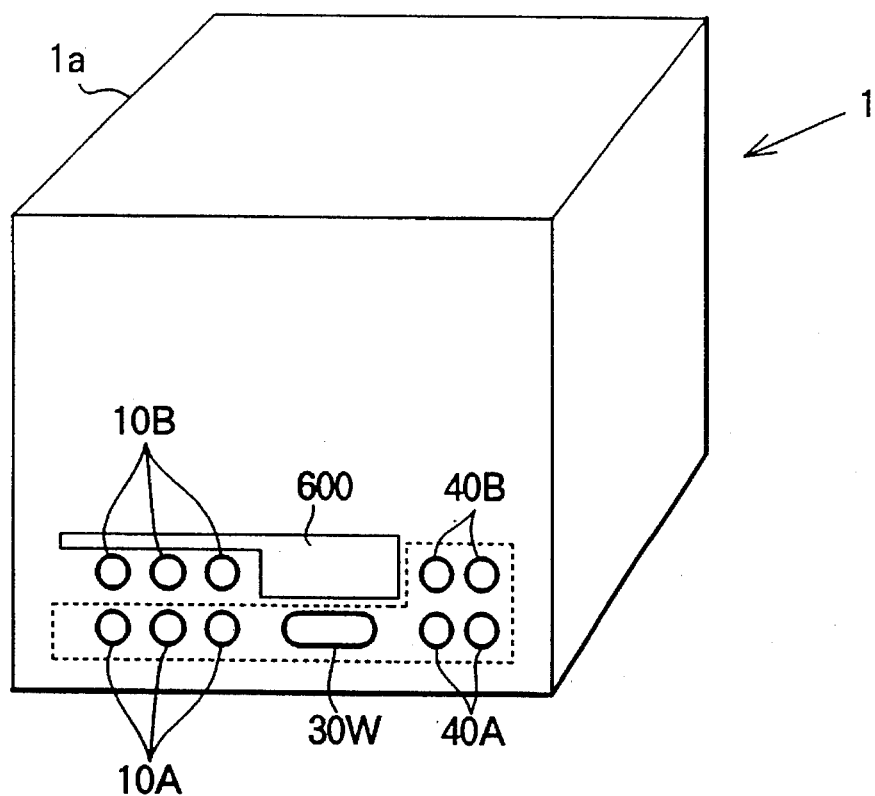
FIG. 22A is a perspective view showing the external appearance of a video display system.
Figures 22B, 22C:
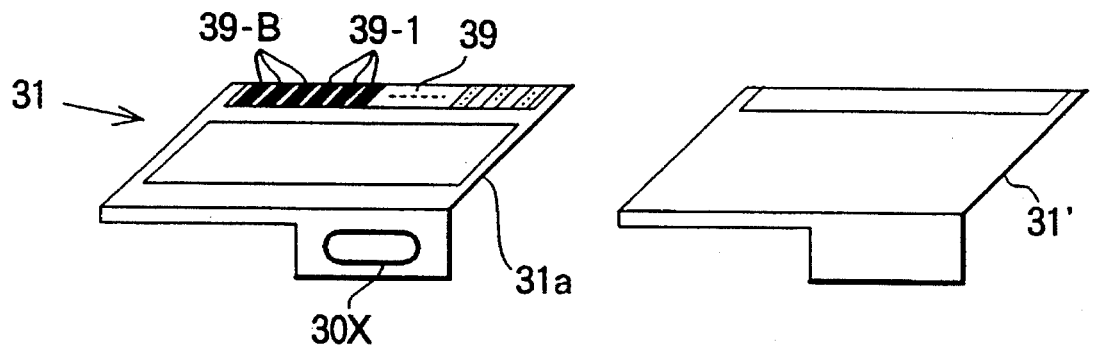
FIG. 22B is a perspective view showing the board of the expansion/compression processing circuit.
FIG. 22C is a perspective view showing a dummy circuit board.

FIGS. 22A, 22B, 22C are perspective views showing a still further example of the video display unit 1.

The video display unit 1 shown in FIG. 22A is different in configuration from that shown in FIGS. 11A, 11B, 11C in that the body of the video display unit 1 includes two classes of input terminals required for direct display of the video signal A or the video signal B.

The board 31a of the expansion/compression processing circuit 31 shown in FIG. 22B includes an input terminal 30X for the expansion designation signal X, an input terminal 39-B for the video signal B to connect the video display unit 1, and an input-output terminal 39 having at least an output terminal 39-1 for the video signal B.

The dummy circuit board 31' shown in FIG. 22C has only the function of hiding the insertion slot 600. In other words, the only function of the dummy circuit board 31' is to hide the board insertion slot 600 without any circuit-operating function.

Figure 23:
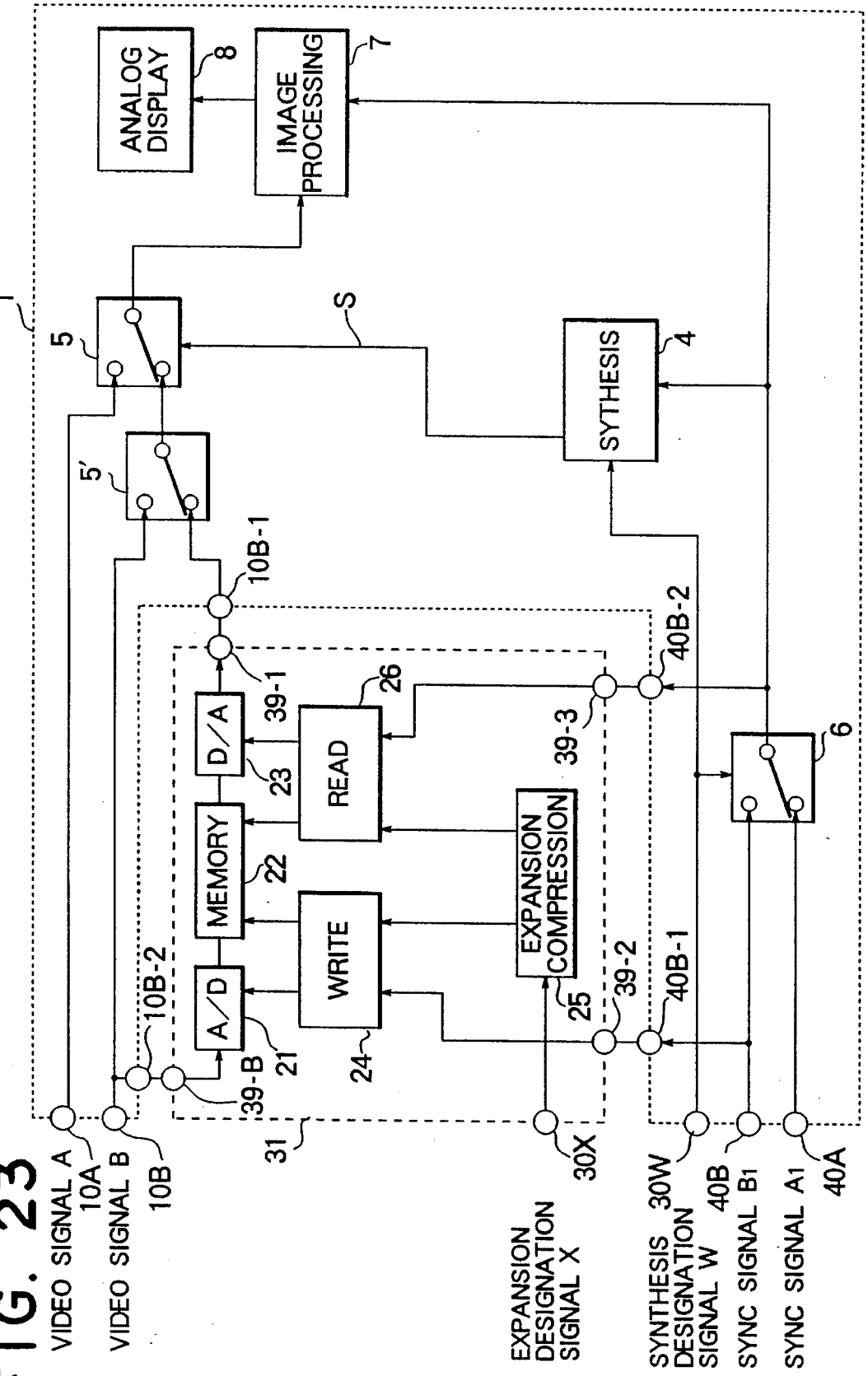
FIG. 23 is a diagram showing the circuit configuration of another example of the video display system.

A video display unit 1 with the board 31a of FIG. 22A inserted therein is shown in the block diagram of FIG. 23. This video display unit 1 is adapted to expand specific one of two analog video signals and display an analogically-synthesized signal on an analog display 8.

The feature of the video display unit 1 shown in FIG. 23 lies in the body thereof including an input terminal 10B for the video signal B, an output terminal 10B-2 for supplying the video signal B to the board 31 of the expansion/compression processing circuit, and a signal switching circuit 5' for selectively switching the video signal from the terminals 10B' and 10B-1 and applying it to the screen synthesis circuit 5, and also the board 31a including an input terminal 39-B supplied with the video signal B from the video display unit 1.

As a consequence, the operation described below is made possible by controlling the signal switching circuit 5' as in the case of FIG. 21.

Figure 24:
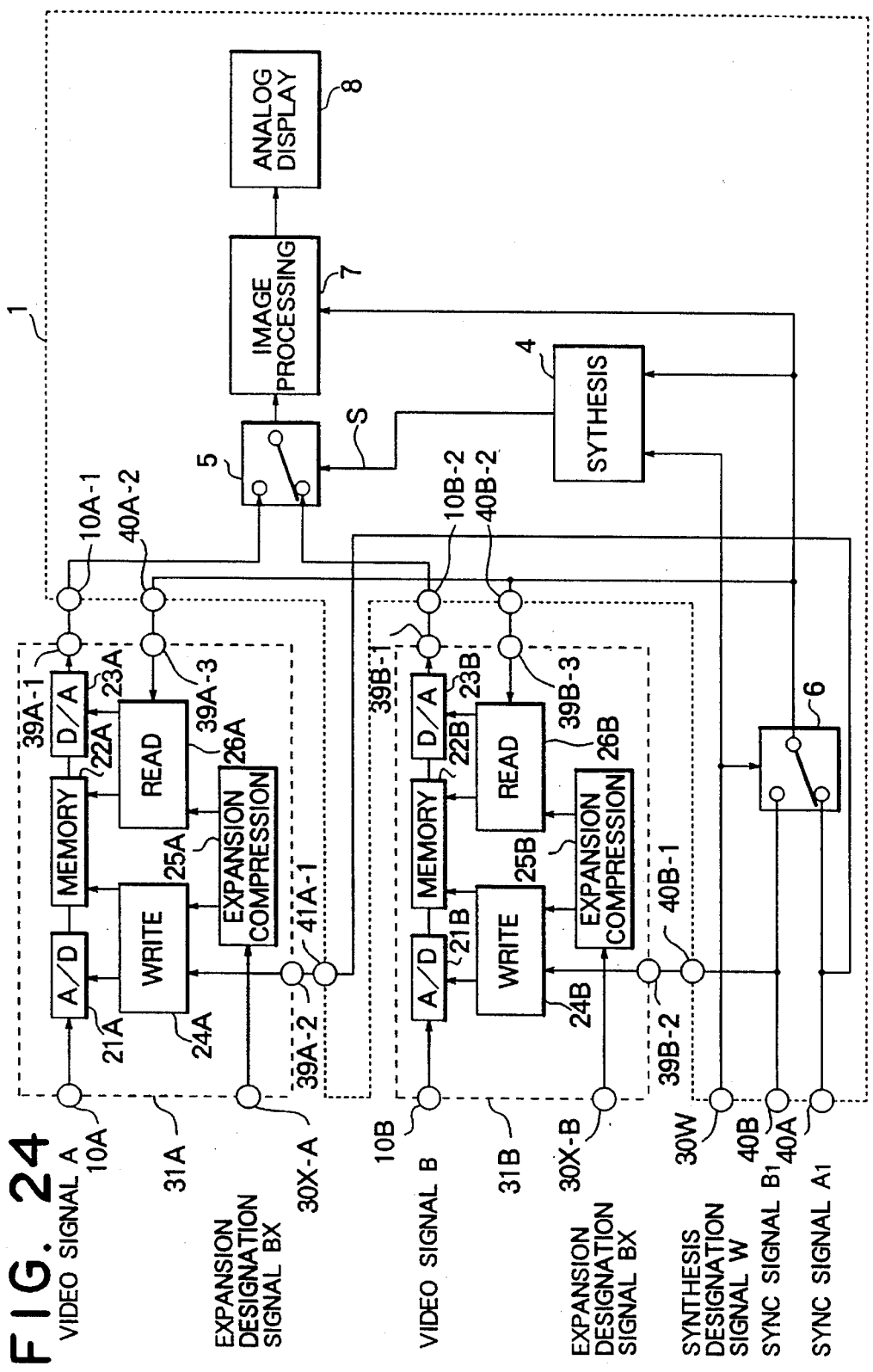
FIG. 24 is a diagram showing the circuit configuration of another example of the video display system.

FIG. 24 is a block diagram showing the video display unit 1 with two boards 31a, 31b of the expansion/compression processing circuit 31 inserted therein. This video display unit 1 is adapted to expand and synthesize in analog fashion the two analog video signals and display them on the analog display 8. This video display unit 1, which is identical to that shown in FIG. 5, has the the expansion/compression processing circuit 25A controlled by the expansion designation signal AX and the expansion/compression processing circuit 25B controlled by the expansion designation signal BX.

Figure 25:
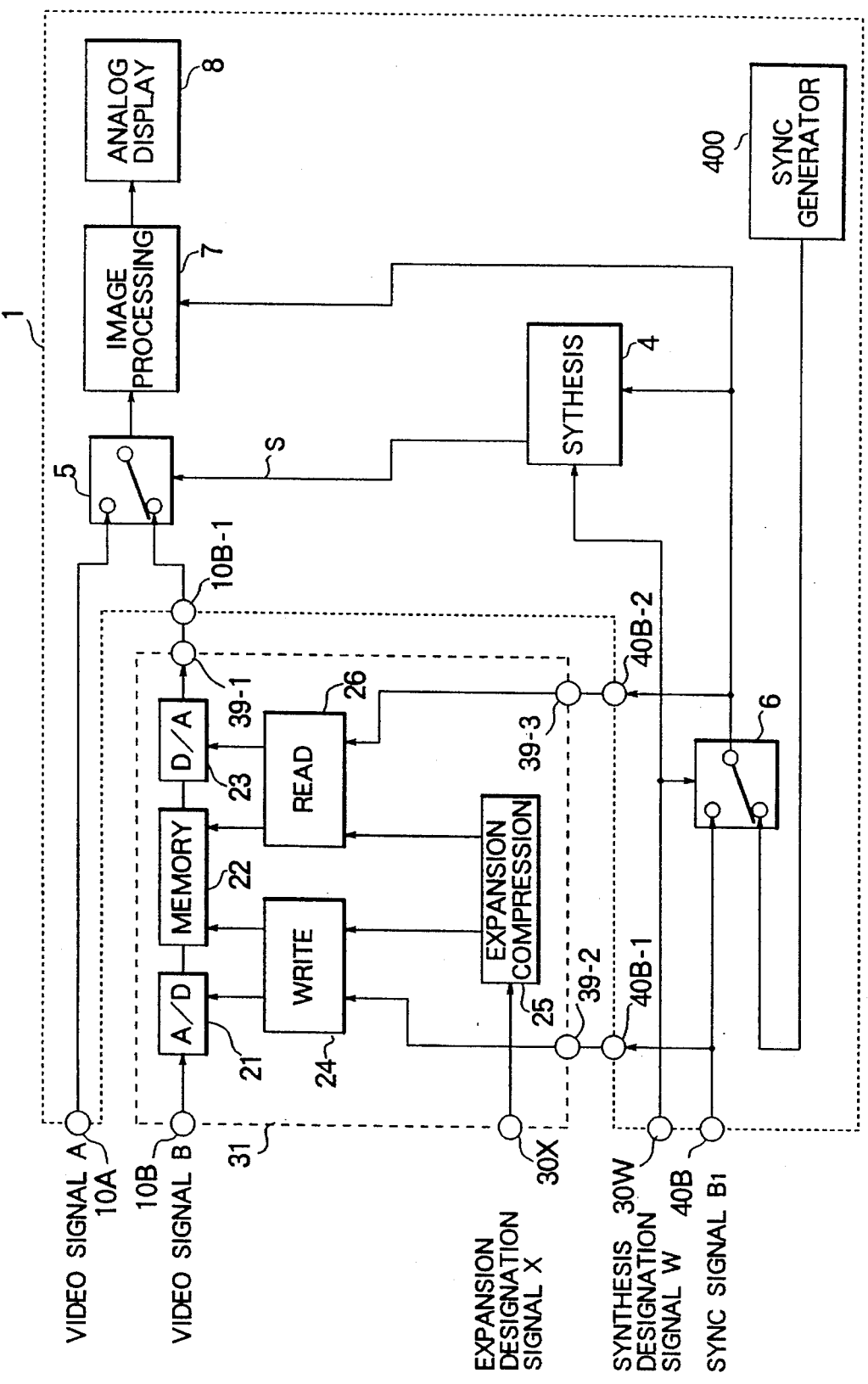
FIG. 25 is a diagram showing the circuit configuration showing another example of the video display system.

FIG. 25 is a block diagram showing still another example of the video display unit 1. This video display unit 1 includes a sync generation circuit 400 for driving an analog display 8.

This video display unit 1 shown in FIG. 25 is so configured that the input terminal for the sync signal $B_1$ is eliminated and a sync generation circuit 400 for generating the sync signal $A_1'$ is built in to be switched with the sync signal $B_1$.

The video display unit shown in FIG. 25 is capable of the following operations:

(1) With the board 31a of the expansion/compression processing circuit 31 inserted, the video signal B is expanded/compressed by the sync signal $B_1$, so that only the screen for processing the video signal B is displayed in synchronism with the sync signal $A_1'$ or $B_1$.

(2) With the dummy circuit board 31' inserted for supplying the video signal B, the video signal B is directly displayed by supplying the sync signal $B_1$ to the input terminal 40B.

(3) In the absence of the board 31a of the expansion/compression processing circuit 31, on the other hand, the video signal A is applied to the input terminal 10A and the sync signal $A_1$ to the input terminal 40B in place of the sync signal $B_1$, whereby the video signal A is displayed directly.

As a result, in the video display unit 1 shown in FIG. 25, the expanded/compressed display screen for the video signal B can be displayed in synchronism with the internal or external sync signal with the board 31a inserted. In the absence of the board 31a, by contrast, the video signal A or B can be displayed directly.

According to the video display unit 1 shown in FIG. 15, including a sync switching circuit 6 which is so configured as to switch the sync signal $B_1$ and the sync signal $A_1'$ with two classes of input thereto, the synthesized display of the video signal A and the video signal B is limited. A configuration is possible, for example, in which the sync switching circuit 6 has three classes of input switched between the sync signal A1, the sync signal $B_1$ and the sync signal $A_1'$. In this case, in addition to the effect of the video display unit shown in FIG. 2, the video signal B can be expanded/compressed in synchronism with the internal sync signal $A_1'$.

Figure 26:
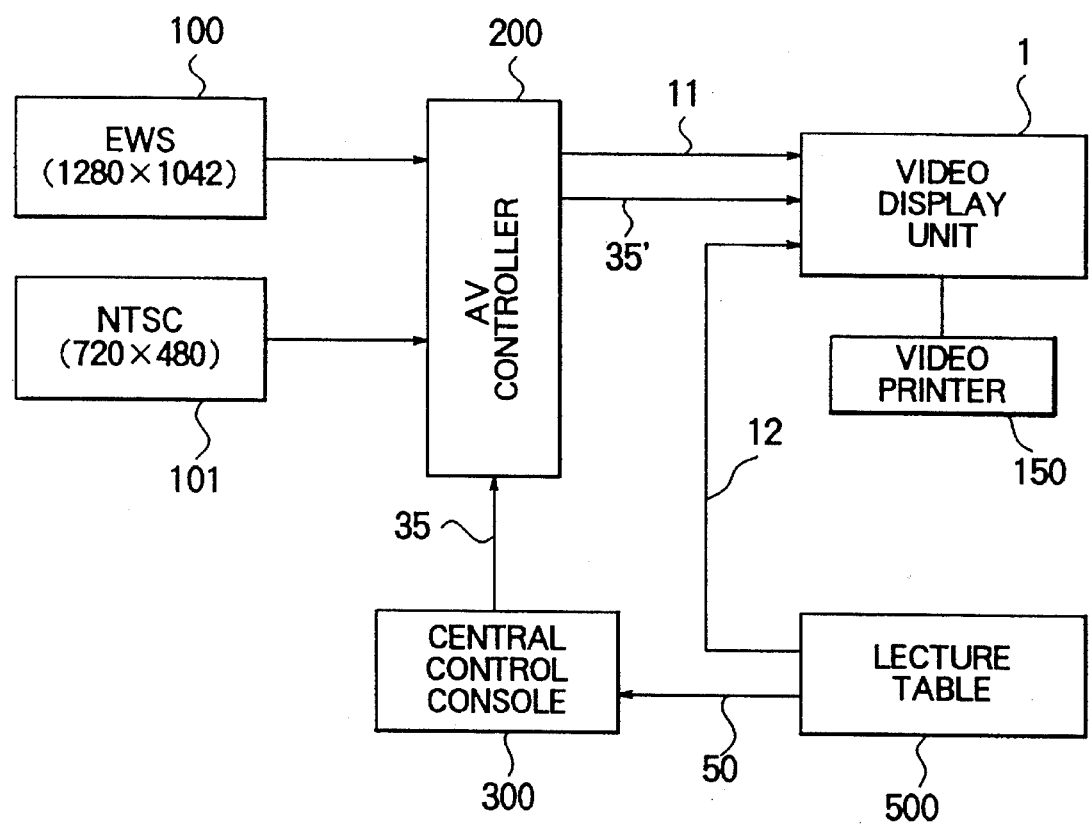
FIG. 26 is a block diagram showing a screen display system with a video display apparatus connected to a video printer.
Figure 27:
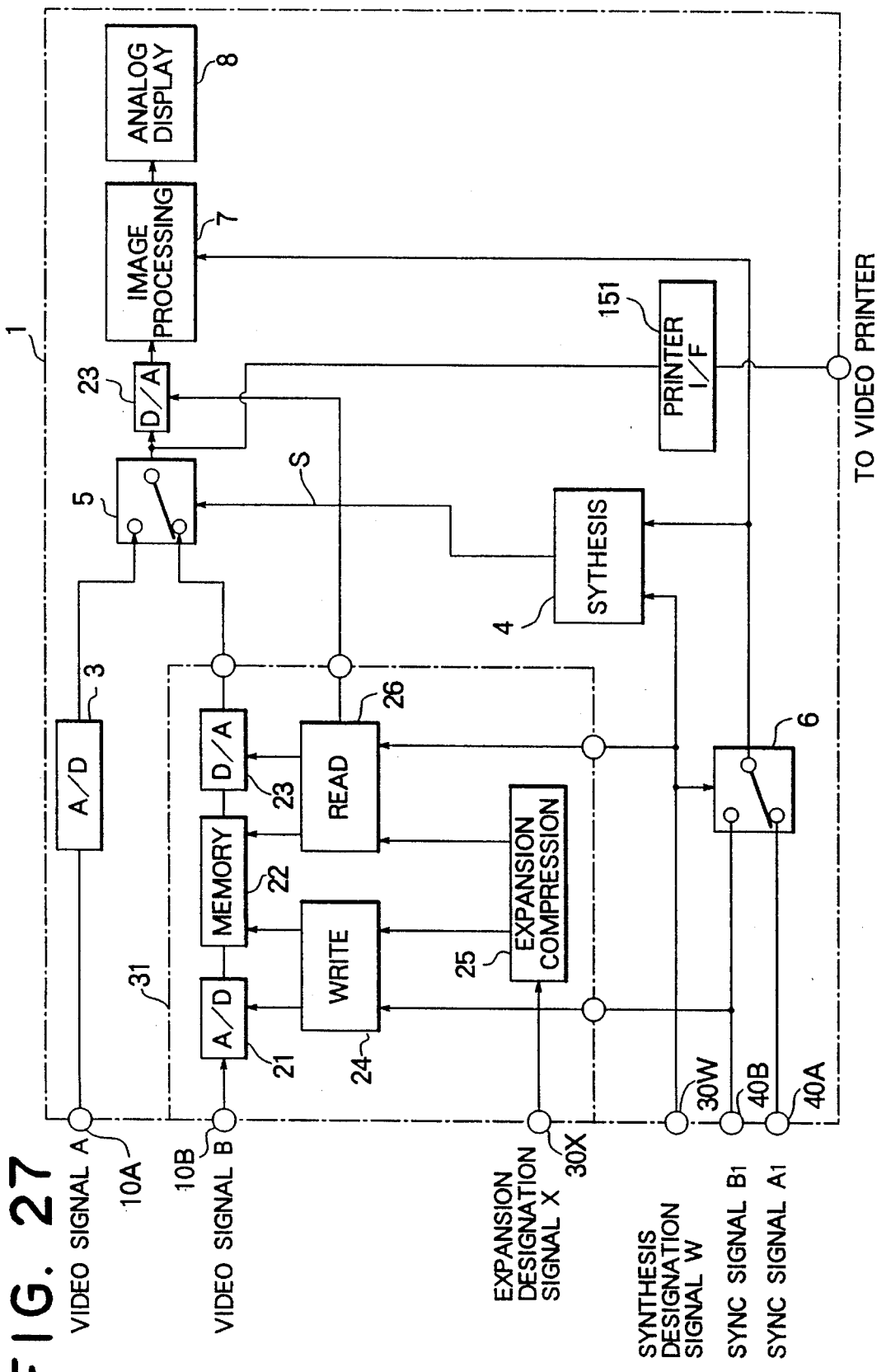
FIG. 27 is a diagram showing a circuit configuration of a video display apparatus used for the screen display system shown in FIG. 26.

FIG. 26 shows an example in which the video display apparatus for the screen display system shown in FIG. 8 is connected to a device capable of producing a hard copy of the display screen such as a video printer 150. The video printer 150, as shown in FIG. 27, is connected through a printer interface 151 to the output of the screen synthesis circuit 5 among the circuits of the video display apparatus 1. In this way, the provision of the video printer 150 permits the video signal resulting from the synthesis of the video signal A and the video signal B to be obtained as a hard copy from the video printer 150 after expansion/compression of the video signal B.

For simplicity, the video display apparatus 1 shown in FIG. 2 is used, and the video printer 150 is assumed to be a digital printer for inputting image information with digital signal, with the printer interface 151 for digital applications. The video display apparatus 1 usable with a digital printer may alternatively be the one as shown in FIGS. 4, 7 or 19 instead of the one in FIG. 2. Though not shown, an analog printer for inputting image information with analog signal may be used as the video printer 150. In the case where an analog printer is used, the printer interface 151 must of course be for analog applications. The video display apparatus shown in FIGS. 1A, 3, 5, 6, 12, 13, 14, 15, 16, 17, 18, 21, 23, 24 or 25 may be used with an analog printer.

Further, although the foregoing description concerns the case of a screen display system using a single video display apparatus 1 as shown in FIG. 8, the video printer 150 may be connected to each of a plurality of video display apparatuses used with a multi-screen display system as shown in FIG. 9 with equal effect. In this case, too, the video printer 150 may be of either digital or analog type, or dual digital-analog type.

Figure 28:
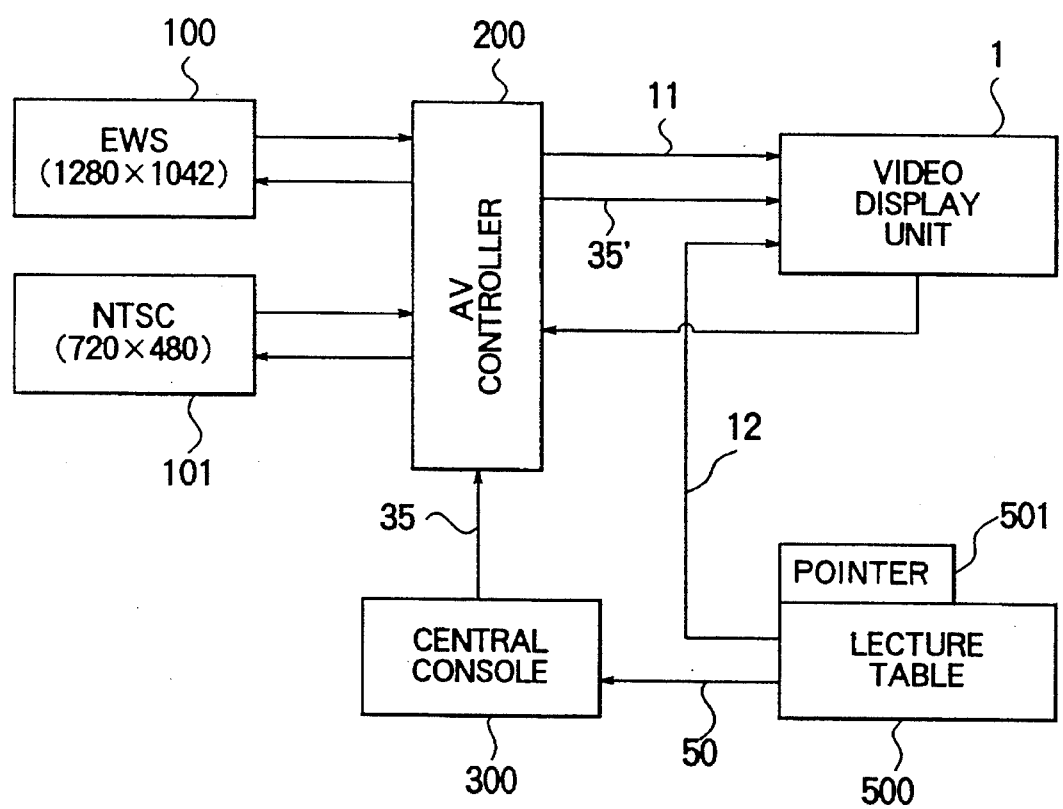
FIG. 28 is a block diagram showing a screen display system for displaying the pointer on the screen of a signal source.
Figure 29:
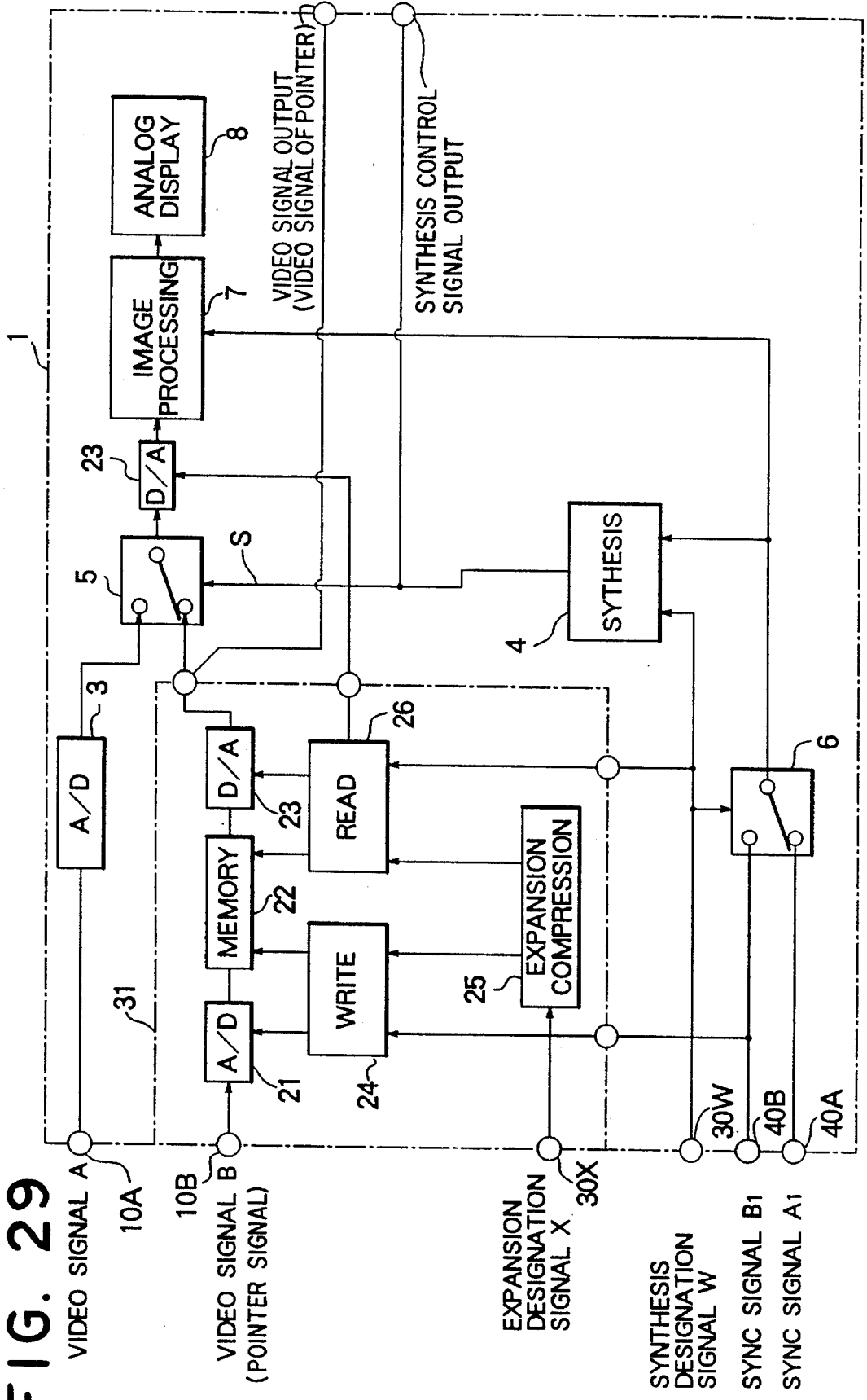
FIG. 29 is a diagram showing a circuit configuration of a video display apparatus used for the screen display system shown in FIG. 28.

FIG. 28 shows the case in which the lecture table 500 has an image signal source operated by the lectures such as a pointer generator 501. The video signal B as a pointer operated from the lecture table 500 is transmitted through a route 12, and the same video signal B and the synthesis control signal S indicating the position of the video signal B on the screen are transmitted from the video display apparatus 1 through the AV controller 200 to the signal sources 100 and 101. Further, with reference to FIG. 29, since the video signal B forming a pointer and the synthesis control signal S are transmitted to the signal sources 100, 101, it is possible to view the screen pointed by the movement of the pointer at the same time as on the video display apparatus 1 if the video signal A is displayed on the signal sources 100, 101. In this case, as described with reference to FIG. 26, a hard copy can be taken of the image displayed on the screen as far as the signal sources 100, 101 include the video printer 150. The case shown in FIG. 28, which concerns a given video display apparatus 1, is applicable with equal effect to each of the video display apparatuses of the multi-screen display system shown in FIG. 9.

Figure 30:
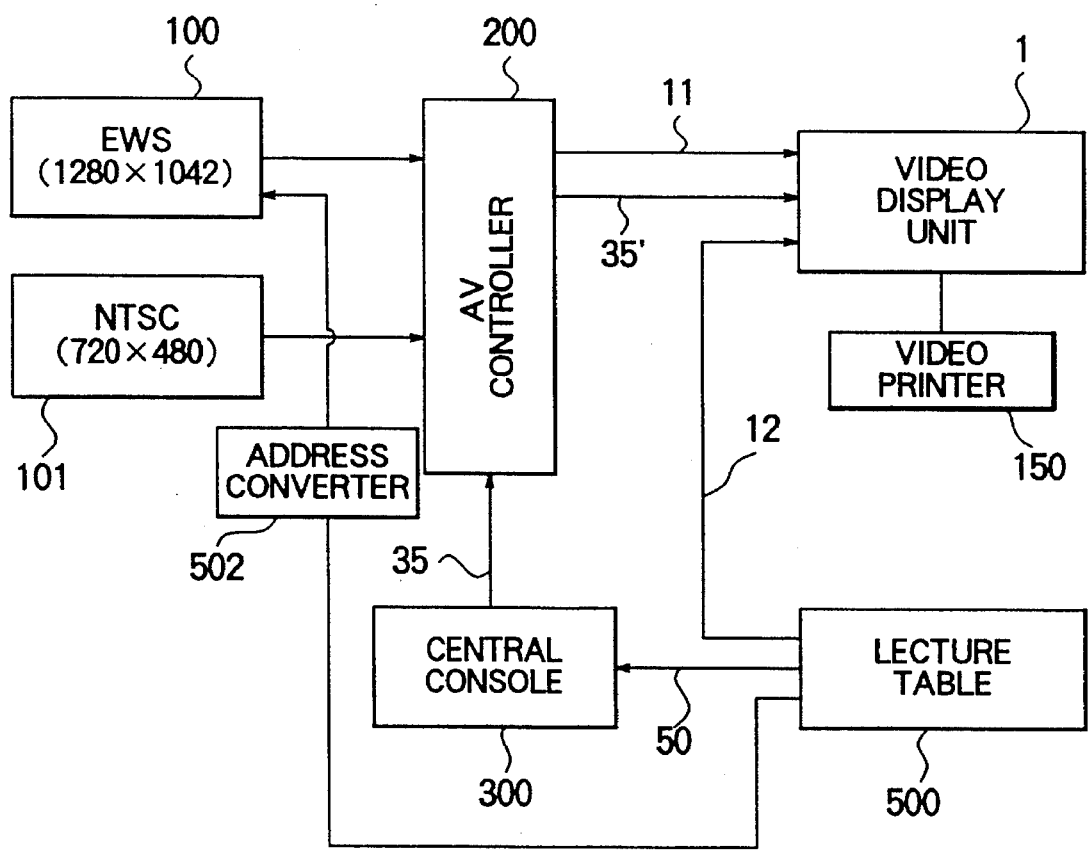
FIG. 30 is a block diagram showing a screen display system for displaying the pointer on the screen of a signal source.

FIG. 30 shows the case in which the video signal B forming a pointer is transmitted to the signal source 100 through an address converter 502 from the lecture table 500. In this case, the address converter 502 is for converting the address of the video signal B as a pointer moved by the lecture table 500 into an address on the screen of the signal source 100. The address converter 502, and also the signal source 100, may alternatively be an expansion processing circuit 31 of FIG. 29 built in the video display apparatus 1. This is also applicable to other video display apparatus 1 shown in other drawings such as FIGS. 2–7, 12–19, 21, 23, 24, 27 and 29. The address converter 502 may be either incorporated into the video display apparatus 1 or not incorporated thereinto.

According to the above description, in the case where the signal source 100 is incorporated into the video display apparatus 1 shown in FIG. 1A, for example, the signal source 100 may generate the video signal B and the sync signal $B_1$, so that the input terminal 10B for receiving the video signal B may not be required as well as the input terminal 40B for receiving the sync signal $B_1$. In other words, the expansion processing circuit 31 is not required in FIG. 1A. This is applicable to other video display apparatus 1 shown in other drawings such as FIGS. 2 and so on. The signal source 100 may also include an expansion/compression processing circuit 31 for expanding/compressing the video signal generated from the signal source 100 itself in synchronism with the sync signal also generated form the signal source 100 itself, for example.

In addition to the above embodiment, in the case where the signal source 100 is incorporated into the video display apparatus 1 as shown in FIG. 1A, the signal source 100 may output a video signal and a corresponding sync signal besides the video signal B and the sync signal $B_1$ and expand/compress the video signal by an expanding/compressing processing circuit housed in the signal source 100.

In the case where the signal source 100 is incorporated into the video display apparatus 1 shown in FIG. 6, for example, plural video signals A, B, C, . . . M and corresponding sync signals $A_1$, $B_1$, $C_1$, . . . $M_1$ are inputted from the input terminals 10A, 10B, 10C, . . . 10M and the input terminals 40A, 40B, 40C, . . . 40M, in this case, the expansion/compression processing for the video signals B, C, . . . M is carried out by the expansion/compression processing circuits 31B, 31C, . . . 31M.

The signal source 100 outputs plural video signals and corresponding sync signals. Also, the signal source 100 may have plural expansion/compression processing circuits 31 to expand/compress the video signals generated from itself. This is applicable to other video display apparatus 1 shown in FIG. 24, for example.

Operation of the above three cases are referred to the description of FIGS. 26–28 and 30.

FIG. 31 is a block diagram showing still another example of the video display unit 1. This video display unit 1 includes a sync generation circuit 400 for generating a sync signal $B_1'$ and a three-input one-output switch 700. Other circuits shown in FIG. 31 are similar to the video display system shown in FIG. 5, so that description for the circuits and these operations are omitted for the sake of simplicity. First two inputs of the switch 700 are connected to input terminals 40B and 40A for externally receiving sync signals $B_1$ and $A_1$, respectively, and a third input of the switch 700 is connected to the sync generation circuit 400 for receiving the sync signal $B_1'$ generated from the sync generation circuit 400. The sync switching circuit 700 is switched by a synthesis designation signal W and passes one of the sync signals $A_1$, $B_1$ and $B_1'$ to be supplied to a synthesis control circuit 4 and an image processing circuit 7 as well as to read control circuits 26A and 26B through the sync switching circuit 700, so that each of the sync signals $A_1$ and $B_1$ in synchronism with each of the corresponding video signals A and B drives an analog display 8, and for example, the sync signal $B_1'$ in synchronism with the video signal B drives the analog display 8.

The sync switching circuit 700 is of the three-input one-output type in this embodiment, but two two-input one-output type switches may also e used, that is, a first switch is used for receiving the sync signals $B_1$ and $A_1$ and a second switch is used for the sync generation circuit 400, in this case, one input of the first switch is connected to the input terminal 40A for receiving the sync signal $A_1$, the other input thereof is connected to the input terminal 40B for receiving the sync signal $B_1$ and an output thereof is connected to one input of the second switch, the other input thereof is connected to the sync generation circuit 400 for receiving a sync signal $B_1'$ and an output thereof is connected to the image processing circuit 7, the synthesis control circuit 4 and the read control circuits 26A and 26B.

The sync generation circuit 400 may also be incorporated into other video display systems shown in the drawings not only FIG. 31 but FIGS. 1A, 2–7, 12–19, 21, 23, 24, 27 and 29.

It is noted that the expansion/compression processing circuit 31 shown in FIGS. 12–19, 21 and 23–25 is replaceable while shown in FIGS. 1A, 2–7, 27 and 29 is not replaceable.

We claim:

1. A video display apparatus for displaying on a display a video signal applied thereto from an input terminal for an external video signal, comprising:

a housing;

a plurality of video input means for receiving a plurality of video signals having different scanning frequencies;

expansion/compression signal input means for receiving an expansion/compression designation signal for expanding/compressing selected one of said video signals;

synthesis signal input control means for producing a synthesis control signal for synthesizing selected one of said video signals in response to a synthesis designation signal;

a plurality of sync signal input means for supplying sync signals containing horizontal and vertical sync signals corresponding to said video signals respectively;

a sync switching circuit for selecting one of said sync signals;

a plurality of expansion/compression processing circuits replaceably mounted on said housing for receiving said video signals having different scanning frequencies, expanding/compressing said received video signals in accordance with said expansion/compression designation signal and producing at least one of the video signals expanded/compressed in synchronism with the sync signal selected by said sync switching circuit;

a video signal synthesis circuit for synthesizing at least one of the video signals produced from the expansion/compression processing circuit with another one of the video signals in accordance with said synthesis control signal and producing selected one of a synthesized video signal and said plurality of video signals containing said another video signal; and an image processing circuit for generating a video display signal from said video signal of said video signal synthesis circuit in synchronism with the sync signal selected by said sync switching circuit and applying the video display signal to a display.

2. A video display apparatus according to claim 1, wherein each of said expansion/compression processing circuits includes an A-D conversion circuit for converting an analog video signal to said digital video signal, a memory for storing the digital video signal, a D-A conversion circuit for converting the digital video signal stored in the memory to an analog video signal and applying the analog video signal to the video signal synthesis circuit, a write control circuit for controlling the timing of A-D conversion of the A-D conversion circuit and the operation of writing the converted digital video signal into the memory in synchronism with one of the sync signals, a read control circuit for controlling the operation of reading the digital video signal from the memory in synchronism with one of the sync signals selected by said sync switching circuit, and an expansion/compression control circuit for controlling the expansion/compression of the digital video signal in accordance with said expansion/compression designation signal.

3. A screen display system according to claim 1, further comprising a printer interface connected to said video signal synthesis circuit for converting the video signal produced from said video signal synthesis circuit into a print signal.

4. A video display apparatus according to claim 2, wherein each of said D-A conversion circuits of said expansion/compression processing circuits is connected to one of said video signal synthesis circuits, and said video signal synthesis circuit synthesizes each of the analog video signals in analog fashion in accordance with the synthesis control signal and one of sync signals selected by the sync switching circuits, said video signal synthesis circuit producing selected one of a synthesized analog video signal and each of said analog video signals.

5. A video display apparatus according to claim 2, wherein each of the D-A conversion circuits of said expansion/compression processing circuits is connected to each of said video signal synthesis circuits, the input to the video signal synthesis circuit in the first stage of the video signal synthesis circuits is connected to a clamp circuit for reproducing the DC component of one of the analog video signals, the output of the video signal synthesis circuit in said first stage is connected to the input to the video signal synthesis circuit in the next stage and so on in cascade, the video signal synthesis circuit in the last stage of said video signal synthesis circuits synthesizes in analog fashion at least one of the analog video signals produced from said video signal synthesis circuits by said synthesis control signal generated in accordance with the synthesis designation signal and one of the sync signals selected by said sync switching circuit, said video signal synthesis circuit producing selected one of a synthesized analog video signal, an analog video signal from said first-stage video signal synthesis circuit and an analog video signal from said last-stage video signal synthesis circuit.

6. A video display apparatus according to claim 1, wherein at least one of the sync signal input means includes a sync signal generation circuit for supplying one of the sync signals corresponding to said video signals, said sync signal generation circuit being built in said video display apparatus.

7. A video display apparatus according to claim 1, wherein said display includes an analog display and a digital display.

8. A video display apparatus for displaying on a display the video signal from an input terminal for applying an external video signal, comprising:

a housing;

first and second video input means for receiving first and second analog video signals having different scanning frequencies;

expansion/compression signal input means for receiving an expansion/compression designation signal for expanding/compressing selected one of the first and second video signals;

synthesis signal input control means for producing a synthesis control signal for synthesizing said first and second analog video signals in response to a synthesis designation signal, first and second sync signal input means for selected one of at least receiving and supplying the first and second sync signals including the horizontal and vertical sync signals corresponding to the first and second analog video signals respectively;

a sync switching circuit for selecting and producing one of the first and second sync signals supplied from at least said first and second sync signal input means in accordance with said synthesis designation signal;

a clamp circuit for receiving said first analog video signal and reproducing and outputting the DC component of the first analog video signal;

an expansion/compression processing circuit for converting said second analog video signal to a second digital video signal, expanding/compressing the second digital video signal in accordance with the second sync signal, the first sync signal selected by said sync switching circuit and the expansion/compression designation signal, and producing the third analog video signal expanded/compressed in synchronism with at least the first and second sync signals;

a video signal synthesis circuit for receiving the first analog video signal produced from said clamp circuit and the third analog video signal produced from said expansion/compression processing circuit, synthesizing the first analog video signal and the third analog video signal in analog fashion by said synthesis control signal generated in accordance with the synthesis designation signal and selected one of the first and second sync signals selected by said sync switching circuit thereby to generate a fourth analog video signal, and outputting selected one of the fourth analog video signal and the first and third analog video signals; and an image processing circuit for generating a video display signal from selected one of the first, third and fourth analog video signals from said video signal synthesis circuit in synchronism with selected one of the first and second sync signals selected by said sync switching circuit and applying said video display signal to a display;

wherein said expansion/compression processing circuit includes an A-D conversion circuit for converting said second analog video signal to said second digital video signal, a memory for storing the second digital video signal, a D-A conversion circuit for converting the second digital video signal stored in the memory to the third analog video signal and applying it to the video signal synthesis circuit, a write control circuit for controlling the timing of A-D conversion of the A-D conversion circuit in synchronism with the second sync signal and the operation of writing the converted second digital video signal into the memory, a read control circuit for controlling the operation of reading the second digital video signal from said memory in synchronism with selected one of the first and second sync signals selected by said sync switching circuit, and an expansion/compression control circuit for controlling the expansion/compression of the second digital video signal in accordance with the expansion/compression designation signal, said expansion/compression processing circuit being replaceably mounted on said housing.

9. A video display apparatus according to claim 8, wherein said expansion/compression processing circuit includes an A-D conversion circuit for converting the second analog video signal to the second digital video signal, a memory for storing the second digital video signal, a D-A conversion circuit for converting the second digital video signal stored in the memory to the third analog video signal and applying the resulting signal to the video signal synthesis circuit, a write control circuit for controlling the timing of A-D conversion of the A-D conversion circuit and the operation of writing the converted second digital video signal into the memory, a read control circuit for controlling the operation of reading the second digital video signal from said memory in synchronism with selected one of the first sync signal and the second sync signal selected by said sync switching circuit, and an expansion/compression control circuit for controlling the write control circuit and the read control circuit in accordance with the expansion/compression designation signal, wherein said sync switching circuit for receiving the first and second sync signals is arranged relocated from said video display unit to the expansion/compression processing circuit, said expansion/compression processing circuit being replaceably arranged on said housing.

10. A video display apparatus according to claim 8, wherein said expansion/compression processing circuit includes an A-D conversion circuit for converting the second analog video signal to the second digital video signal, a memory for storing the second digital video signal, a D-A conversion circuit for converting the second digital video signal stored in the memory to the third analog video signal and applying the resulting signal to said video signal synthesis circuit, a write control circuit for controlling the A-D conversion timing of said A-D conversion circuit and the operation of writing the converted second digital video signal into the memory in synchronism with the second sync signal, a read control circuit for controlling the operation of reading the second digital video signal from said memory in synchronism with selected one of the first sync signal and the second sync signal selected by said sync switching circuit, and an expansion/compression control circuit for controlling the expansion/compression of the second digital video signal in accordance with the expansion/compression designation signal, wherein the expansion/compression processing circuit has mounted thereon a first sync switching circuit for receiving the first and second sync signals, said video display apparatus has arranged on the body thereof a second sync switching circuit for receiving the first sync signal and the second sync signal through said first sync switching circuit, and said expansion/compression processing circuit is replaceably arranged on said housing.

11. A video display apparatus for displaying on the display thereof the video signal received from an input terminal for an external video signal, comprising:

a housing;

first and second video input means for receiving first and second analog video signals having different scanning frequencies;

expansion/compression signal input means for receiving an expansion/compression designation signal for expanding/compressing selected one of the first analog video signal and the second analog video signal;

synthesis signal input control means for producing a synthesis control signal for synthesizing said first and second video signals in response to a synthesis designation signal;

first and second sync signal input means for selected one of at least receiving and supplying the first and second sync signals containing vertical and horizontal sync signals corresponding to the first and second analog video signals respectively;

a sync switching circuit for selecting and outputting selected one of the first sync signal and the second sync signal supplied from at least said first and second sync signal input means respectively in accordance with the synthesis designation signal;

a first A-D conversion circuit for converting the first analog video signal to the first digital video signal;

an expansion/compression processing circuit for converting the second analog video signal to the second digital video signal, expanding/compressing the second digital video signal in accordance with the second sync signal, the first sync signal selected by said sync switching circuit and the expansion/compression designation signal, and producing the third digital video signal expanded/compressed in synchronism with selected one of at least the first and second sync signals;

a video signal synthesis circuit for receiving the first digital video signal produced from said first A-D conversion circuit and the third digital video signal produced from the expansion/compression processing circuit, synthesizing the first digital video signal and the third digital video signal in digital fashion by said synthesis control signal generated in accordance with one of the first and second sync signals selected by the sync switching circuit thereby to generate a fourth digital video signal, and producing selected one of said fourth digital video signal, the first digital video signal and the third digital video signal;

a D-A conversion circuit for converting selected one of the first, third and fourth digital video signals from said video signal synthesis circuit into the fourth analog video signal at a timing synchronous with selected one of the first and second sync signals selected by said sync switching circuit; and an image processing circuit for generating a video display signal from the fourth analog video signal produced by the D-A conversion circuit in synchronism with one of the first and second sync signals selected by the sync switching circuit, and applying the resulting video display signal to a display;

wherein said expansion/compression processing circuit includes a second A-D conversion circuit for converting the second analog video signal to the second digital video signal, a memory for storing the second digital video signal, a write control circuit for controlling the operation of writing the converted second digital video signal into said memory at an A-D conversion timing of the second A-D conversion circuit in synchronism with the second sync signal, a read control circuit for controlling the operation of reading the third digital video signal from said memory and applying the third digital video signal to said video signal synthesis circuit in synchronism with selected one of the first and second sync signals selected by said sync switching circuit, and an expansion/compression control circuit for controlling the expansion/compression of the third digital video signal in accordance with the expansion/compression designation signal, said expansion/compression processing circuit being arranged replaceably on said housing.

12. A video display apparatus for displaying on a display the video signal received from an input terminal for an external video signal, comprising:

a housing;

first and second video input means for receiving first and second digital video signals having different scanning frequencies;

expansion/compression signal input means for receiving the expansion/compression designation signal for expanding/compressing selected one of the first and second digital video signals;

synthesis signal input means for producing a synthesis control signal for synthesizing said first and second video signals in response to a synthesis designation signal;

first and second sync signal input means for selected one of at least receiving and supplying the first and second sync signals containing the vertical and horizontal sync signals corresponding to the first and second digital video signals;

a sync switching circuit for selecting and outputting selected one of the first and second sync signals supplied from at least the first and second sync signal input means in accordance with the synthesis designation signal;

a first D-A conversion circuit for converting the first digital video signal to the first analog video signal;

an expansion/compression processing circuit for receiving the second digital video signal, expanding/compressing the second digital video signal in accordance with the second sync signal, the first sync signal selected by the sync switching circuit and the expansion/compression designation signal, and producing the second analog video signal expanded/compressed in synchronism with selected one of at least the first and second sync signals;

a video signal synthesis circuit for receiving the first analog video signal produced from said first D-A conversion circuit and the second analog video signal produced from said expansion/compression processing circuit, synthesizing in analog fashion the first analog video signal and the second analog video signal by said synthesis control signal generated in accordance with said synthesis designation signal and one of the first and second sync signals selected by the sync switching circuit thereby to generate a third analog video signal, and producing selected one of the third analog video signal, said first analog video signal and said second analog video signal; and an image processing circuit for generating a video display signal from selected one of the first, second and third analog video signals produced by said video signal synthesis circuit in synchronism with one of the first and second sync signals selected by said sync switching circuit and applying said video display signal to a display;

wherein said expansion/compression processing circuit includes a memory for storing the second digital video signal, a write control circuit for controlling the operation of writing the second digital video signal into the memory in synchronism with the second sync signal, a read control circuit for controlling the operation of reading the second digital video signal from said memory in synchronism with selected one of the first and second sync signals selected by said sync switching circuit, and an expansion/compression control circuit for controlling the expansion/compression of the second digital video signal in accordance with the expansion/compression designation signal, said expansion/compression processing circuit being arranged replaceably on said housing.

13. A video display apparatus for displaying on a display the video signal received from an input terminal for an external video signal, comprising:

a housing;

first and second video input means for receiving first and second digital video signals having different scanning frequencies;

expansion/compression signal input means for receiving the expansion/compression designation signal for expanding/compressing selected one of the first and second digital video signals;

synthesis signal input control means for producing a synthesis control signal for synthesizing said first and second video signal in response to a synthesis designation signal;

first and second sync signal input means for selected one of at least receiving and supplying the first and second sync signals containing the vertical and horizontal sync signals corresponding to the first and second digital video signals;

a sync switching circuit for selecting and producing selected one of the first and second sync signals supplied from at least said first and second sync signal input means in accordance with the synthesis designation signal;

an expansion/compression processing circuit for expanding/compressing the second digital video signal in accordance with the second sync signal, the first sync signal selected by the sync switching circuit and the expansion/compression designation signal, and producing the third digital video signal expanded/compressed in synchronism with selected one of at least the first and second sync signals;

a video signal synthesis circuit for receiving the first digital video signal and the third digital video signal produced from said expansion/compression processing circuit, synthesizing in digital fashion the first and third digital video signals by said synthesis control signal generated in accordance with the synthesis designation signal and selected one of the first and second sync signals selected by said sync switching circuit thereby to generate a fourth digital video signal, and producing selected one of the fourth digital video signal, the first digital video signal and the third digital video signal;

a D-A conversion circuit for converting selected one of the first, third and fourth digital video signals from the video signal synthesis circuit to the fourth analog video signal at a timing synchronous with one of the first and second sync signals selected by said sync switching circuit; and an image processing circuit for generating a video display signal from the fourth analog video signal produced by said D-A conversion circuit in synchronism with one of the first and second sync signals selected by said sync switching circuit and applying the resulting video display signal to a display;

wherein said expansion/compression processing circuit includes a memory for storing the second digital video signal, a write control circuit for controlling the operation of writing the second digital video signal into said memory in synchronism with the second sync signal, a read control circuit for controlling the operation of reading the third digital video signal from said memory in synchronism with one of the first and second sync signals selected by said sync switching circuit, and an expansion/compression control circuit for controlling the expansion/compression of the third digital video signal in accordance with the expansion/compression designation signal, said expansion/compression processing circuit being replaceably arranged on said housing.

14. A screen display system comprising:

a plurality of video signal sources;

an AV controller for receiving a plurality of video signals from said video signal sources;

a central control console for selecting the video signals received by said AV controller; and at least a video display unit connected to said AV controller for displaying a plurality of video signals selected by said central control console;

wherein said video display unit includes:

a housing;

a plurality of video input means for receiving the video signals having different scanning frequencies;

expansion/compression signal input means for receiving an expansion/compression designation signal for expanding/compressing selected one of said video signals;

synthesis signal input control means for producing a synthesis control signal for synthesizing selected one of said video signals in response to a synthesis designation signal;

a plurality of sync signal input means for supplying sync signals containing vertical and horizontal sync signals corresponding to the video signals respectively;

a sync switching circuit for selecting one of the sync signals;

an expansion/compression processing circuit for receiving the video signals having different scanning frequencies, expanding/compressing the video signals in accordance with said expansion/compression designation signal, and producing at least one video signal expanded/compressed in synchronism with the sync signal selected by said sync switching circuit, said expansion/compression processing circuit being replaceably arranged on said housing;

a video signal synthesis circuit for synthesizing at least one of the video signals produced from said expansion/compression processing circuit with another video signal in accordance with said synthesis control signal, and producing selected one of the synthesized video signal and a plurality of video signals containing said another video signal; and an image processing circuit for generating a video display signal from the video signal produced by said video signal synthesis circuit in synchronism with the sync signal selected by said sync switching circuit and applying the resulting video display signal to a display.

15. A screen display system according to claim 14, wherein said video signal sources include at least an EWS (Engineering Workstation) signal source, a VGA (Video Graphic Array) signal source, an NTSC (National Television System Committee) signal source and an HD (High Definition or Hi-Vision) signal source.

16. A screen display system according to claim 14, wherein said video display unit is connected to a lecture table used by the lecturer, and one of the video signals is supplied to the video display unit together with a sync signal corresponding to the particular video signal from the lecture table by the operation of the lecturer.

17. A screen display system according to claim 15, comprising four video display units connected to the AV controller in accordance with the EWS, VGA, NTSC and HD signal sources respectively.

18. A screen display system according to claim 14, wherein the central control console applies one of the video signals to at least one of said video display units together with the sync signal corresponding to the particular video signal.

19. A screen display system according to claim 18, wherein said video display unit comprises:

said housing;

first and second video input means of said plurality of video input means for receiving the first and second analog video signals having different scanning frequencies;

said expansion/compression signal input means for receiving an expansion/compression designation signal for expanding/compressing selected one of the first and second analog video signals;

said synthesis signal input control means for producing a synthesis control signal for synthesizing said first and second analog signals in response to a synthesis designation signal;

first and second sync signal input means of said plurality of sync signal input means for selected one of at least receiving and supplying the first and second sync signals containing the vertical and horizontal sync signals corresponding to the first and second analog video signals respectively;

said sync switching circuit for selecting and producing selected one of the first and second sync signals supplied from at least said first and second sync signal input means in accordance with the synthesis designation signal;

a clamp circuit for receiving the first analog video signal and reproducing and producing the DC component of said first analog video signal;

said expansion/compression processing circuit for converting said second analog video signal into a second digital video signal, expanding/compressing said second digital video signal in accordance with said expansion/compression designation signal, said first sync signal selected by said sync switching circuit and said second sync signal, and producing the third analog video signal expanded/compressed in synchronism with at least the first and second sync signals;

said video signal synthesis circuit for receiving the first analog video signal from said clamp circuit and the third analog video signal produced from said expansion/compression processing circuit, synthesizing in analog fashion the first analog video signal and the third analog video signal in accordance with the synthesis designation signal and one of the first and second sync signals selected by said sync switching circuit thereby to generate a fourth analog video signal, and producing selected one of the fourth analog video signal, the first analog video signal and the third analog video signal; and a printer interface for converting the video signal produced from said video signal synthesis circuit into a print signal;

said image processing circuit for generating a video display signal from selected one of the first, third and fourth analog video signals produced by said video signal synthesis circuit in synchronism with one of the first and second sync signals selected by said sync switching circuit, and applying the resulting video display signal to a display;

wherein said expansion/compression processing circuit includes an A-D conversion circuit for converting the second analog video signal to the second digital video signal, a memory for storing the second digital video signal, a D-A conversion circuit for converting the second digital signal stored in the memory to the third analog video signal and applying the resulting signal to the video signal synthesis circuit, a write control circuit for controlling the A-D conversion timing of the A-D conversion circuit and writing the converted second digital video signal into the memory in synchronism with the second sync signal, a read control circuit for controlling the operation of reading the second digital video signal from the memory in synchronism with one of the first and second sync signals selected by the sync switching circuit, and an expansion/compression control circuit for controlling the expansion/compression of the second digital video signal in accordance with the expansion/compression designation signal, said expansion/compression processing circuit being replaceably arranged on said housing.

20. A screen display system according to claim 18, where said video display system includes:

said housing;

first and second video input means of said plurality of video input means for receiving the first and second analog video signals having scanning frequencies;

said expansion/compression signal input means for receiving an expansion/compression designation signal for expanding/compressing selected one of first and second analog video signals;

said synthesis signal input control means for producing a synthesis control signal for synthesizing said first and second video signals in response to a synthesis designation signal;

first and second sync signal input means of said plurality of sync signal input means for selected one of at least receiving and supplying first and second sync signals containing the vertical and horizontal sync signals corresponding to the first and second analog video signals;

said sync switching circuit for selecting and producing selected one the first and second sync signals supplied from at least the first and second sync signal input means in accordance with the synthesis designation signal;

a first A-D conversion circuit for converting the first analog video signal to the first digital video signal;

said expansion/compression processing circuit for converting the second analog video signal to the second digital video signal, expanding/compressing the second digital video signal in accordance with the second sync signal, the first sync signal selected by the sync switching circuit and the expansion/compression designation signal, and producing the third digital video signal expanded/compressed in synchronism with selected one of at least the first and second sync signals;

said video signal synthesis circuit for receiving the first digital video signal produced from the first A-D conversion circuit and the third digital video signal produced from said expansion/compression processing circuit, synthesizing in digital fashion the first digital video signal and the third digital video signal by said synthesis control signal generated in accordance with the synthesis designation signal and one of the first and second sync signals selected by the sync switching circuit thereby to generate a fourth digital video signal, and producing selected one of the fourth digital video signal, the first digital video signal and the third digital video signal;

a printer interface for converting the video signal produced from said video signal synthesis circuit into a print signal;

a D-A conversion circuit for converting selected one of the first, third and fourth digital video signals from the video signal synthesis circuit into a fourth analog video signal at a timing synchronous with one of the first and second sync signals selected by said sync switching circuit; and said image processing circuit for generating a video display signal from the fourth analog video signal produced by said D-A conversion circuit in synchronism with one of the first and second sync signals selected by said sync switching circuit and applying the resulting video display signal to a display, wherein said expansion/compression processing circuit includes a second A-D conversion circuit for converting the second analog video signal to the second digital video signal, a memory for storing the second digital video signal, a write control circuit for writing the second digital video signal into the memory at an A-D conversion timing of the second A-D conversion circuit in synchronism with the second sync signal, a read control circuit for controlling the operation of reading the third digital video signal from said memory and applying the third digital video signal to said video signal synthesis circuit in synchronism with one of the first and second sync signals selected by said sync switching circuit, and an expansion/compression control circuit for controlling the expansion/compression of the third digital video signal in accordance with the expansion/compression designation signal, said expansion/compression processing circuit being replaceably arranged on said housing.

21. A screen display system according to claim 18, wherein said video display system includes:

said housing;

first and second video input means of said plurality of video input means for receiving first and second digital video signals having different scanning frequencies;

said expansion/compression signal input means for receiving the expansion/compression designation signal for expanding/compressing selected one of the first and second digital video signals;

said synthesis signal input control means for producing a synthesis control signal for synthesizing said first and second video signals in response to a synthesis designation signal;

first and second sync signal input means of said plurality of sync signal input means for selected one of at least receiving and supplying the first and second sync signals containing the vertical and horizontal sync signals corresponding to the first and second digital video signals respectively;

said sync switching circuit for selecting and producing selected one of the first and second sync signals supplied from at least the first and second sync signal input means in accordance with the synthesis designation signal;

a first D-A conversion circuit for converting the first digital video signal to the first analog video signal;

said expansion/compression processing circuit for receiving the second digital video signal, expanding/compressing the second digital video signal in accordance with the second sync signal, the first sync signal selected by the sync switching circuit and the expansion/compression designation signal, and producing the second analog video signal expanded/compressed in synchronism with selected one of at least the first and second sync signals;

said video signal synthesis circuit for receiving the first analog video signal produced from said first D-A conversion circuit and the second analog video signal produced from the expansion/compression processing circuit, synthesizing the first analog video signal and the second analog video signal in analog fashion by said synthesis control signal generated in accordance with the synthesis designation signal and selected one of the first and second sync signals selected by said sync switching circuit thereby to generate a third analog video signal, and producing selected one of the third analog video signal, the first analog video signal and the second analog video signal; and a printer interface for converting the video signal produced from said video signal synthesis circuit into a print signal;

said image processing circuit for generating a video display signal from selected one of the first, second and third analog video signals produced by said video signal synthesis circuit in synchronism with one of the first and second sync signals selected by said sync switching circuit and applying the particular video display signal to a display;

wherein said expansion/compression processing circuit includes a memory for storing the second digital video signal, a write control circuit for controlling the operation of writing the second digital video signal into said memory in synchronism with the second sync signal, a read control circuit for controlling the operation of reading the second digital video signal from the memory in synchronism with one of the first and second sync signals selected by said sync switching circuit, and an expansion/compression control circuit for controlling the expansion/compression of the second digital video signal in accordance with the expansion/compression designation signal, said expansion/compression processing circuit being replaceably arranged on said housing.

22. A screen display system according to claim 18, comprising:

said housing;

first and second video input means of said plurality of video input means for receiving first and second digital video signals having different scanning frequencies;

said expansion/compression signal input means for receiving an expansion/compression designation signal for expanding/compressing selected one of the first and second digital video signals;

said synthesis signal input control means for producing a synthesis control signal for synthesizing said first and second video signals in response to a synthesis designation signal;

first and second sync signal input means of said plurality of sync signal input means for selected one of at least receiving and supplying the first and second sync signals containing the vertical and horizontal sync signals corresponding to the first and second digital video signals respectively;

said sync switching circuit for selecting and producing selected one of the first and second sync signals supplied from at least the first and second sync signal input means in accordance with synthesis designation signal;

said expansion/compression processing circuit for expanding/compressing the second digital video signal in accordance with the first sync signal selected by the sync switching circuit and the expansion/compression designation signal and producing the third digital video signal expanded/compressed in synchronism with selected one of at least the first and second sync signals;

said video signal synthesis circuit for receiving the first digital video signal and the third digital video signal produced from said expansion/compression processing circuit, synthesizing the first digital video signal and the third digital video signal in digital fashion by said synthesis control signal generated in accordance with the synthesis designation signal and one of the first and second sync signals selected by said sync switching circuit thereby to generate a fourth digital video signal, and producing selected one of the fourth digital video signal, the first digital video signal and the third digital video signal;

a printer interface for converting the video signal produced from said video signal synthesis circuit into a print signal;

a D-A conversion circuit for converting selected one of the first, third and fourth digital video signals produced by said video signal synthesis circuit to a fourth analog video signal at a timing synchronous with one of the first and second sync signals selected by said sync switching circuit; and said image processing circuit for generating a video display signal from the fourth analog video signal produced by said D-A conversion circuit in synchronism with one of the first and second sync signals selected by the sync switching circuit and applying the resulting video display signal to a display;

wherein said expansion/compression processing circuit includes a memory for storing the second digital video signal, a write control circuit for controlling the operation of writing the second digital video signal into said memory in synchronism with said second sync signal, a read control circuit for controlling the operation of reading the third digital video signal from said memory in synchronism with one of the first and second sync signals selected by said sync switching circuit, and an expansion/compression control circuit for controlling the expansion/compression of the third digital video signal in accordance with the expansion/compression designation signal, said expansion/compression processing circuit being arranged on said housing.

23. A screen display system comprising:

a plurality of video signal sources;

an AV controller for receiving a plurality of video signals from said video signal sources;

a centralized control console for selecting the video signals received by said AV controller; and at least a video display unit connected to said AV controller for displaying the video signals selected by said centralized control console;

wherein said video display unit includes:

a housing;

a plurality of video input means for receiving said video signals having different scanning frequencies;

expansion/compression signal input means for receiving an expansion/compression designation signal for expanding/compressing selected one of said video signals;

synthesis signal input control means for producing a synthesis control signal for synthesizing selected one of said video signals in response to a synthesis designation signal;

a plurality of sync signal input means for supplying a sync signal including horizontal and vertical sync signals corresponding to said video signals respectively;

a sync switching circuit for selecting one of said sync signals;

an expansion/compression processing circuit replaceably mounted on said housing for receiving said video signals having different scanning frequencies, expanding/compressing said video signals in accordance with said expansion/compression designation signal, and applying at least a video signal expanded/compressed in synchronism with the sync signal selected by said sync switching circuit to said signal source through said AV controller;

a video signal synthesis circuit for synthesizing at least one of the video signals produced from said expansion/compression processing circuit with another video signal in accordance with said synthesis control signal, and producing selected one of the synthesized video signal and said video signals including said another video signal;

a printer interface for converting the video signal produced from said video signal synthesis circuit into a print signal; and a video processing circuit for producing a video display signal from said video signal produced by said video signal synthesis circuit in synchronism with said sync signal selected by said sync switching circuit, and applying said video signal to a display unit.

24. A video display apparatus for displaying on a display a video signal applied thereto from an input terminal for an external video signal, comprising:

a housing;

a plurality of video input means for receiving a plurality of video signals having different scanning frequencies;

expansion/compression signal input means for receiving an expansion/compression designation signal for expanding/compressing selected one of said video signals;

synthesis signal input control means for producing a synthesis control signal for synthesizing selected one of said video signals in response to a synthesis designation signal;

a plurality of sync signal input means for supplying sync signals containing horizontal and vertical sync signals corresponding to said video signals respectively;

a sync switching circuit for selecting one of said sync signals;

a plurality of expansion/compression processing circuits mounted on said housing for receiving said video signals having different scanning frequencies, expanding/compressing said received video signals in accordance with said expansion/compression designation signal and producing at least one of the video signals expanded/compressed in synchronism with the sync signal selected by said sync switching circuit;

a video signal synthesis circuit for synthesizing at least one of the video signals produced from the expansion/compression processing circuit with another one of the video signals in accordance with said synthesis control signal and producing selected one of a synthesized video signal and said plurality of video signals containing said another video signal; and an image processing circuit for generating a video display signal from said video signal of said video signal synthesis circuit in synchronism with the sync signal selected by said sync switching circuit and applying the video display signal to a display.

25. A video display apparatus according to claim 24, wherein each of said expansion/compression processing circuits includes an A-D conversion circuit for converting an analog video signal to said digital video signal, a memory for storing the digital video signal, a D-A conversion circuit for converting the digital video signal stored in the memory to an analog video signal and applying the analog video signal to the video signal synthesis circuit, a write control circuit for controlling the timing of A-D conversion of the A-D conversion circuit and the operation of writing the converted digital video signal into the memory in synchronism with one of the sync signals, a read control circuit for controlling the operation of reading the digital video signal from the memory in synchronism with one of the sync signals selected by said sync switching circuit, and an expansion/compression control circuit for controlling the expansion/compression of the digital video signal in accordance with said expansion/compression designation signal.

26. A screen display system according to claim 24, further comprising a printer interface connected to said video signal synthesis circuit for converting the video signal produced from said video signal synthesis circuit into a print signal.

27. A video display apparatus according to claim 25, wherein each of said D-A conversion circuits of said expansion/compression processing circuits is connected to one of said video signal synthesis circuits, and said video signal synthesis circuit synthesizes each of the analog video signals in analog fashion in accordance with the synthesis control signal and one of sync signals selected by the sync switching circuits, said video signal synthesis circuit producing selected one of a synthesized analog video signal and each of said analog video signals.

28. A video display apparatus according to claim 25, wherein each of the D-A conversion circuits of said expansion/compression processing circuits is connected to each of said video signal synthesis circuits, the input to the video signal synthesis circuit in the first stage of the video signal synthesis circuits is connected to a clamp circuit for reproducing the DC component of one of the analog video signals, the output of the video signal synthesis circuit in said first stage is connected to the input to the video signal synthesis circuit in the next stage and so on in cascade, the video signal synthesis circuit in the last stage of said video signal synthesis circuits synthesizes in analog fashion at least one of the analog video signals produced from said video signal synthesis circuits by said synthesis control signal generated in accordance with the synthesis designation signal and one of the sync signals selected by said sync switching circuit, said video signal synthesis circuit producing selected one of a synthesized analog video signal, an analog video signal from said first-stage video signal synthesis circuit and an analog video signal from said last-stage video signal synthesis circuit.

29. A video display apparatus according to claim 24, wherein at least one of the sync signal input means includes a sync signal generation circuit for supplying one of the sync signals corresponding to said video signals, said sync signal generation circuit being built in said video display apparatus.

30. A video display apparatus according to claim 24, wherein said display includes an analog display and a digital display.

31. A video display apparatus for displaying on a display the video signal from an input terminal for applying an external video signal, comprising:

a housing;

first and second video input means for receiving first and second analog video signals having different scanning frequencies;

expansion/compression signal input means for receiving an expansion/compression designation signal for expanding/compressing selected one of the first and second video signals;

synthesis signal input control means for producing a synthesis control signal for synthesizing said first and second analog video signals in response to a synthesis designation signal;

first and second sync signal input means for selected one of at least receiving and supplying the first and second sync signals including the horizontal and vertical sync signals corresponding to the first and second analog video signals respectively;

a sync switching circuit for selecting and producing one of the first and second sync signals supplied from at least said first and second sync signal input means in accordance with said synthesis designation signal;

a clamp circuit for receiving said first analog video signal and reproducing and outputting the DC component of the first analog video signal;

an expansion/compression processing circuit for converting said second analog video signal to a second digital video signal, expanding/compressing the second digital video signal in accordance with the second sync signal, the first sync signal selected by said sync switching circuit and the expansion/compression designation signal, and producing the third analog video signal expanded/compressed in synchronism with at least the first and second sync signals;

a video signal synthesis circuit for receiving the first analog video signal produced from said clamp circuit and the third analog video signal produced from said expansion/compression processing circuit, synthesizing the first analog video signal and the third analog video signal in analog fashion by said synthesis control signal generated in accordance with the synthesis designation signal and selected one of the first and second sync signals selected by said sync switching circuit thereby to generate a fourth analog video signal, and outputting selected one of the fourth analog video signal and the first and third analog video signals; and an image processing circuit for generating a video display signal from selected one of the first, third and fourth analog video signals from said video signal synthesis circuit in synchronism with selected one of the first and second sync signals selected by said sync switching circuit and applying said video display signal to a display;

wherein said expansion/compression processing circuit includes an A-D conversion circuit for converting said second analog video signal to said second digital video signal, a memory for storing the second digital video signal, a D-A conversion circuit for converting the second digital video signal stored in the memory to the third analog video signal and applying it to the video signal synthesis circuit, a write control circuit for controlling the timing of A-D conversion of the A-D conversion circuit in synchronism with the second sync signal and the operation of writing the converted second digital video signal into the memory, a read control circuit for controlling the operation of reading the second digital video signal from said memory in synchronism with selected one of the first and second sync signals selected by said sync switching circuit, and an expansion/compression control circuit for controlling the expansion/compression of the second digital video signal in accordance with the expansion/compression designation signal, said expansion/compression processing circuit being mounted on said housing.

32. A video display apparatus according to claim 31, wherein said expansion/compression processing circuit includes an A-D conversion circuit for converting the second analog video signal to the second digital video signal, a memory for storing the second digital video signal, a D-A conversion circuit for converting the second digital video signal stored in the memory to the third analog video signal and applying the resulting signal to the video signal synthesis circuit, a write control circuit for controlling the timing of A-D conversion of the A-D conversion circuit and the operation of writing the converted second digital video signal into the memory, a read control circuit for controlling the operation of reading the second digital video signal from said memory in synchronism with selected one of the first sync signal and the second sync signal selected by said sync switching circuit, and an expansion/compression control circuit for controlling the write control circuit and the read control circuit in accordance with the expansion/compression designation signal, wherein said sync switching circuit for receiving the first and second sync signals is arranged relocated from said video display unit to the expansion/compression processing circuit, said expansion/compression processing circuit being replaceably arranged on said housing.

33. A video display apparatus according to claim 31, wherein said expansion/compression processing circuit includes an A-D conversion circuit for converting the second analog video signal to the second digital vide signal, a memory for storing the second digital video signal, a D-A conversion circuit for converting the second digital video signal stored in the memory to the third analog video signal and applying the resulting signal to said video signal synthesis circuit, a write control circuit for controlling the A-D conversion timing of said A-D conversion circuit and the operation of writing the converted second digital video signal into the memory in synchronism with the second sync signal, a read control circuit for controlling the operation of reading the second digital video signal from said memory in synchronism with selected one of the first sync signal and the second sync signal selected by said sync switching circuit, and an expansion/compression control circuit for controlling the expansion/compression of the second digital video signal in accordance with the expansion/compression designation signal, wherein the expansion/compression processing circuit has mounted thereon a first sync switching circuit for receiving the first and second sync signals, said video display apparatus has arranged on the body thereof a second sync switching circuit for receiving the first sync signal and the second sync signal through said first sync switching circuit, and said expansion/compression processing circuit is replaceably arranged on said housing.

34. A video display apparatus for displaying on the display thereof the video signal received from an input terminal for an external video signal, comprising:

a housing;

first and second video input means for receiving first and second analog video signals having different scanning frequencies;

expansion/compression signal input means for receiving an expansion/compression designation signal for expanding/compressing selected one of the first analog video signal and the second analog video signal;

synthesis signal input control means for producing a synthesis control signal for synthesizing said first and second video signals in response to a synthesis designation signal;

first and second sync signal input means for selected one of at least receiving and supplying the first and second sync signals containing vertical and horizontal sync signals corresponding to the first and second analog video signals respectively;

a sync switching circuit for selecting and outputting selected one of the first sync signal and the second sync signal supplied from at least said first and second sync signal input means respectively in accordance with the synthesis designation signal;

a first A-D conversion circuit for converting the first analog video signal to the first digital video signal;

an expansion/compression processing circuit for converting the second analog video signal to the second digital video signal, expanding/compressing the second digital video signal in accordance with the second sync signal, the first sync signal selected by said sync switching circuit and the expansion/compression designation signal, and producing the third digital video signal expanded/compressed in synchronism with selected one of at least the first and second sync signals;

a video signal synthesis circuit for receiving the first digital video signal produced from said first A-D conversion circuit and the third digital video signal produced from the expansion/compression processing circuit, synthesizing the first digital video signal and the third digital video signal in digital fashion by said synthesis control signal generated in accordance with one of the first and second sync signals selected by the sync switching circuit thereby to generate a fourth digital video signal, and producing selected one of said fourth digital video signal, the first digital video signal and the third digital video signal;

a D-A conversion circuit for converting selected one of the first, third and fourth digital video signals from said video signal synthesis circuit into the fourth analog video signal at a timing synchronous with selected one of the first and second sync signals selected by said sync switching circuit; and an image processing circuit for generating a video display signal from the fourth analog video signal produced by the D-A conversion circuit in synchronism with one of the first and second sync signals selected by the sync switching circuit, and applying the resulting video display signal to a display;

wherein said expansion/compression processing circuit includes a second A-D conversion circuit for converting the second analog video signal to the second digital video signal, a memory for storing the second digital video signal, a write control circuit for controlling the operation of writing the converted second digital video signal into said memory at an A-D conversion timing of the second A-D conversion circuit in synchronism with the second sync signal, a read control circuit for controlling the operation of reading the third digital video signal from said memory and applying the third digital video signal to said video signal synthesis circuit in synchronism with selected one of the first and second sync signals selected by said sync switching circuit, and an expansion/compression control circuit for controlling the expansion/compression of the third digital video signal in accordance with the expansion/compression designation signal, said expansion/compression processing circuit being arranged on said housing.

35. A video display apparatus for displaying on a display the video signal received from an input terminal for an external video signal, comprising:

a housing;

first and second video input means for receiving first and second digital video signals having different scanning frequencies;

expansion/compression signal input means for receiving the expansion/compression designation signal for expanding/compressing selected one of the first and second digital video signals;

synthesis signal input means for producing a synthesis control signal for synthesizing said first and second video signals in response to a synthesis designation signal;

first and second sync signal input means for selected one of at least receiving and supplying the first and second sync signals containing the vertical and horizontal sync signals corresponding to the first and second digital video signals;

a sync switching circuit for selecting and outputting selected one of the first and second sync signals supplied from at least the first and second sync signal input means in accordance with the synthesis designation signal;

a first D-A conversion circuit for converting the first digital video signal to the first analog video signal;

an expansion/compression processing circuit for receiving the second digital video signal, expanding/compressing the second digital video signal in accordance with the second sync signal, the first sync signal selected by the sync switching circuit and the expansion/compression designation signal, and producing the second analog video signal expanded/compressed in synchronism with selected one of at least the first and second sync signals;

a video signal synthesis circuit for receiving the first analog video signal produced from said first D-A conversion circuit and the second analog video signal produced from said expansion/compression processing circuit, synthesizing in analog fashion the first analog video signal and the second analog video signal by said synthesis control signal generated in accordance with said synthesis designation signal and one of the first and second sync signals selected by the sync switching circuit thereby to generate a third analog video signal, and producing selected one of the third analog video signal, said first analog video signal and said second analog video signal; and an image processing circuit for generating a video display signal from selected one of the first, second and third analog video signals produced by said video signal synthesis circuit in synchronism with one of the first and second sync signals selected by said sync switching circuit and applying said video display signal to a display;

wherein said expansion/compression processing circuit includes a memory for storing the second digital video signal, a write control circuit for controlling the operation of writing the second digital video signal into the memory in synchronism with the second sync signal, a read control circuit for controlling the operation of reading the second digital video signal from said memory in synchronism with selected one of the first and second sync signals selected by said sync switching circuit, and an expansion/compression control circuit for controlling the expansion/compression of the second digital video signal in accordance with the expansion/compression designation signal, said expansion/compression processing circuit being arranged on said housing.

36. A video display apparatus for displaying on a display the video signal received from an input terminal for an external video signal, comprising:

a housing;

first and second video input means for receiving first and second digital video signals having different scanning frequencies;

expansion/compression signal input means for receiving the expansion/compression designation signal for expanding/compressing selected one of the first and second digital video signals;

synthesis signal input control means for producing a synthesis control signal for synthesizing said first and second video signal in response to a synthesis designation signal;

first and second sync signal input means for selected one of at least receiving and supplying the first and second sync signals containing the vertical and horizontal sync signals corresponding to the first and second digital video signals;

a sync switching circuit for selecting and producing selected one of the first and second sync signals supplied from at least said first and second sync signal input means in accordance with the synthesis designation signal;

an expansion/compression processing circuit for expanding/compressing the second digital video signal in accordance with the second sync signal, the first sync signal selected by the sync switching circuit and the expansion/compression designation signal, and producing the third digital video signal expanded/compressed in synchronism with selected one of at least the first and second sync signals;

a video signal synthesis circuit for receiving the first digital video signal and the third digital video signal produced from said expansion/compression processing circuit, synthesizing in digital fashion the first and third digital video signals by said synthesis control signal generated in accordance with the synthesis designation signal and selected one of the first and second sync signals selected by said sync switching circuit thereby to generate a fourth digital video signal, and producing selected one of the fourth digital video signal, the first digital video signal and the third digital video signal;

a D-A conversion circuit for converting selected one of the first, third and fourth digital video signals from the video signal synthesis circuit to the fourth analog video signal at a timing synchronous with one of the first and second sync signals selected by said sync switching circuit; and an image processing circuit for generating a video display signal from the fourth analog video signal produced by said D-A conversion circuit in synchronism with one of the first and second sync signals selected by said sync switching circuit and applying the resulting video display signal to a display;

wherein said expansion/compression processing circuit includes a memory for storing the second digital video signal, a write control circuit for controlling the operation of writing the second digital video signal into said memory in synchronism with the second sync signal, a read control circuit for controlling the operation of reading the third digital video signal from said memory in synchronism with one of the first and second sync signals selected by said sync switching circuit, and an expansion/compression control circuit for controlling the expansion/compression of the third digital video signal in accordance with the expansion/compression designation signal, said expansion/compression processing circuit being arranged on said housing.

37. A screen display system comprising:

a plurality of video signal sources;

an AV controller for receiving at least one of a plurality of video signals from said video signal sources;

a central control console for selecting the video signal received by said AV controller; and at least a video display unit connected to said AV controller for displaying a plurality of video signals selected by said central control console;

wherein said video display unit includes:

a housing;

a plurality of video input means for receiving the video signals having different scanning frequencies;

expansion/compression signal input means for receiving an expansion/compression designation signal for expanding/compressing selected one of said video signals;

synthesis signal input control means for producing a synthesis control signal for synthesizing selected one of said video signals in response to a synthesis designation signal;

a plurality of sync signal input means for supplying sync signals containing vertical and horizontal sync signals corresponding to the video signals respectively;

a sync switching circuit for selecting one of the sync signals;

an expansion/compression processing circuit for receiving the video signals having different scanning frequencies, expanding/compressing the video signals in accordance with said expansion/compression designation signal, and producing at least one video signal expanded/compressed in synchronism with the sync signal selected by said sync switching circuit, said expansion/compression processing circuit being arranged on said housing;

a video signal synthesis circuit for synthesizing at least one of the video signals produced from said expansion/compression processing circuit with another video signal in accordance with said synthesis control signal, and producing selected one of the synthesized video signal and a plurality of video signals containing said another video signal; and an image processing circuit for generating a video display signal from the video signal produced by said video signal synthesis circuit in synchronism with the sync signal selected by said sync switching circuit and applying the resulting video display signal to a display.

38. A screen display system according to claim 37, wherein said video signal sources include at least an EWS (Engineering Workstation) signal source, a VGA (Video Graphic Array) signal source, an NTSC (National Television System Committee) signal source and an HD (High Definition or Hi-Vision) signal source.

39. A screen display system according to claim 37, wherein said video display unit is connected to a lecture table used by the lecturer, and one of the video signals is supplied to the video display unit together with a sync signal corresponding to the particular video signal from the lecture table by the operation of the lecturer.

40. A screen display system according to claim 38, comprising four video display units connected to the AV controller in accordance with the EWS, VGA, NTSC and HD signal sources respectively.

41. A screen display system according to claim 37, wherein the central control console applies one of the video signals to at least one of said video display units together with the sync signal corresponding to particular video signal.

42. A screen display system according to claim 41, wherein said video display unit comprises:

said housing;

first and second video input means of said plurality of video input means for receiving the first and second analog video signals having different scanning frequencies;

said expansion/compression signal input means for receiving an expansion/compression designation signal for expanding/compressing selected one of the first and second analog video signals;

said synthesis signal input control means for producing a synthesis control signal for synthesizing said first and second analog signals in response to a synthesis designation signal;

first and second sync signal input means of said plurality of sync signal input means for selected one of at least receiving and supplying the first and second sync signals containing the vertical and horizontal sync signals corresponding to the first and second analog video signals respectively;

said sync switching circuit for selecting and producing selected one of the first and second sync signals supplied from at least said first and second sync signal input means in accordance with the synthesis designation signal;

a clamp circuit for receiving the first analog video signal and reproducing and producing the DC component of said first analog video signal;

said expansion/compression processing circuit for converting said second analog video signal into a second digital video signal, expanding/compressing said second digital video signal in accordance with said expansion/compression designation signal, said first sync signal selected by said sync switching circuit and said second sync signal, and producing the third analog video signal expanded/compressed in synchronism with at least the first and second sync signals;

said video signal synthesis circuit for receiving the first analog video signal from said clamp circuit and the third analog video signal produced from said expansion/compression processing circuit, synthesizing in analog fashion the first analog video signal and the third analog video signal in accordance with the synthesis designation signal and one of the first and second sync signals selected by said sync switching circuit thereby to generate a fourth analog video signal, and producing selected one of the fourth analog video signal, the first analog video signal and the third analog video signal; and a printer interface for converting the video signal produced from said video signal synthesis circuit into a print signal;

said image processing circuit for generating a video display signal from selected one of the first, third and fourth analog video signals produced by said video signal synthesis circuit in synchronism with one of the first and second sync signals selected by said sync switching circuit, and applying the resulting video display signal to a display;

wherein said expansion/compression processing circuit includes an A-D conversion circuit for converting the second analog video signal to the second digital video signal, a memory for storing the second digital video signal, a D-A conversion circuit for converting the second digital signal stored in the memory to the third analog video signal and applying the resulting signal to the video signal synthesis circuit, a write control circuit for controlling the A-D conversion timing of the A-D conversion circuit and writing the converted second digital video signal into the memory in synchronism with the second sync signal, a read control circuit for controlling the operation of reading the second digital video signal from the memory in synchronism with one of the first and second sync signals selected by the sync switching circuit, and an expansion/compression control circuit for controlling the expansion/compression of the second digital video signal in accordance with the expansion/compression designation signal, said expansion/compression processing circuit being replaceably arranged on said housing.

43. A screen display system according to claim 41, where said video display system includes:

said housing;

first and second video input means of said plurality of video input means for receiving the first and second analog video signals having scanning frequencies;

said expansion/compression signal input means for receiving an expansion/compression designation signal for expanding/compressing selected one of first and second analog video signals;

said synthesis signal input control means for producing a synthesis control signal for synthesizing said first and second video signals in response to a synthesis designation signal;

first and second sync signal input means of said plurality of sync signal input means for selected one of at least receiving and supplying first and second sync signals containing the vertical and horizontal sync signals corresponding to the first and second analog video signals;

said sync switching circuit for selecting and producing selected one the first and second sync signals supplied from at least the first and second sync signal input means in accordance with the synthesis designation signal;

a first A-D conversion circuit for converting the first analog video signal to the first digital video signal;

said expansion/compression processing circuit for converting the second analog video signal to the second digital video signal, expanding/compressing the second digital video signal in accordance with the second sync signal, the first sync signal selected by the sync switching circuit and the expansion/compression designation signal, and producing the third digital video signal expanded/compressed in synchronism with selected one of at least the first and second sync signals;

said video signal synthesis circuit for receiving the first digital video signal produced from the first A-D conversion circuit and the third digital video signal produced from said expansion/compression processing circuit, synthesizing in digital fashion the first digital video signal and the third digital video signal by said synthesis control signal generated in accordance with the synthesis designation signal and one of the first and second sync signals selected by the sync switching circuit thereby to generate a fourth digital video signal, and producing selected one of the fourth digital video signal, the first digital video signal and the third digital video signal;

a printer interface for converting the video signal produced from said video signal synthesis circuit into a print signal;

a D-A conversion circuit for converting selected one of the first, third and fourth digital video signals from the video signal synthesis circuit into a fourth analog video signal at a timing synchronous with one of the first and second sync signals selected by said sync switching circuit; and said image processing circuit for generating a video display signal from the fourth analog video signal produced by said D-A conversion circuit in synchronism with one of the first and second sync signals selected by said sync switching circuit and applying the resulting video display signal to a display;

wherein said expansion/compression processing circuit includes a second A-D conversion circuit for converting the second analog video signal to the second digital video signal, a memory for storing the second digital video signal, a write control circuit for writing the second digital video signal into the memory at an A-D conversion timing of the second A-D conversion circuit in synchronism with the second sync signal, a read control circuit for controlling the operation of reading the third digital video signal from said memory and applying the third digital video signal to said video signal synthesis circuit in synchronism with one of the first and second sync signals selected by said sync switching circuit, and an expansion/compression control circuit for controlling the expansion/compression of the third digital video signal in accordance with the expansion/compression designation signal, said expansion/compression processing circuit being arranged on said housing.

44. A screen display system according to claim 41, wherein said video display system includes:

said housing;

first and second video input means of said plurality of video input means for receiving first and second digital video signals having different scanning frequencies;

said expansion/compression signal input means for receiving the expansion/compression designation signal for expanding/compressing selected one of the first and second digital video signals;

said synthesis signal input control means for producing a synthesis control signal for synthesizing said first and second video signals in response to a synthesis designation signal;

first and second sync signal input means of said plurality of sync signal input means for selected one of at least receiving and supplying the first and second sync signals containing the vertical and horizontal sync signals corresponding to the first and second digital video signals respectively;

said sync switching circuit for selecting and producing selected one of the first and second sync signals supplied from at least the first and second sync signal input means in accordance with the synthesis designation signal;

a first D-A conversion circuit for converting the first digital video signal to the first analog video signal;

said expansion/compression processing circuit for receiving the second digital video signal, expanding/compressing the second digital video signal in accordance with the second sync signal, the first sync signal selected by the sync switching circuit and the expansion/compression designation signal, and producing the second analog video signal expanded/compressed in synchronism with selected one of at least the first and second sync signals;

said video signal synthesis circuit for receiving the first analog video signal produced from said first D-A conversion circuit and the second analog video signal produced from the expansion/compression processing circuit, synthesizing the first analog video signal and the second analog video signal in analog fashion by said synthesis control signal generated in accordance with the synthesis designation signal and selected one of the first and second sync signals selected by said sync switching circuit thereby to generate a third analog video signal, and producing selected one of the third analog video signal, the first analog video signal and the second analog video signal; and a printer interface for converting the video signal produced from said video signal synthesis circuit into a print signal;

said image processing circuit for generating a video display signal from selected one of the first, second and third analog video signals produced by said video signal synthesis circuit in synchronism with one of the first and second sync signals selected by said sync switching circuit and applying the particular video display signal to a display;

wherein said expansion/compression processing circuit includes a memory for storing the second digital video signal, a write control circuit for controlling the operation of writing the second digital video signal into said memory in synchronism with the second sync signal, a read control circuit for controlling the operation of reading the second digital video signal from the memory in synchronism with one of the first and second sync signals selected by said sync switching circuit, and an expansion/compression control circuit for controlling the expansion/compression of the second digital video signal in accordance with the expansion/compression designation signal, said expansion/compression processing circuit being replaceably arranged on said housing.

45. A screen display system according to claim 41, comprising:

said housing;

first and second video input means of said plurality of video input means for receiving first and second digital video signals having different scanning frequencies;

said expansion/compression signal input means for receiving an expansion/compression designation signal for expanding/compressing selected one of the first and second digital video signals;

said synthesis signal input control means for producing a synthesis control signal for synthesizing said first and second video signals in response to a synthesis designation signal;

first and second sync signal input means of said plurality of sync signal input means for selected one of at least receiving and supplying the first and second sync signals containing the vertical and horizontal sync signals corresponding to the first and second digital video signals respectively;

said sync switching circuit for selecting and producing selected one of the first and second sync signals supplied from at least the first and second sync signal input means in accordance with synthesis designation signal;

said expansion/compression processing circuit for expanding/compressing the second digital video signal in accordance with the first sync signal selected by the sync switching circuit and the expansion/compression designation signal and producing the third digital video signal expanded/compressed in synchronism with selected one of at least the first and second sync signals;

said video signal synthesis circuit for receiving the first digital video signal and the third digital video signal produced from said expansion/compression processing circuit, synthesizing the first digital video signal and the third digital video signal in digital fashion by said synthesis control signal generated in accordance with the synthesis designation signal and one of the first and second sync signals selected by said sync switching circuit thereby to generate a fourth digital video signal, and producing selected one of the fourth digital video signal, the first digital video signal and the third digital video signal;

a printer interface for converting the video signal produced from said video signal synthesis circuit into a print signal;

a D-A conversion circuit for converting selected one of the first, third and fourth digital video signals produced by said video signal synthesis circuit to a fourth analog video signal at a timing synchronous with one of the first and second sync signals selected by said sync switching circuit; and said image processing circuit for generating a video display signal from the fourth analog video signal produced by said D-A conversion circuit in synchronism with one of the first and second sync signals selected by the sync switching circuit and applying the resulting video display signal to a display;

wherein said expansion/compression processing circuit includes a memory for storing the second digital video signal, a write control circuit for controlling the operation of writing the second digital video signal into said memory in synchronism with said second sync signal, a read control circuit for controlling the operation of reading the third digital video signal from said memory in synchronism with one of the first and second sync signals selected by said sync switching circuit, and an expansion/compression control circuit for controlling the expansion/compression of the third digital video signal in accordance with the expansion/compression designation signal, said expansion/compression processing circuit being arranged on said housing.

46. A screen display system comprising:

a plurality of video signal sources;

an AV controller for receiving at least one of video signals from said video signal sources;

a centralized control console for selecting the video signal received by said AV controller; and at least a video display unit connected to said AV controller for displaying the video signals selected by said centralized control console;

wherein said video display unit includes:

a housing;

a plurality of video input means for receiving said video signals having different scanning frequencies;

expansion/compression signal input means for receiving an expansion/compression designation signal for expanding/compressing selected one of said video signals;

synthesis signal input control means for producing a synthesis control signal for synthesizing selected one of said video signals in response to a synthesis designation signal;

a plurality of sync signal input means for supplying a sync signal including horizontal and vertical sync signals corresponding to said video signals respectively;

a sync switching circuit for selecting one of said sync signals;

an expansion/compression processing circuit mounted on said housing for receiving said video signals having different scanning frequencies, expanding/compressing said video signals in accordance with said expansion/compression designation signal, and applying at least a video signal expanded/compressed in synchronism with the sync signal selected by said sync switching circuit to said signal source through said AV controller;

a video signal synthesis circuit for synthesizing at least one of the video signals produced from said expansion/compression processing circuit with another video signal in accordance with said synthesis control signal, and producing selected one of the synthesized video signal and said video signals including said another video signal;

a printer interface for converting the video signal produced from said video signal synthesis circuit into a print signal; and a video processing circuit for producing a video display signal from said video signal produced by said video signal synthesis circuit in synchronism with said sync signal selected by said sync switching circuit, and applying said video signal to a display unit.

47. A video display apparatus for displaying on a display a video signal applied thereto from an input terminal for an external video signal, comprising:

a housing;

at least a video input means for receiving at least a video signal having a predetermined scanning frequency;

signal source means for outputting at least one video signal and a corresponding sync signal containing horizontal and vertical sync signals;

synthesis signal input control means for producing a synthesis control signal for synthesizing said video signal from said video input means and said video signal from said signal source means in response to a synthesis designation signal;

at least a sync signal input means for supplying sync signal containing horizontal and vertical sync signals corresponding to said video signal, respectively;

a sync switching circuit for selecting at least one of said sync signal from said sync signal input means and said sync signal from said signal source means;

a video signal synthesis circuit for synthesizing at least said video signal produced from the signal source means with said video signal received from said video input means in accordance with said synthesis control signal and producing selected at least one synthesized video signal and said video signal from said video input means; and an image processing circuit for generating a video display signal from said video signal of said video signal synthesis circuit in synchronism with the sync signal selected by said sync switching circuit and applying the video display signal to the display.

48. A video display apparatus according to claim 47 further comprising:

at least an expansion/compression signal input means for receiving an expansion/compression designation signal for expanding/compressing said video signal from said video signal input means; and at least an expansion/compression processing circuit for expanding/compressing said received video signal in accordance with said expansion/compression designation signal and producing at least a video signal expanded/compressed in synchronism with the sync signal selected by said switching circuit.

49. A video display apparatus according to claim 47, wherein said signal source means further includes at least an expansion/compression processing circuit for expanding/compressing at least a video signal generated from said signal source means itself and producing at least a video signal expanded/compressed in synchronism with the sync signal generated from said signal source means itself.

50. A video display apparatus for displaying on a display a video signal applied thereto from an input terminal for an external video signal, comprising:

a housing;

a plurality of video input means for receiving a plurality of video signals having different scanning frequencies;

expansion/compression signal input means for receiving an expansion/compression designation signal for expanding/compressing selected one of said video signals;

synthesis signal input control means for producing a synthesis control signal for synthesizing selected one of said video signals in response to a synthesis designation signal;

a plurality of sync signal input means for supplying externally inputted sync signals containing horizontal and vertical sync signals corresponding to said video signals respectively;

sync signal generation means incorporated in said housing, for generating at least one internally generated sync signal containing horizontal and vertical sync signals to drive said display, regardless of said video signals including the corresponding externally inputted sync signals;

a sync switching circuit for selecting one of said externally inputted sync signals and said internally generated sync signal;

a plurality of expansion/compression processing circuits mounted on said housing for receiving said video signals having different scanning frequencies, expanding/compressing said received video signals in accordance with said expansion/compression designation signal and producing at least one of the video signals expanded/compressed in synchronism with the sync signal selected by said sync switching circuit;

a video signal synthesis circuit for synthesizing at least one of the video signals produced from the expansion/compression processing circuit with another one of the video signals in accordance with said synthesis control signal and producing selected one of a synthesized video signal and said plurality of video signals containing said another video signal; and an image processing circuit for generating a video display signal from said video signal of said video signal synthesis circuit in synchronism with the sync signal selected by said sync switching circuit and applying the video display signal to said display.

* * * * *